US011189877B2

(12) United States Patent
Kuno

(10) Patent No.: US 11,189,877 B2
(45) Date of Patent: Nov. 30, 2021

(54) BATTERY PACK AND VEHICLE FOR MOUNTING THE SAME

(71) Applicant: TOYOTA JIDOSHA KABUSHIKI KAISHA, Toyota (JP)

(72) Inventor: Atsunori Kuno, Chigasaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 108 days.

(21) Appl. No.: 16/707,094

(22) Filed: Dec. 9, 2019

(65) Prior Publication Data
US 2020/0227706 A1 Jul. 16, 2020

(30) Foreign Application Priority Data

Jan. 11, 2019 (JP) .............................. JP2019-003737
Jun. 13, 2019 (JP) .............................. JP2019-110589

(51) Int. Cl.
B60K 1/04 (2019.01)
H01M 50/20 (2021.01)

(52) U.S. Cl.
CPC ............... H01M 50/20 (2021.01); B60K 1/04 (2013.01); B60K 2001/0438 (2013.01); H01M 2220/20 (2013.01)

(58) Field of Classification Search
CPC ....................................................... B60K 1/04
See application file for complete search history.

(56) References Cited

U.S. PATENT DOCUMENTS

| 8,833,499 | B2 | 9/2014 | Rawlinson | |
| 2008/0057393 | A1* | 3/2008 | Onuki | H01M 50/20 |
| | | | | 429/159 |
| 2012/0097466 | A1* | 4/2012 | Usami | B60K 1/04 |
| | | | | 180/68.5 |
| 2018/0261899 | A1* | 9/2018 | Milton | H01M 10/6567 |

FOREIGN PATENT DOCUMENTS

| EP | 1 898 479 A1 | 3/2008 |
| EP | 3 185 336 A1 | 6/2017 |

* cited by examiner

Primary Examiner — James A Shriver, II
Assistant Examiner — James J Triggs
(74) Attorney, Agent, or Firm — Sughrue Mion, PLLC

(57) ABSTRACT

The battery pack according to the present disclosure is a battery pack mounted under a floor of a vehicle. The battery pack comprises a lower case fixed under the floor and on which a battery stack is placed, an upper case attached to the lower case, and a support member extending upwardly from a rigid body provided inside the lower case to support a back surface of the upper case. The battery pack may further comprise an elastic member disposed on a surface of the upper case and sandwiched between the upper case and a lower surface of the floor. In such a configuration, it is possible to suppress the upper case of the battery pack from vibrating.

18 Claims, 62 Drawing Sheets

BATTERY PACK AND VEHICLE FOR MOUNTING THE SAME

CROSS-REFERENCE TO RELATED APPLICATION

This application is based on and claims the benefit of Japanese Patent Application No. 2019-003737, filed on Jan. 11, 2019 and Japanese Patent Application No. 2019-110589, filed on Jun. 13, 2019, which are incorporated by reference herein in their entirety.

BACKGROUND

Field

The present disclosure relates to a battery pack and a vehicle for mounting the same.

Background Art

U.S. Pat. No. 8,833,499 discloses a prior art battery pack for an electric vehicle and vehicle for mounting the same. However, this prior art has problems to be solved.

SUMMARY

One of the problems to be solved is to suppress the upper case of the battery pack from vibrating. In the above-mentioned prior art, an insulating layer for sound insulation, heat insulation, and vibration damping is provided between the lower surface of a body floor and the upper case of the battery pack.

However, it is difficult to say that the upper case of the battery pack can be sufficiently suppressed from vibrating by simply providing the breaker layers.

The present disclosure has been made in view of the above-mentioned problems, and an object of the present disclosure is to provide a battery pack capable of suppressing its upper case from vibrating, and a vehicle for mounting the same.

A battery pack according to the present disclosure is a battery pack mounted under a floor of a vehicle, and comprises a lower case fixed under the floor and on which a battery stack is placed, an upper case attached to the lower case, and a support member extending upwardly from a rigid body provided inside the lower case to support a back surface of the upper case. According to this configuration, since the upper case can be supported from below, vibrations of the upper case can be suppressed.

In the battery pack according to the present disclosure, the support member may support the back surface of the upper case at a central portion in the width direction of the battery pack. By supporting the central portion of the flexible upper case from below with the support member, vibrations of the upper case can be suppressed.

In the battery pack according to the present disclosure, the battery pack may comprise an elastic member disposed on a surface of the upper case and sandwiched between the upper case and a lower surface of the floor. In such a configuration, by sandwiching the upper case between the elastic member and the support member from above and below, it is possible to suppress vibrations of the upper case. In particular, by using the elastic member on one side instead of sandwiching the upper case with rigid bodies from both sides, vibrations generated in the upper case can be absorbed by the elastic member.

In the battery pack according to the present disclosure, a plurality of the support members may be provided in the front-rear direction of the battery pack. The elastic member may be disposed such that the position of the elastic member in the front-rear direction of the battery pack is located between the two adjacent support members in the side view of the battery pack. In such a configuration, the support members are disposed in front of and behind the elastic member, so that the upper case can be stably supported by the support members and the elastic member.

In the battery pack according to the present disclosure, a plurality of the support members may be provided in the width direction of the battery pack. In addition, the elastic member may be disposed such that the position of the elastic member in the width direction of the battery pack is located between the two adjacent support members in the front view of the battery pack. In such a configuration, the support members are disposed on both sides of the elastic member, so that the upper case can be stably supported by the support member and the elastic member.

In the battery pack according to the present disclosure, the back surface of the upper case may be provided with a downwardly projecting rib, and the upper case may be supported on the rib by the support member. In such a configuration, the upper case can be stably supported by the highly rigid rib abutting against the support member.

In the battery pack according to the present disclosure, a plurality of the ribs may be spaced apart from each other and a cable may be passed between the ribs. In such a configuration, the cable can be positioned without being disturbed by the ribs.

In the battery pack according to the present disclosure, a plurality of downwardly projecting ribs may be provided on the back surface of the upper case in the front-rear direction of the battery pack, and the upper case may be supported on the plurality of the ribs by the support member. In addition, the elastic member may be disposed such that the position of the elastic member in the front-rear direction of the battery pack is located between the two adjacent ribs in the side view of the battery pack. In such a configuration, since the ribs abutting on the support member are arranged in front of and behind the elastic member, the upper case can be stably supported by the support member and the elastic member.

In the battery pack according to the present disclosure, a plurality of downwardly projecting ribs may be provided on the back surface of the upper case in the width direction of the battery pack, and the upper case may be supported on the plurality of the ribs by the support member. In addition, the elastic member may be disposed such that the position of the elastic member in the width direction of the battery pack is located between the two adjacent ribs in the front view of the battery pack. In such a configuration, the ribs abutting on the support member are disposed on both sides of the elastic member, so that the upper case can be stably supported by the support member and the elastic member.

In the battery pack according to the present disclosure, a plurality of the support members may be arranged in two rows in the front-rear direction of the battery pack at the center in the width direction of the battery pack, and a center plate extending in the front-rear direction of the battery pack may be stretched over the upper end portions of the plurality of the support members arranged in two rows, and the ribs may abut on this center plate. In such a configuration, the plurality of the support members arranged in two rows are bonded via the center plate, whereby the stiffness of the support structure as a whole supporting the upper case is increased, and the support structure can stably support the upper case.

In the battery pack according to the present disclosure, flat surfaces in contact with the ribs may be formed at both ends of the center plate in the width direction of the battery pack, and a recess through which a cable passes may be formed at the center of the center plate in the width direction of the battery pack. In such a configuration, the upper case can be stably supported by the rigid rib abutting against the flat surface of the center plate, and the cable can be arranged without being obstructed by the rib by passing the cable through the recess of the center plate.

In the battery pack according to the present disclosure, the upper case may be formed in a stepped shape in which the front portion is low and the rear portion is high in the front-rear direction of the battery pack, and at least one of the front portion and the rear portion, which has a longer length in the front-rear direction of the battery pack, may be supported by the support member. In such a configuration, at least the less rigid side of the front portion and the rear portion of the upper case can be stably supported.

In the battery pack according to the present disclosure, the support member may be a plate having a hat-shaped cross-section perpendicular to the vertical direction of the battery pack. In such a configuration, the upper case can be stably supported by ensuring high-rigidity of the support member.

The battery pack according to the present disclosure may comprise an inner crosswise reinforcement provided inside the lower case and extending in the width direction of the battery pack, and the support member may be fixed to the inner crosswise reinforcement. In such a configuration, the rigidity of the lower case can be increased by the inner crosswise reinforcement while the support member is fixed to the rigid inner crosswise reinforcement, so that the upper case can be stably supported.

The battery pack according to the present disclosure may comprise a bracket that extends in the width direction of battery pack and is bonded to the inner crosswise reinforcement with a fastener, and the support member may be bonded to the bracket. In such a configuration, the stiffness of the lower case can be further increased by the bracket while the support member is firmly fixed to the inner crosswise reinforcement via the bracket, so that the upper case can be stably supported.

In the battery pack according to the present disclosure, a plurality of the inner crosswise reinforcements may be arranged side by side in the front-rear direction of the battery pack, and a plurality of the battery stacks may be arranged between the two inner crosswise reinforcements arranged in the front-rear direction of the battery pack with the longitudinal directions thereof oriented in the width direction of the battery pack. Each of the plurality of the battery stacks may have a plurality of nail parts on both sides of the battery stack in the lateral direction, and may be fixed to the inner crosswise reinforcement by sandwiching the plurality of the nail parts by the inner crosswise reinforcement and the bracket. In such a configuration, since two adjoining inner crosswise reinforcements are bonded by the battery stack, the stiffness of the supporting structures supporting the upper case as a whole is further increased, and the upper case can be stably supported.

The battery pack according to the present disclosure may include an outer crosswise reinforcement provided on the outer side of the lower case and extending in the width direction of the battery pack, and a plurality of the inner crosswise reinforcements and a plurality of the outer crosswise reinforcements may be alternately arranged in the front-rear direction of the battery pack. Each of the outer crosswise reinforcements may be bonded to the two adjacent inner crosswise reinforcements together with the lower case. In such a configuration, since two adjoining inner crosswise reinforcement are bonded by the outer crosswise reinforcement with the lower case interposed therebetween, the stiffness of the support structure as a whole supporting the upper case is further increased, and the support structure can stably support the upper case. When each of the outer crosswise reinforcements is welded to the two inner crosswise reinforcements adjacent to each other together with the lower case, the liquid-tightness of the lower case can be ensured.

The battery pack according to the present disclosure may comprise an outer lengthwise reinforcement extending in the longitudinal direction of the battery pack and disposed on the exterior of the lower case, and the outer lengthwise reinforcement may sandwich a plurality of the outer crosswise reinforcements with the lower case and be bonded to the lower case together with the plurality of the outer crosswise reinforcements. In such a configuration, since the plurality of the outer crosswise reinforcements arranged in the width direction of the battery pack are bonded by the outer lengthwise reinforcement, the stiffness of the support structure as a whole supporting the upper case is further increased, and the upper case can be stably supported. When the outer lengthwise reinforcement is welded to the lower case together with the plurality of the outer crosswise reinforcements, the liquid-tightness of the lower case can be ensured.

In the battery pack according to the present disclosure, a plurality of the support members may be arranged in the center in the width direction of the battery pack side by side in the front-rear direction of the battery pack, and the outer lengthwise reinforcement may be provided below the plurality of the support members arranged side by side. In such a configuration, it is possible to increase the stiffness of the lower case of the portion where the support member is arranged, so that it is possible to stably support the upper case.

In the battery pack according to the present disclosure, the upper case and the support member may be bonded by a fastener. In such a configuration, the upper case can be fixed to the support member with a simple configuration. The fastening point by the fastener may be sealed with a sealing material.

The vehicle according to the present disclosure includes a battery pack mounted under a floor of a vehicle and a elastic member sandwiched between a lower surface of the floor and the battery pack. The battery pack includes a lower case on which a battery stack is placed and that is fixed under the floor, an upper case attached to the lower case and on which the elastic member is placed, and a support member extending upwardly from a rigid body consisting of the battery stack and the lower case and supporting the back surface of the upper case. Any configuration of the battery pack according to the present disclosure may be applied to the battery pack of the vehicle according to the present disclosure. According to this configuration, it is possible to suppress vibrations of the upper case by sandwiching the upper case between the elastic member and the support member from above and below. In particular, by using the elastic member on one side instead of sandwiching the upper case with rigid bodies from both sides, vibrations generated in the upper case can be absorbed by the elastic member.

As described above, according to the battery pack and the vehicle for mounting the same according to the present disclosure, it is possible to suppress the upper case of the battery pack from vibrating. Also, all of the above-described and other features and advantages of the present disclosure will become more apparent from the illustrative, non-limitative description taken in conjunction with the accompanying drawings. In the accompanying drawings, the same reference numerals are used to denote the same elements in different drawings.

DETAILED DESCRIPTION

The following is a table of contents showing the contents and the order of description in the embodiment of the present disclosure.

Table of Contents
1. Overview of vehicle
2. Battery pack
   2-1. Appearance and overview of battery pack
   2-2. Detail of reinforcement structure of lower case
   2-3. Structure of middle frame
   2-4. Detail of middle frame supporting structure
   2-5. Detail of junction structure between reinforcements
   2-6. Detail of frame structure of second floor
   2-7. Detail of lower case rear end
   2-8. Heating/cooling device
   2-9. Cable laying structure
   2-10. Battery stack fixing structure
3. Body structure
   3-1. Overview of body structure
   3-2. Body frame structure
   3-3. Mounting structure of battery pack under floor
   3-4. Mounting structure of battery pack rear end
   3-5. Upper case supporting structure 4. Features and advantages
  4-1. Support of upper case from below by support legs
  4-2. Linkage of inner crosswise reinforcements by outer crosswise reinforcement
  4-3. Linkage of outer crosswise reinforcements by outer lengthwise reinforcement
  4-4. Stereoscopic reinforcement of battery pack by middle frame
  4-5. Installation of elastic member in gap between floor panel and upper case
  4-6. Reinforcement of vehicle frame by reinforcement structure of battery pack
  4-7. Support of battery pack by cross members constituting annular frame
  4-8. Suspension support of battery pack rear end by rear underfloor cross member
  4-9. Closed cross-sectional structure of lower case rear end
  4-10. Connection between outer side lengthwise reinforcement and outer crosswise reinforcement of rear end by outer corner reinforcement
  4-11. Support of battery stack by multiple reinforcements
  4-12. Protection of battery pack by outer crosswise reinforcement and outer lengthwise reinforcement
  4-13. Arrangement of baffle plate on inner crosswise reinforcement
  4-14. Protection of battery stack by air duct
  4-15. Alternate arrangement of left and right air distributors
  4-16. Tilt arrangement of baffle plate from air distributor side to opposite side
5. Others Hereinafter, description will be made in order according to the above table of contents.

1. Overview of Vehicle

An overview of a vehicle according to an embodiment of the present disclosure will be described with reference to FIG. 1.

Figure 1:
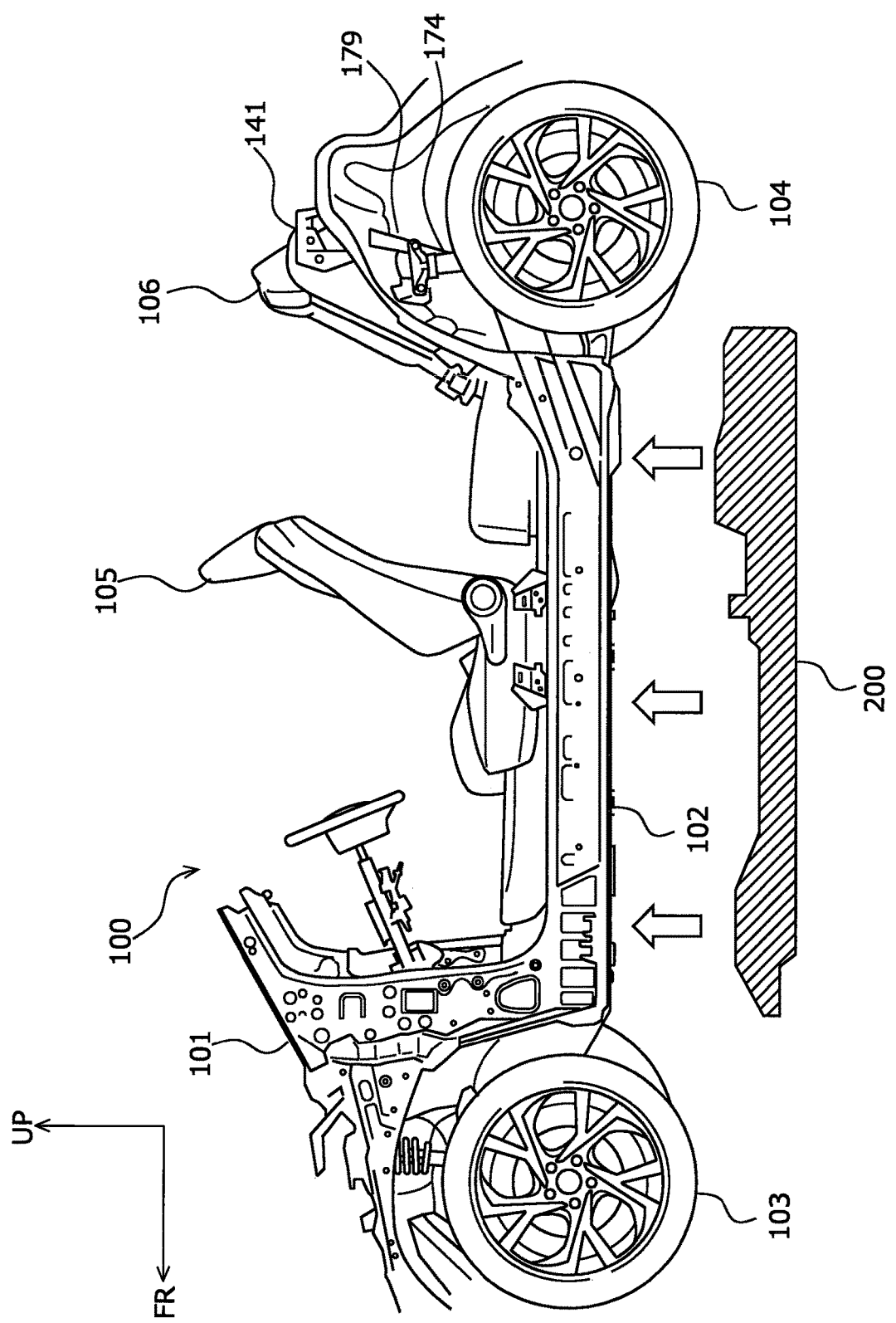
FIG. 1 is a side view showing the structure of the vehicle according to an embodiment.

FIG. 1 is a side view showing the structure of the vehicle 100 according to the embodiment. The vehicle 100 is an electric vehicle using an electric motor as a power device. The electric motor is operated by the supply of electric power. The vehicle 100 includes a battery pack 200 storing electric power to be supplied to the electric motor. The battery pack 200 contains a plurality of rechargeable battery stack.

The battery pack 200 is mounted underneath a floor panel 102 which constitutes a body 101 of the vehicle 100. The battery pack 200 is provided between a front wheel 103 and a rear wheel 104 in the front-rear direction of the vehicle 100. The battery pack 200 is mounted so that its front side is located directly below a front seat 105 and its rear side, which is raised one step higher than the front side, is located directly below a rear seat 106. The battery pack 200 is attached to the floor panel 102 in a replaceable form if necessary.

2. Battery Pack

The battery pack 200 according to the embodiment will be described.

2-1. Appearance and Overview of Battery Pack

First, the appearance and overview of the battery pack 200 will be described with reference to FIGS. 2 to 4.

Figure 2:
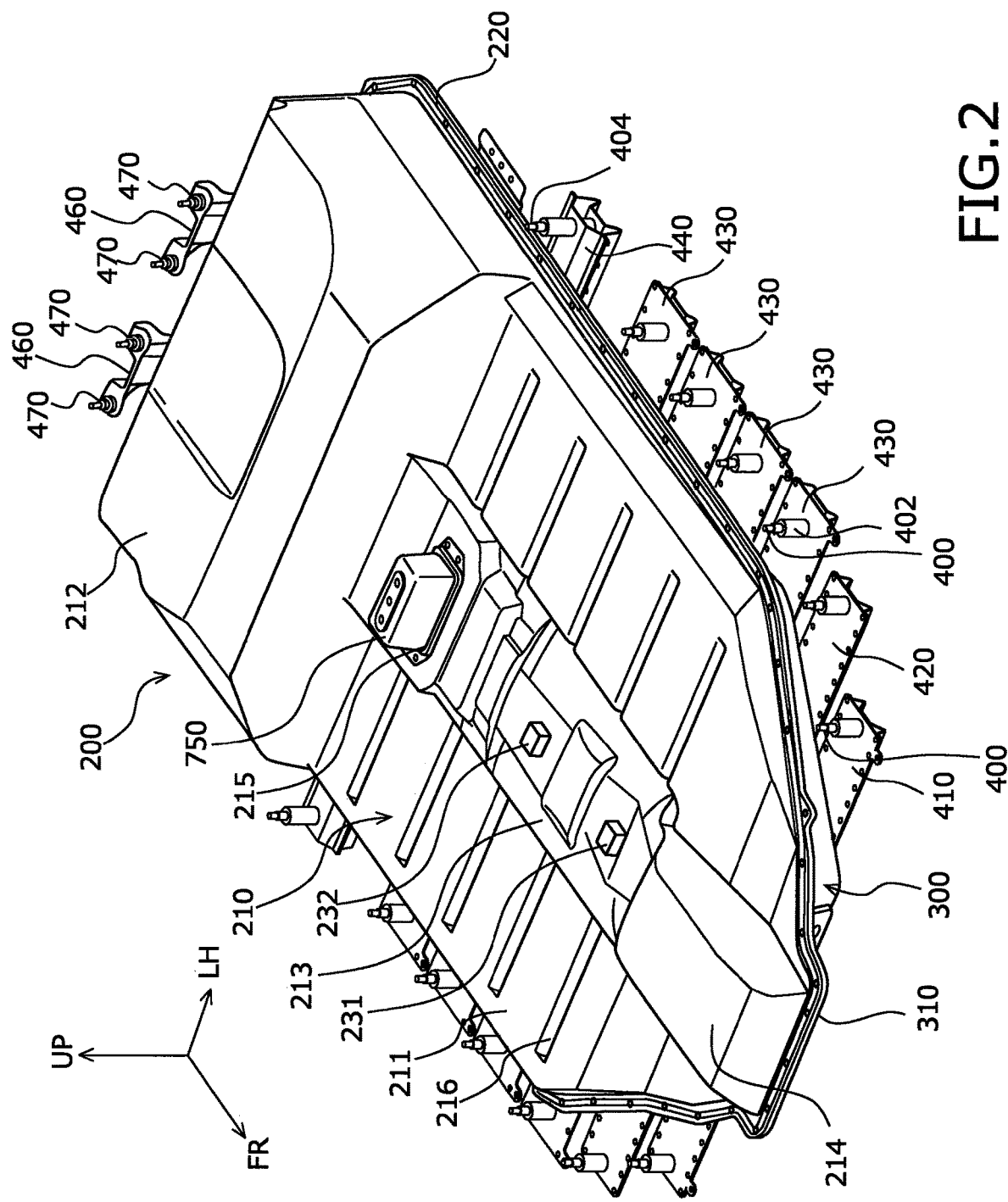
FIG. 2 is a perspective view of the battery pack according to the embodiment from the upper left front obliquely.

FIG. 2 is a perspective view from the upper left front obliquely showing the external appearance of the battery pack 200. First, the front-rear direction of the vehicle is defined as the front-rear direction of the battery pack 200, the width direction of the vehicle is defined as the width direction of the battery pack 200, and the vertical direction of the vehicle is defined as the vertical direction of the battery pack 200. Arrows FR and UP shown in the respective drawings described below indicate the front in the front-rear direction of the battery pack 200 and the upper in the vertical direction of the battery pack 200, respectively, and arrows RH indicate the right from the viewpoint of a driver on the vehicle. The opposite directions of the arrows FR, UP, and RH indicate the rear of the battery pack 200, the lower of the battery pack 200, and the left (LH) of the battery pack 200. Hereinafter, when the explanation is made simply by using the front-rear, left-right, and up-down directions, unless otherwise specified, the front-rear direction of the battery pack 200, the width direction of the battery pack 200, and the up-down direction of the battery pack 200 are indicated. In the plan view, the centerline in the front-rear direction of the battery pack 200 coincides with the centerline in the front-rear direction of the vehicle. Here, the centerline in the front-rear direction is an imaginary line (not shown) passing through the center in the width direction of the vehicle along the front-rear direction. The battery pack 200 is substantially symmetrical on the left and right with respect to the centerline.

Shown in FIG. 2 is an outer shell of the battery pack 200. The outer shell of the battery pack 200 is composed of an upper case 210 located on the upper side and a lower case 300 located on the lower side. The upper case 210 is made of, for example, a light metal or a resin, which may be a resin in part, or a steel plate. The lower case 300 is made of, for example, a steel plate. It is to be noted that the respective components constituting the battery pack 200 are made of metals such as steel and aluminum, except for the cases specified specifically or clearly specified in principle.

The upper case 210 is shaped like an inverted bathtub. In addition, the upper case 210 is formed in a stepped shape in which the front portion in the front-rear direction of the battery pack 200 is lower and the rear portion is high. Hereinafter, the front portion of the upper case 210 having a relatively low ceiling may be referred to as a low ceiling 211, and the rear portion of the upper case 210 having a relatively high ceiling may be referred to as a high ceiling 212. The low ceiling 211 has a longer length in the front-rear direction of the battery pack 200 than the high ceiling 212.

A central ridge 213 extending in the front-rear direction is formed at the center in the width direction of the low ceiling 211 of the upper case 210. A service plug 750 protrudes upwardly from the inside of the battery pack 200 from the central ridge 213. The cables connected to the service plug 750 are accommodated below the central ridge 213. When the battery pack 200 is mounted on the vehicle, the service plug 750 is connected to the vehicle connector. An opening through which the service plug 750 of the central ridge 213 passes is sealed, for example, by a plastic sealing member 215.

The upper case 210 is longer in the front-rear direction than in the width direction, and has a constant width except for the tip portion. The distal end of the upper case 210 tapers towards the distal end. The distal end of the upper case 210 is formed with a front ridge 214 that is raised further than the central ridge 213. A junction box and a blower, which will be described later, are disposed below the front ridge 214. The front ridge 214 and the central ridge 213 also have a function of increasing the stiffness of the low ceiling 211. Separately from these, the low ceiling 211 is formed with a plurality of reinforcing groove 216 extending from the central ridge 213 to the right and left in the width direction.

In the central ridge 213 of the upper case 210, two elastic members 231, 232 are arranged side by side in the front-rear direction. These elastic members 231, 232 are, for example, rubbers, sponges, or springs. The position where the elastic members 231, 232 are arranged and their roles will be described in detail later.

A flange 220 is formed around the upper case 210. Similarly, a flange 310 is formed around the lower case 300. The upper case 210 is fixed to the lower case 300 by aligning the flange 220 of the upper case 210 with the flange 310 of the lower case 300 and fastening the two by fasteners.

The lower case 300 is provided with a plurality of case fixing side arms 410, 420, 430, and 440 extending from both the left and right sides thereof to the width direction. The case fixing side arms 410 420, 430, 440 are attached to the floor bottom by hanging bolts 400, 404. In addition, although hidden behind other components in FIG. 2, case fixing rear arms 460 are also provided on the lower case 300. The case fixing rear arms 460 are attached to the floor bottom by fasteners (bolt and nut) 470.

Figure 3:
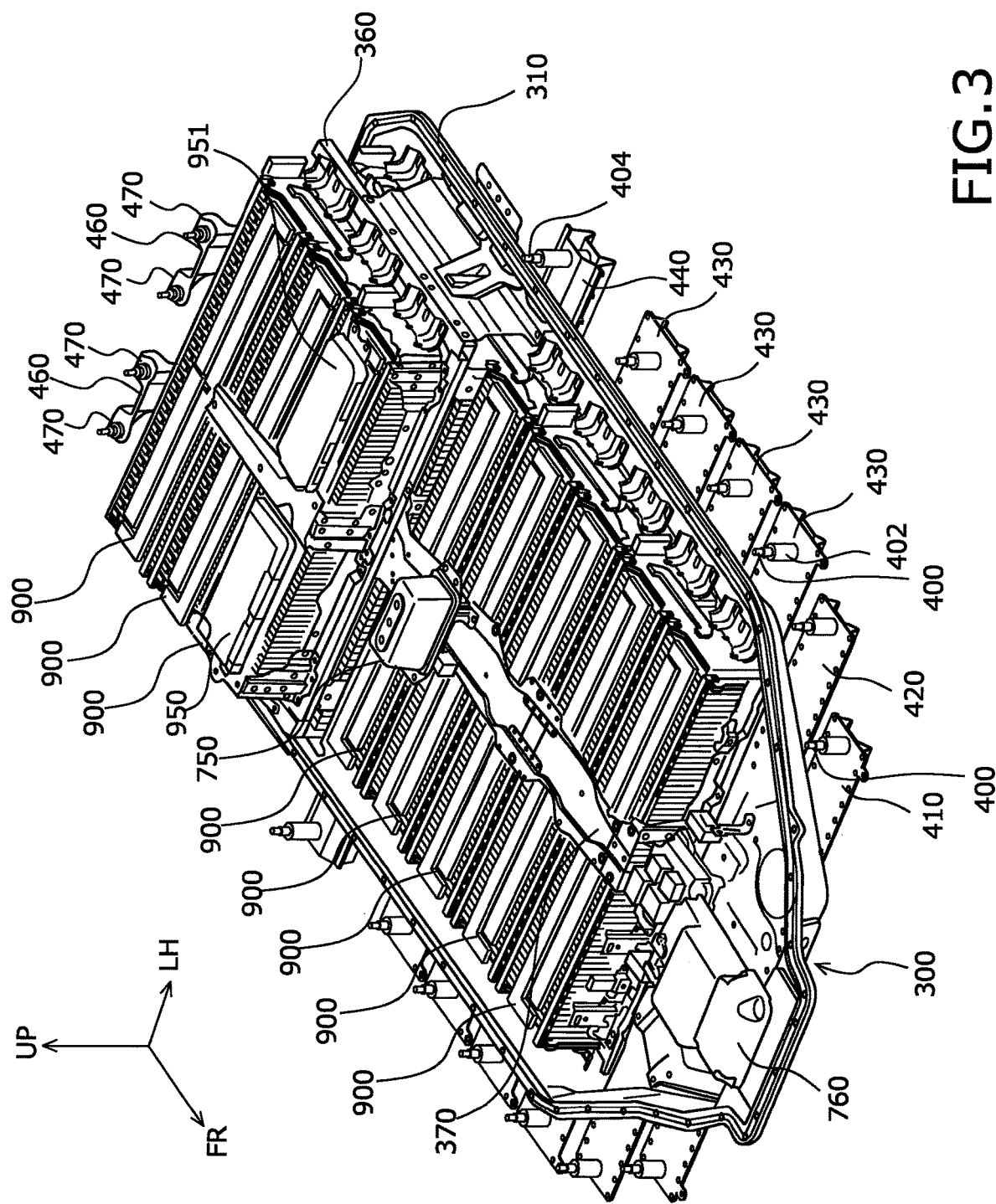
FIG. 3 is a perspective view of the battery pack with the upper case, the heating/cooling device, and the cables removed viewed from the upper left front obliquely, showing the structure of the battery pack according to the embodiment.

FIG. 3 is a perspective view of the battery pack 200 with the upper case 210, the heating/cooling device and the cables, which will be described later, removed, viewed from the upper left front obliquely. A plurality of battery stacks 900 having a rectangular parallelepiped shape are accommodated in the battery pack 200. The battery stacks 900 are placed side by side in the front-rear direction of the lower case 300 (synonymous with the front-rear direction of the battery pack 200) with their longitudinal direction oriented in the width direction of the lower case 300 (synonymous with the width direction of the battery pack 200).

The lower case 300 is provided with a middle frame comprising a second floor 360 and a center plate 370. The second floor 360 is a second mounting surface of the battery stacks 900 which is located higher than the bottom surface of the lower case 300, and three battery stacks 900 are arranged side by side in the longitudinal direction of the lower case 300. Battery ECUs 950, 951 for charging and discharging the battery stacks 900 and controlling the heating/cooling device, which will be described later, are disposed on the battery stack 900 located at the foremost position among the battery stacks 900 placed on the second floor 360. Though not shown, three pieces of battery stacks 900 are also placed below the second floor 360.

The center plate 370 is provided at a position higher than the bottom surface of the lower case 300 in the central portion of the lower case 300. The center plate 370 extends from the second floor 360 toward the distal end of the lower case 300 in the front-rear direction of the lower case 300. The distal end of the center plate 370 reaches the distal end of the lower case 300 where a junction box 760 or the like is installed beyond the area where the battery stacks 900 are placed. Below the center plate 370, five battery stacks 900 are placed. Therefore, the battery stacks 900 placed on the lower case 300 are 11, which is the sum of 8 placed on the first stage and 3 placed on the second stage.

The detail of the center plate 370 will be described later, but one of the roles is a route of cables (not shown). A service plug 750 is mounted on the center plate 370. The cable connected to the junction box 760 installed at the distal end portion of the lower case 300, the cable connected to the battery ECUs 950, 951, and the cable connected to the service plug 750 are passed over the center plate 370.

Figure 4:
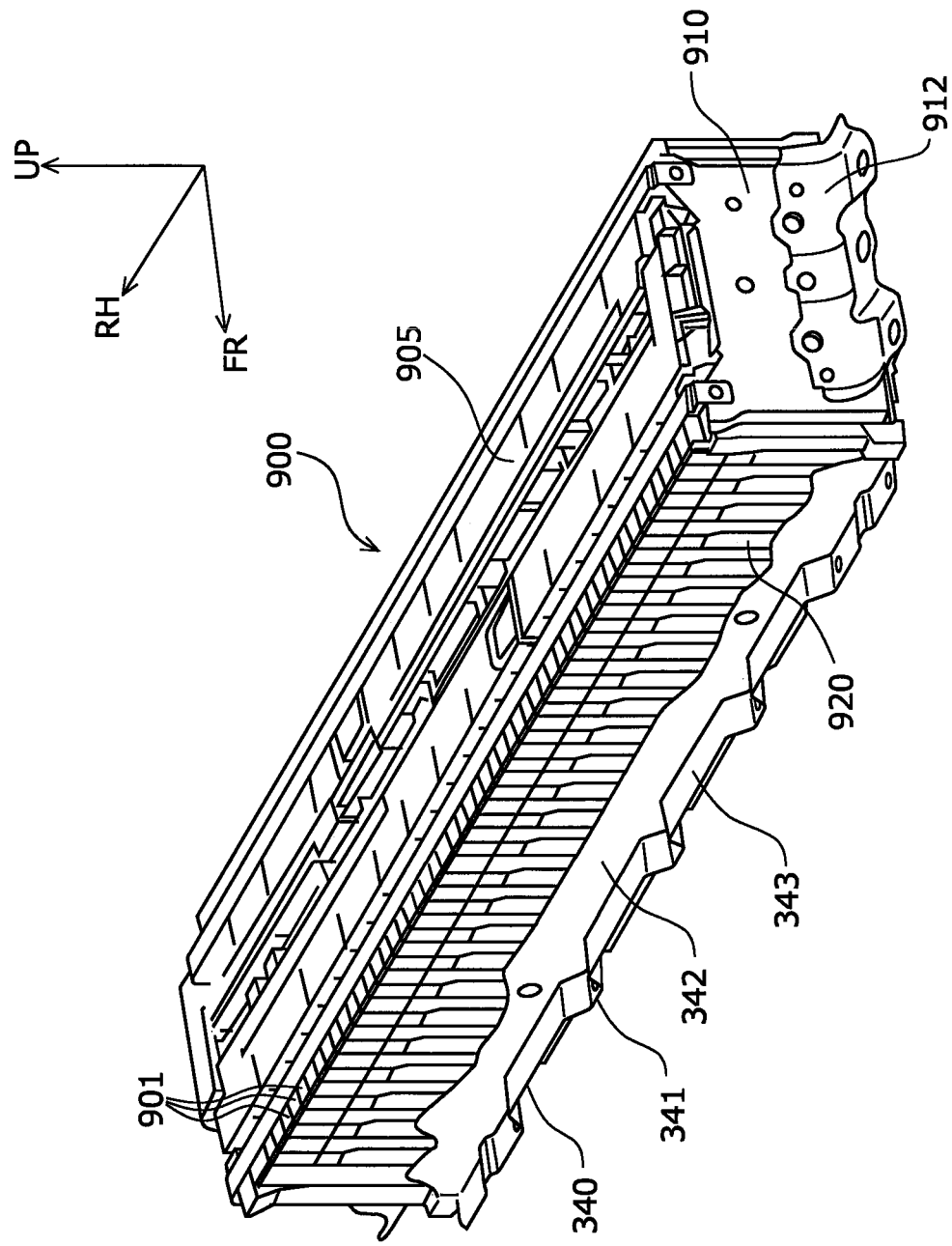
FIG. 4 is a perspective view showing the external appearance of the battery stack incorporated in the battery pack according to the embodiment.

FIG. 4 is a perspective view showing the external appearance of the battery stack 900. The battery stack 900 is formed by stacking a plurality of battery cells 901 in the longitudinal direction of the battery stack 900 (also referred to as the longitudinal direction of the battery stack 900). The battery cell 901 may be, for example, a lithium-ion battery, a nickel-metal hydride battery, an all-solid battery, a lead-acid battery, or the like. The plurality of the stacked battery cells 901 are accommodated in the cell case 920 while both longitudinal ends of the battery stack 900 are pressed by end plates 910. A power distribution equipment 905 is attached to the upper surface of the battery stack 900.

Stack support brackets 912 for regulating the longitudinal motion of the battery stack 900 are bonded to both sides in the longitudinal direction of the battery stack 900. The stack support bracket 912 has a substantially L-shape, and is fixed to the bottom surface of the lower case 300 via another member.

In the lateral direction of the battery stack 900 (also referred to as the width direction of the battery stack 900), a partition bracket 340 for separating the battery stack 900 from the adjacent other battery stack 900 is installed. The partition bracket 340 has a base part 341 fixed to the bottom surface of the lower case 300 via another member, and a partition wall 342 provided to stand perpendicular to the base part 341.

The partition bracket 340 has a cell case fixing portion 343. Like the base part 341, the cell case fixing portion 343 is perpendicular to the partition wall 342, but forms a gap with the bottom surface of the lower case 300. The cell case 920 is formed with a nail part which is hidden in the drawing. This nail part enters the cell case fixing portion 343, whereby the battery stack 900 is fixed to the lower case 300.

2-2. Detail of Reinforcement Structure of Lower Case

The reinforcement structure of the lower case 300 will be described in detail with reference to FIGS. 5 to 8.

Figure 5:
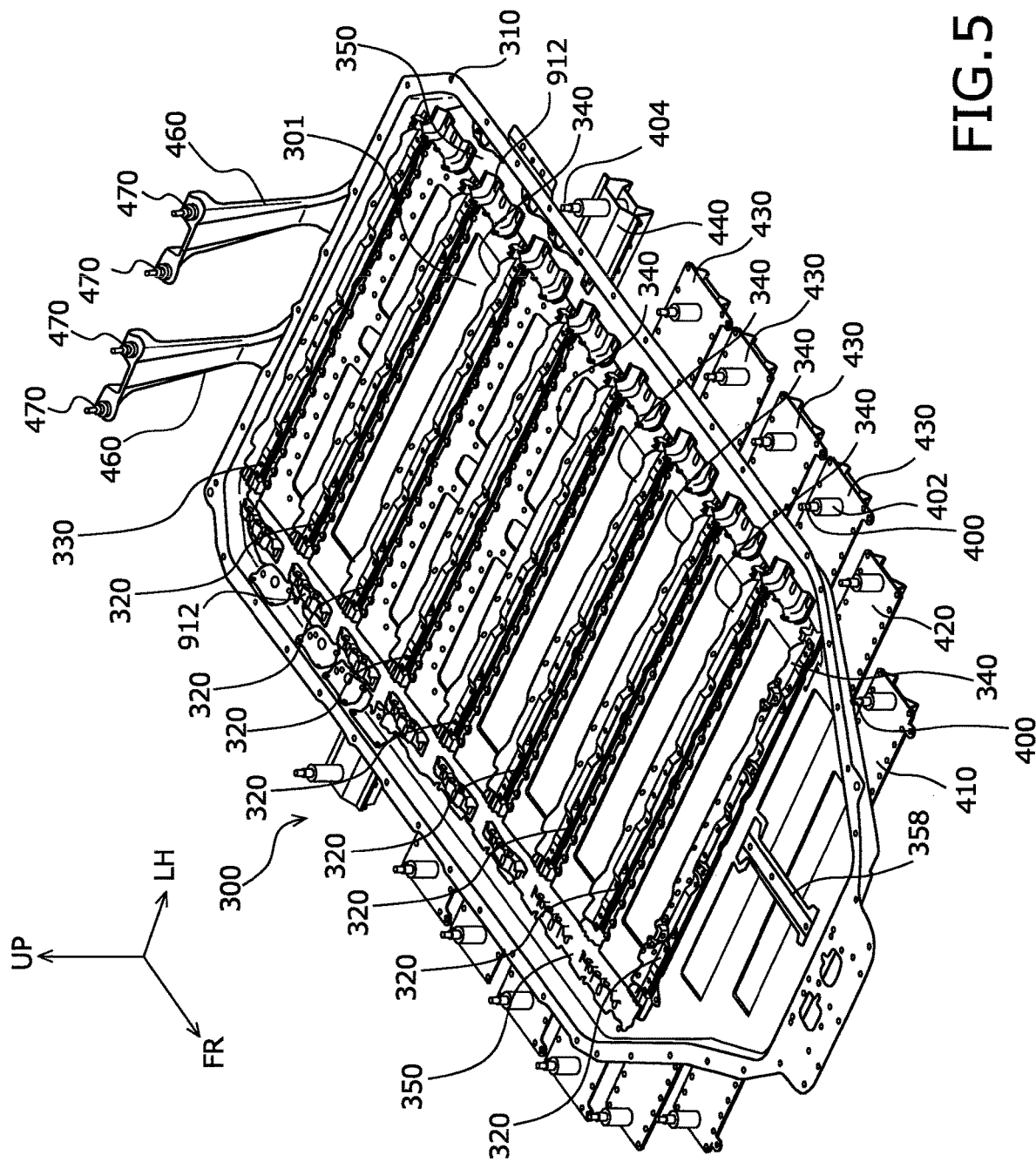
FIG. 5 is a perspective view of the lower case with the reinforcement and the arm for fixing the case attached viewed from the upper left front obliquely.

FIG. 5 is a perspective view of the lower case 300 with various reinforcement and arms for fixing the case attached viewed from the upper left front obliquely. The lower case 300 is in the form of a bathtub whose bottom, the bottom panel 301, is lower than the edge, and a flange 310 is formed at the edge. The case fixing rear arms 460 extend upwardly from the rear end of the lower case 300, although they are hidden behind other components in FIGS. 2 and 3.

The bottom panel 301 of the lower case 300 is provided with a plurality of inner crosswise reinforcements 320. The inner crosswise reinforcements 320 are arranged side by side in the front-rear direction of the lower case 300 with their longitudinal direction oriented in the width direction of the lower case 300. The rear end of the bottom panel 301 of the lower case 300 is provided with a differently shaped inner crosswise reinforcement 330.

The inner crosswise reinforcements 320, 330 has a length from the right end to the left end of the bottom panel 301 in the width direction of the lower case 300. As will be explained in more detail below, the inner crosswise reinforcement 320 has a downwardly open hat-shaped cross-section and the inner crosswise reinforcement 330 has a Z-shaped cross-section. The inner crosswise reinforcements 320 330 are welded to the bottom panel 301 of the lower case 300. The partition brackets 340 are bonded to the inner crosswise reinforcements 320, 330 by fasteners.

The bottom panel 301 of the lower case 300 is shallower at its distal end than at other locations. An inner tip lengthwise reinforcement 358 extending in the front-rear direction of the lower case 300 is provided at the distal end portion of the bottom panel 301 of the lower case 300.

Fixing bases 350 extending in the front-rear direction of the lower case 300 are provided on both sides in the width direction of the bottom panel 301 of the lower case 300. The fixing base 350 is bonded to the bottom panel 301 of the lower case 300, for example by welding. The fixing base 350 is a member for fixing the battery stack 900, and the stack support bracket 912 is bonded on the fixing base 350 at intervals at which the battery stack 900 is disposed. Both ends of the inner crosswise reinforcements 320, 330 overlap with the fixing bases 350.

Figure 6:
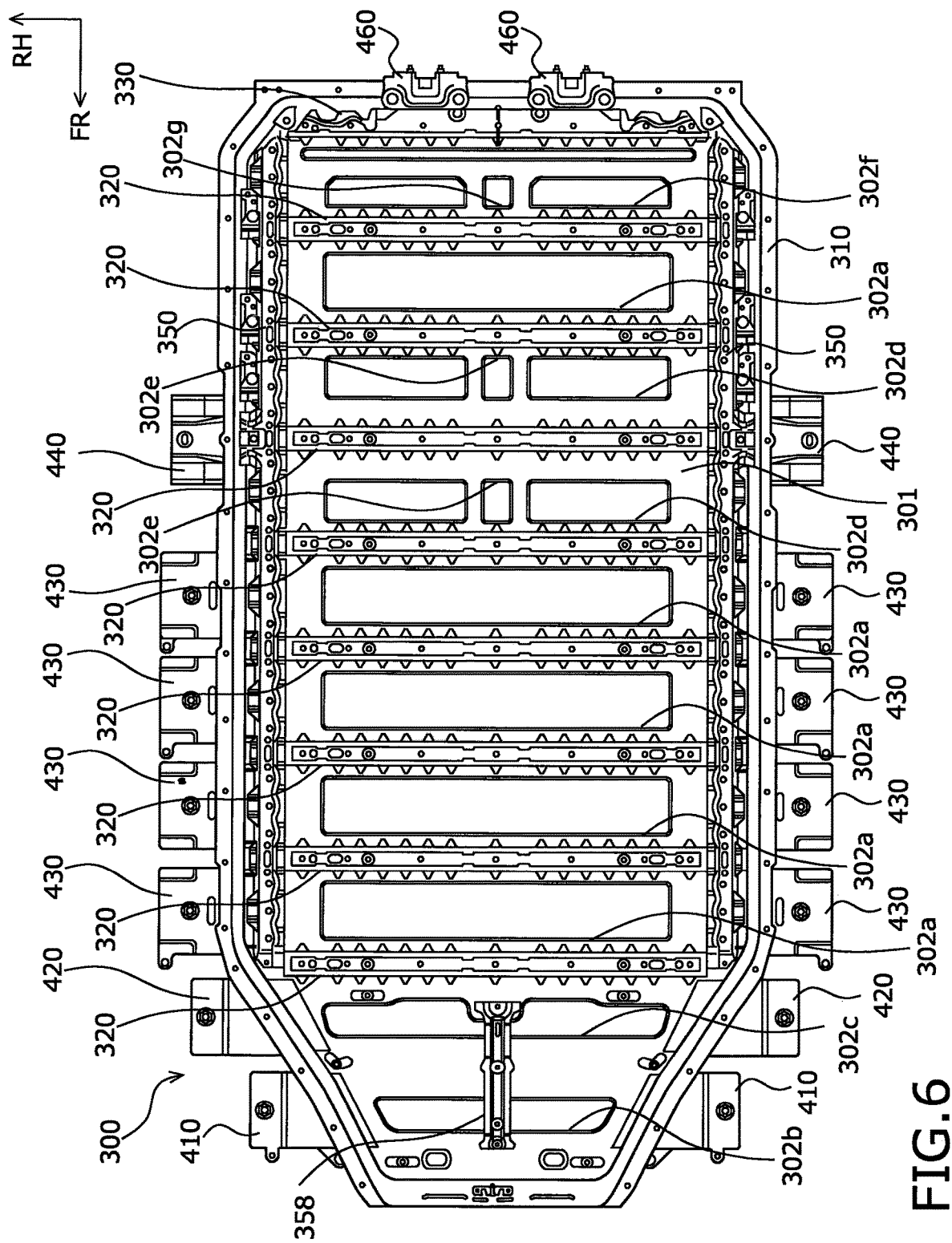
FIG. 6 is a plan view of the lower case with the reinforcement and the arm for fixing the case attached.

FIG. 6 is a plan view of the lower case 300 with various reinforcement and case fixing arms attached. A plurality of reinforcing recesses 302a-302g are formed on the inner surface of the bottom panel 301 of the lower case 300. The reinforcing recess 302a is a recess extending across the width of the lower case 300. The reinforcing recesses 302a are formed between adjacent inner crosswise reinforcements 320 from the first to fifth from the front and between the seventh and eighth inner crosswise reinforcements 320.

The reinforcing recesses 302b, 302c are provided at the distal end of the bottom panel 301 of the lower case 300. The inner tip lengthwise reinforcement 358 is bridged over the reinforcing recesses 302b, 302c.

The reinforcing recess 302e and the reinforcing recess 302d are formed between adjacent inner crosswise reinforcements 320 from the fifth to seventh from the front. The reinforcing recess 302e is formed at the center in the width direction of the lower case 300. The reinforcing recesses 302d are formed on both sides of the reinforcing recess 302e in the width direction of the lower case 300.

The reinforcing recess 302g and the reinforcing recess 302f are formed between the eighth inner crosswise reinforcement 320 and the last inner crosswise reinforcement 330. The reinforcing recess 302g is formed at the center in the width direction of the lower case 300. The reinforcing recesses 302f are formed on both sides of the reinforcing recess 302g in the width direction of the lower case 300.

Figure 7:
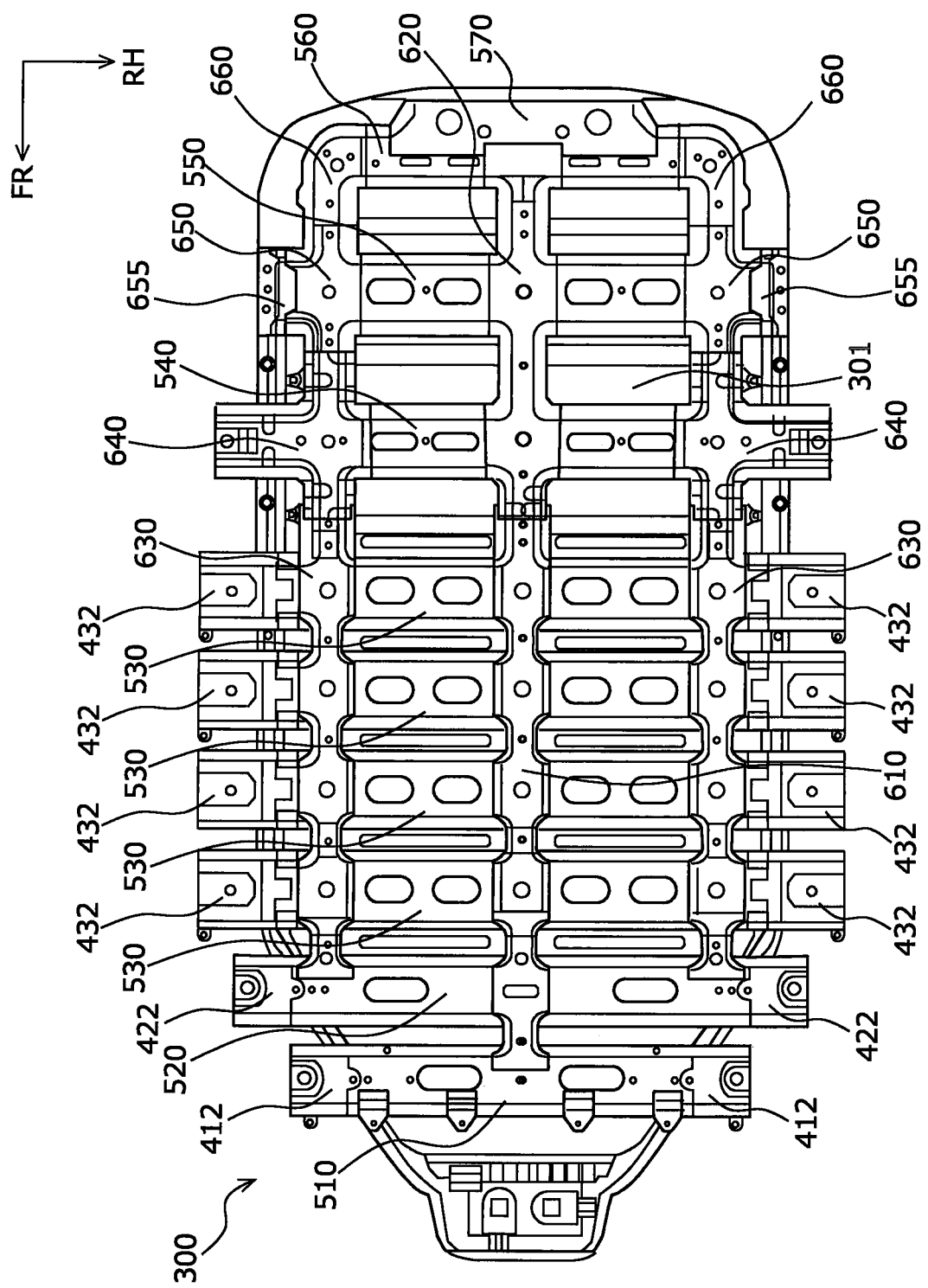
FIG. 7 is a bottom view of the lower case with the reinforcement and the arm for fixing the case attached.

FIG. 7 is a bottom view of the lower case 300 with various reinforcement and case fixing arms attached. A plurality of outer crosswise reinforcements 510, 520, 530, 540, 550, and 560 are provided on the bottom surface of the lower case 300. The outer crosswise reinforcements 510, 520, 530, 540, 550, 560 are arranged side by side in the front-rear direction of the lower case 300 with their longitudinal direction directed to the width direction of the lower case 300.

The outer crosswise reinforcements 510, 520, 530, 540, 550, 560 have a length from the right end to the left end of the bottom panel 301 in the width direction of the lower case 300. The outer crosswise reinforcements 510, 520, 530, 540, 550, 560 are wider (longer in the lateral direction) than the inner crosswise reinforcement 320 (refer to FIG. 6). As will be described in more detail below, the outer crosswise reinforcements 510, 520, 530, 540, 550, 560 have an upwardly open hat-shaped cross-section. The outer crosswise reinforcements 510, 520, 530, 540, 550, 560 are welded to the bottom panel 301 of the lower case 300.

The outer crosswise reinforcements 510, 520 are provided at the distal end portion of the bottom surface of the lower case 300. The outer crosswise reinforcement 510 is the shortest outer crosswise reinforcement and the outer crosswise reinforcement 520 is the next shorter outer crosswise reinforcement. The reinforcing recesses 302b, 302c are formed inside the portion of the bottom panel 301 to which the outer crosswise reinforcements 510, 520 are attached. Extension plates 412 extending outward in the width direction of the lower case 300 are bonded to both ends of the outer crosswise reinforcement 510. However, the extension plate 412 may be formed integrally with the outer crosswise reinforcement 510. Extension plates 422 extending outward in the width direction of the lower case 300 are bonded to both ends of the outer crosswise reinforcement 520. The extension plate 422 may be integrally formed with the outer crosswise reinforcement 520.

Four outer crosswise reinforcements 530 are closely arranged from the side of the outer crosswise reinforcement 520. The four outer crosswise reinforcements 530 are equal in length and identical in form. The reinforcing recesses 302a are formed inside the portion of the bottom panel 301 to which the outer crosswise reinforcements 530 are attached. That is, the inner five inner crosswise reinforcements 320 and the outer four outer crosswise reinforcements 530 are alternately arranged in the front-rear direction of the lower case 300. In other words, the respective outer crosswise reinforcements 530 are arranged so as to connect the two adjacent inner crosswise reinforcements 320. Extension plates 432 extending outward in the width direction of the lower case 300 are bonded to both ends of the outer crosswise reinforcements 530. However, the extension plate 432 may be formed integrally with the outer crosswise reinforcement 530.

The outer crosswise reinforcement 540 is provided on the other side of the sixth inner crosswise reinforcement 320 with the bottom panel 301 interposed therebetween. Since the outer crosswise reinforcement 540 is wider than the inner crosswise reinforcement 320, the inner crosswise reinforcement 320 falls within the width of the outer crosswise reinforcement 540 in the plan view.

The outer crosswise reinforcement 550 is located on the other side of the reinforcing recess 302a formed between the seventh and eighth inner crosswise reinforcements 320. In other words, the outer crosswise reinforcement 550 is arranged to connect the seventh and eighth inner crosswise reinforcements 320.

The outer crosswise reinforcement 560 is located at the rear end of the bottom panel 301 of the lower case 300. The outer crosswise reinforcement 560 is provided on the other side of the inner crosswise reinforcement 330 of the rear end (refer to FIG. 6) with the bottom panel 301 interposed therebetween. Since the outer crosswise reinforcement 560 is wider than the inner crosswise reinforcement 330, the inner crosswise reinforcement 330 falls within the width of the outer crosswise reinforcement 560 in the plan view.

Outer central lengthwise reinforcements 610, 620 as outer lengthwise reinforcements is provided on the bottom surface of the lower case 300. The outer central lengthwise reinforcements 610, 620 has a hat-shaped cross-section in which at least a part thereof opens upwardly. The outer central lengthwise reinforcements 610, 620 are disposed at the center in the width direction of the lower case 300 with their longitudinal direction oriented in the front-rear direction of the lower case 300.

The outer central lengthwise reinforcement 610 has a length connecting the outer crosswise reinforcement 510 and the four outer crosswise reinforcements 530. The outer central lengthwise reinforcement 610 sandwiches the outer crosswise reinforcements 510, 520, 530 with the bottom panel 301 of the lower case 300 and is welded to the bottom panel 301 of the lower case 300 together with the outer crosswise reinforcements 510, 520, 530.

The outer central lengthwise reinforcement 620 has a length connecting the outer crosswise reinforcements 540, 550, 560. The outer central lengthwise reinforcement 620 sandwiches the outer crosswise reinforcements 540, 550, 560 with the bottom panel 301 of the lower case 300 and is welded to the bottom panel 301 of the lower case 300 together with the outer crosswise reinforcements 540, 550, 560. The rear end of the outer central lengthwise reinforcement 610 and the front end of the outer central lengthwise reinforcement 620 are welded together.

Outer side lengthwise reinforcements 630, 640, 650, and outer corner reinforcements 660 are provided on both the left and right sides of the bottom surface of the lower case 300 with the outer central lengthwise reinforcements 610, 620 interposed therebetween. Each of the reinforcements 630, 640, 650, 660 has a hat-shaped cross-section in which at least a part thereof opens upwardly.

The outer side lengthwise reinforcement 630 is disposed such that its longitudinal direction is directed toward the front-rear direction of the lower case 300. The outer side lengthwise reinforcement 630 has a length connecting the outer crosswise reinforcement 520 and the four outer crosswise reinforcements 530. The outer side lengthwise reinforcement 630 sandwiches the outer crosswise reinforcements 520, 530 with the bottom panel 301 of the lower case 300, and is welded to the bottom panel 301 of the lower case 300 together with the outer crosswise reinforcements 520, 530.

The outer side lengthwise reinforcement 640 is positioned over the end of the outer crosswise reinforcement 540. The outer side lengthwise reinforcement 640 sandwiches the end of the outer crosswise reinforcement 540 with the bottom panel 301 of the lower case 300 and is welded together with the outer crosswise reinforcement 540 to the bottom panel 301 of the lower case 300. In the plan view, the outer side lengthwise reinforcement 640 has a cross shape in which the length in the width direction of the lower case 300 is longer than the length in the front-rear direction. The front end of the outer side lengthwise reinforcement 640 in the lateral direction is welded to the rear end of the outer side lengthwise reinforcement 630. One end of the outer side lengthwise reinforcement 640 in the longitudinal direction protrudes outward in the width direction of the lower case 300.

The outer side lengthwise reinforcement 650 is positioned over the end of the outer crosswise reinforcement 550. The outer side lengthwise reinforcement 650 sandwiches the end of the outer crosswise reinforcement 550 with the bottom panel 301 of the lower case 300 and is welded together with the outer crosswise reinforcement 550 to the bottom panel 301 of the lower case 300. The front end of the outer side lengthwise reinforcement 650 is welded to the rear end of the outer side lengthwise reinforcement 640. In addition, an extension plate 655 extending outward in the width direction of the lower case 300 is bonded to the outer side lengthwise reinforcement 650. However, the extension plate 655 may be formed integrally with the outer side lengthwise reinforcement 650.

The outer corner reinforcement 660 is a curved reinforcement that connects the outer side lengthwise reinforcement 650 and the outer crosswise reinforcement 560 in a curve. The outer corner reinforcement 660 is welded to the bottom panel 301 of the lower case 300. The front end of the outer corner reinforcement 660 is welded to the rear end of the outer side lengthwise reinforcement 650. The rear end of the outer corner reinforcement 660 is welded to one end of the outer crosswise reinforcement 560.

An outer rear end bracket 570 is provided on the rear end of the bottom panel 301 of the lower case 300. The outer rear end bracket 570 is a member for attaching the case fixing rear arm 460 to the lower case 300. The outer rear end bracket 570 sandwiches the outer crosswise reinforcement 560 with the bottom panel 301 of the lower case 300 and is bonded to the bottom panel 301 of the lower case 300 together with the outer crosswise reinforcement 560, for example by welding. A part of the outer rear end bracket 570 overlaps the rear end of the outer central lengthwise reinforcement 620 and is sandwiched between the outer central lengthwise reinforcement 620 and the outer crosswise reinforcement 560. The region where the outer rear end bracket 570, the outer central lengthwise reinforcement 620, and the outer crosswise reinforcement 560 are triply overlapped is bonded, for example by welding.

Figure 8:
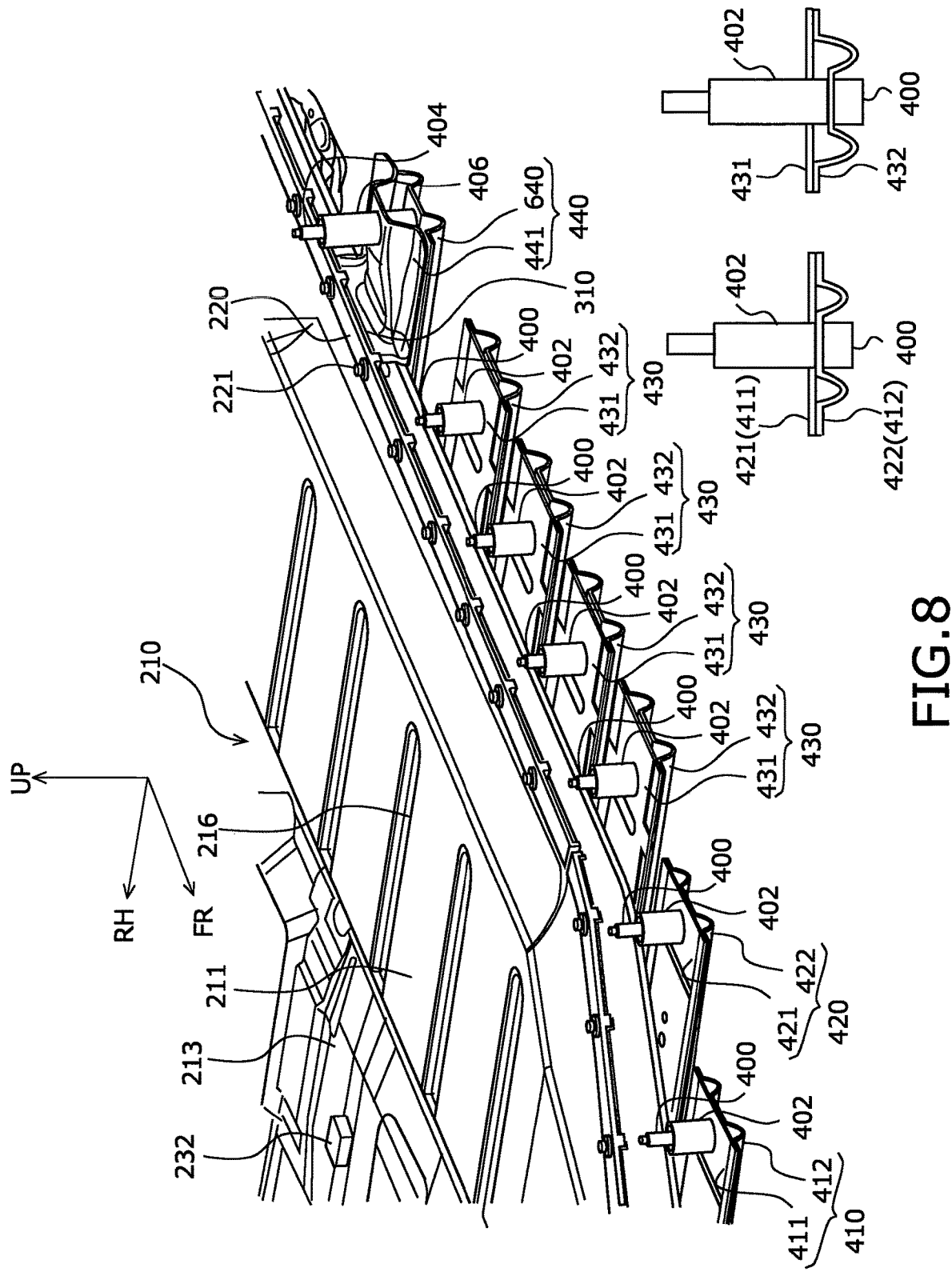
FIG. 8 is a perspective view showing the structure of the case fixing side arm and its periphery viewed from the upper left front obliquely.

FIG. 8 is a perspective view showing the structures of the case fixing side arms 410, 420, 430, 440 and their periphery viewed from the upper left front obliquely. The case fixing side arms 410, 420, 430, 440 are members for suspending the battery pack 200 under the floor of the body. Each of the case fixing side arms 410, 420, 430, 440 is composed of upper and lower members.

The case fixing side arm 410 and the case fixing side arm 420 have substantially the same shapes. The case fixing side arms 410, 420 are composed of extension plates 412, 422 having a W-shaped cross-section extending outward in the width direction of the lower case 300, and flat lid plates 411, 421 attached on the extension plates 412, 422.

The top of the central ridge of the extension plates 412, 422 are flat and serve as a pedestal on which a cylindrical collar 402 is placed. The lid plates 411, 421 are perforated to allow the collar 402 to pass therethrough. A bolt hole is formed in each pedestal of the extension plates 412, 422, and a hanging bolt 400 is attached to the pedestal. The hanging bolt 400 projects upwardly through the collar 402 from below each pedestal of the extension plates 412, 422.

The case fixing side arm 430 is composed of a extension plate 432 extending outward in the width direction of the lower case 300 and having a W-direction cross-section, and a flat lid plate 431 attached on the extension plate 432. The extension plate 432 is provided on the extension line of the outer crosswise reinforcement 530. Since there are four outer crosswise reinforcements 530, four case fixing side arms 430 are provided on each side.

The cross-section of the extension plate 432 is slightly different from the cross-section of the extension plates 412, 422. The central ridge of the extension plate 432 on which the collar 402 is seated is lower than both sides thereof. Thus, when the collar 402 is placed on a pedestal of the extension plate 432, the bottom of the collar 402 is slightly submerged below the lid plate 431.

The case fixing side arm 440 is composed of a portion projecting from the outer side lengthwise reinforcement 640 outward in the width direction of the lower case 300, and a lid plate 441 having a hat-shaped cross-section attached on the outer side lengthwise reinforcement 640 and opened downward. The portion constituting the case fixing side arm 440 of the outer side lengthwise reinforcement 640 has an upwardly open W-shaped cross-section.

The top of the central ridge of the W-shape of the outer side lengthwise reinforcement 640 is flat and serves as a pedestal on which a cylindrical collar 406 is placed. The lid plate 441 is perforated with the collar 406. The collar 406 used here is longer than the collar 402 used elsewhere. Thus, the hanging bolt 404 used here is longer than the hanging bolt 400 used elsewhere.

2-3. Structure of Middle Frame

Next, the structure of the middle frame will be described with reference to FIGS. 9 and 10.

Figure 9:
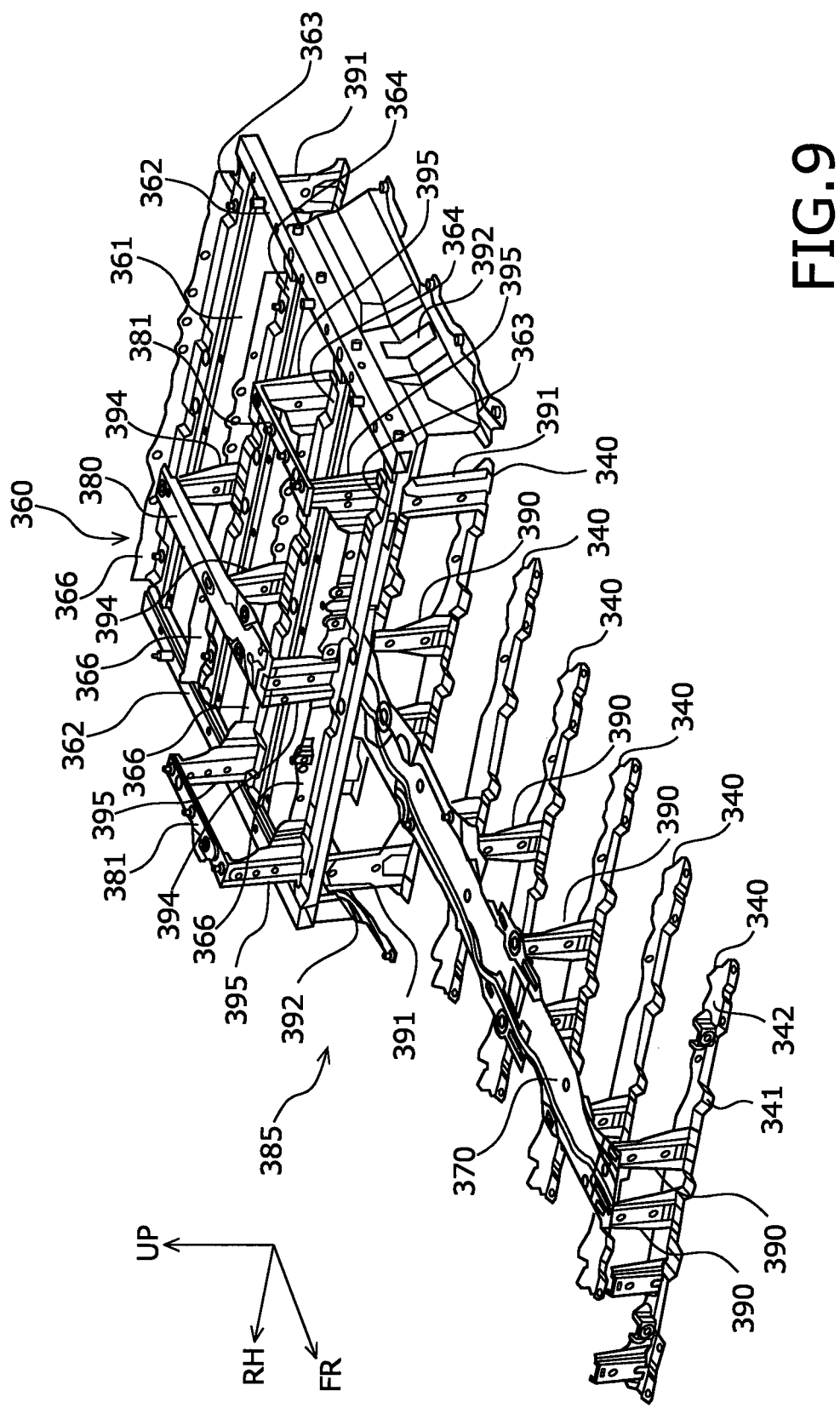
FIG. 9 is a perspective view of the middle frame and its supporting structure viewed from the upper left front obliquely.

FIG. 9 is a perspective view showing the middle frame 385 and its supporting structure viewed from the upper left front obliquely. The middle frame 385 includes the second floor 360 and the center plate 370. The second floor 360 is surrounded by four frames 362, 363. Second floor lengthwise frames 362 are disposed on the left side and the right side of the battery pack 200, respectively. Second floor crosswise frames 363 are disposed on the front side and rear side in the front-rear direction of the battery pack 200, respectively.

Two pieces of second floor center frames 364 are arranged at equal intervals between the front and rear second floor crosswise frames 363. Both ends of the respective second floor center frames 364 are connected to the left and right second floor lengthwise frames 362. As a result, the second floor 360 is divided into three rectangular regions. Each of the rectangular regions is provided with a second floor panel 361.

The central plate 370 is located at the center in the width direction of the battery pack 200 and extends from the second floor 360 toward the front of the battery pack 200. The center plate 370 and the second floor 360 are bonded to each other by fastener, for example. The center plate 370 has a hat-shaped cross-section.

The center plate 370 and the second floor 360 are supported by a plurality of support legs 390, 391 fixed to the partition brackets 340. The partition bracket 340 is a member for partitioning the battery stacks 900 arranged on the bottom panel 301 of the lower case 300, and is disposed at regular intervals in the front-rear direction of the battery pack 200. One or two support legs 390 are welded near the center of each partition bracket 340. The support leg 390 is a member having a Z-shaped shape in a side view, and has a hat-shaped cross-section open toward the rear. These support legs 390 are arranged in two rows in the front-rear direction of the battery pack 200. The center plate 370 is supported by the support legs 390 extending upwardly from the respective partition brackets 340.

The support legs 391 are welded to both ends of the sixth and ninth partition brackets 340 from the front in the front-rear direction of the battery pack 200. The support leg 391 is a member having a Z-shaped shape in a side view, and has a hat-shaped cross-section open toward the rear. However, the support leg 391 is wider than the support leg 390. The support leg 391 extending from the sixth partition bracket 340 is bonded to the anterior second floor crosswise frame 363. The support leg 391 extending from the ninth partition bracket 340 is bonded to the posterior second floor crosswise frame 363. As a result, the second floor 360 is indirectly supported by the support legs 390 supporting the center plate 370, and its four corners are directly supported by the four support legs 391.

The second floor 360 is supported on both sides in the width direction thereof by the support walls 392. The support wall 392 is a wall-shaped member extending in the front-rear direction and the vertical direction of the battery pack 200, and is bonded to the second floor lengthwise frame 362 by, for example, a fastener. That is, the second floor 360 is supported by a number of posts and two walls.

A partition bracket 366 is fastened to each second floor crosswise frame 363 and each second floor center frame 364 by a fastener. The partition bracket 366 has the same structure as the partition bracket 340 provided on the first floor, and has the function of partitioning the battery stacks 900 similarly to the partition bracket 340.

The support legs 394 are bonded to the first to third partition brackets 366 from the front in the front-rear direction of the battery pack 200, for example by welding. The support legs 394 is a member having a Z-shaped shape in a side view, and has a hat-shaped cross-section open toward the rear. The support leg 394 is provided near the center of each partition bracket 366. Three support legs 394 support a center beam 380 extending in the front-rear direction of the battery pack 200.

Support legs 395 are bonded to the first and second partition brackets 366 from the front in the front-rear direction of the battery pack 200, for example by welding. The support leg 395 is a member having a Z-shaped shape in a side view, and has a hat-shaped cross-section open toward the rear. However, the support leg 395 is wider than the support leg 394. The support legs 395 are provided at both ends of each partition bracket 366. The pair of support legs 395 on the left and the pair of support legs 395 on the right respectively support side beams 381 extending in the front-rear direction of the battery pack 200.

The center beam 380 and the side beam 381 are members for supporting the battery ECUs 950, 951 (refer to FIG. 3). The center beam 380 and the right side beam 381 support the battery ECU 950 and the center beam 380 and the left side beam 381 support the battery ECU 951. The structures and functions of the battery ECUs 950, 951 are not limited.

Figure 10:
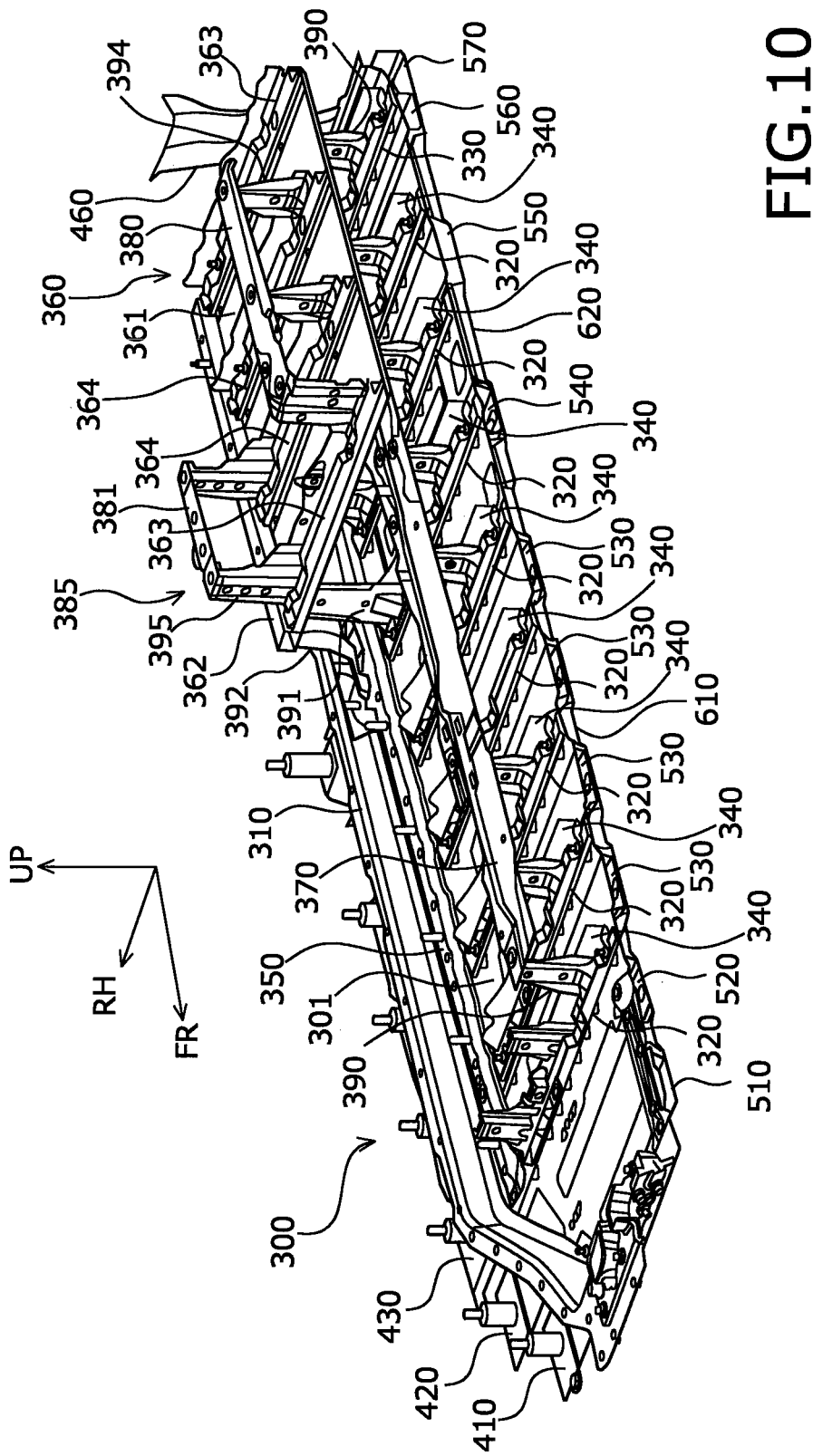
FIG. 10 is a perspective view of the lower case when the lower case is cut along the front-rear centerline of the battery pack with the middle frame attached to the lower case and viewed from the upper left front obliquely.

FIG. 10 is a perspective view of the lower case 300 viewed from the upper left front obliquely when the lower case 300 is cut along the front-rear centerline of the battery pack 200 with the middle frame 385 attached to the lower case 300. The support legs 390, 391 supporting the second floor 360 and the center plate 370 are fixed to the inner crosswise reinforcements 320, 330 via the partition brackets 340. The support wall 392 supporting the second floor 360 is fixed to the fixing base 350.

The inner crosswise reinforcements 320, 330 and the fixing base 350 are welded to the bottom pane 1301 of the lower case 300. Therefore, the support legs 390, 391 are fixed to the inner crosswise reinforcements 320, 330, and the support wall 392 is fixed to the fixing base 350, so that the second floor 360 and the center plate 370 are fixed to the bottom panel 301 of the lower case 300.

2-4. Detail of Middle Frame Supporting Structure

The supporting structure of the middle frame 385 will be described in detail with reference to FIGS. 11 to 13. However, here, the support structure of the center plate 370 as a representative of the middle frame 385, more specifically, the support structure by the support leg 390 will be described in detail.

Figure 11:
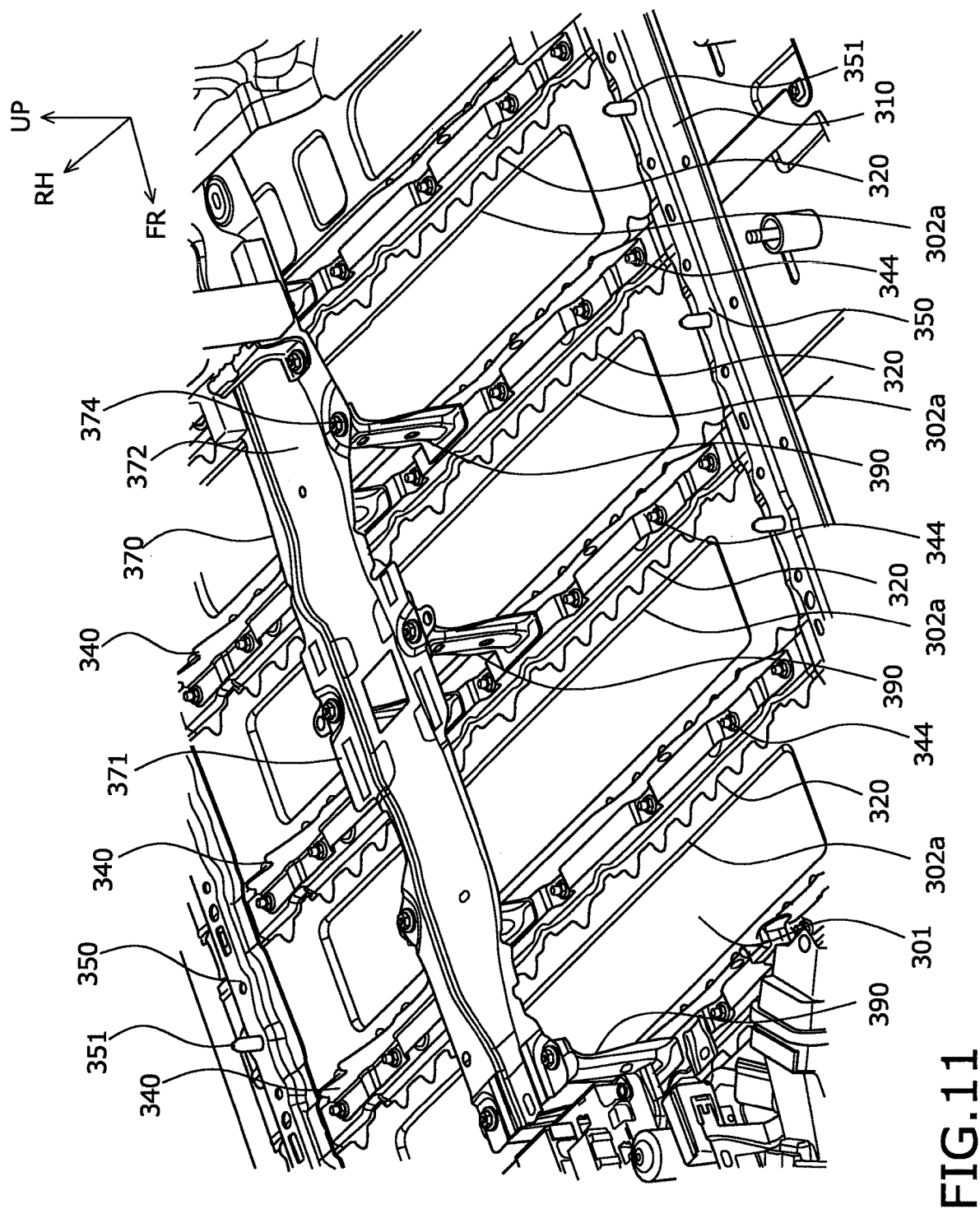
FIG. 11 is an enlarged perspective view of the lower case with the middle frame attached viewed from the upper left front obliquely.

FIG. 11 is an enlarged perspective view of the lower case 300 with the middle frame 385 attached viewed from the upper left front obliquely. The center plate 370 is a hat-shaped cross-sectional member having a flange 371 with a flat surface and a lower recess 372. The support leg 390 is fastened to the flange 371 of the center plate 370 by a fastener 374. The support leg 390 is welded to the partition bracket 340. The partition bracket 340 is fastened to the inner crosswise reinforcement 320 by fasteners 344.

Figure 12:
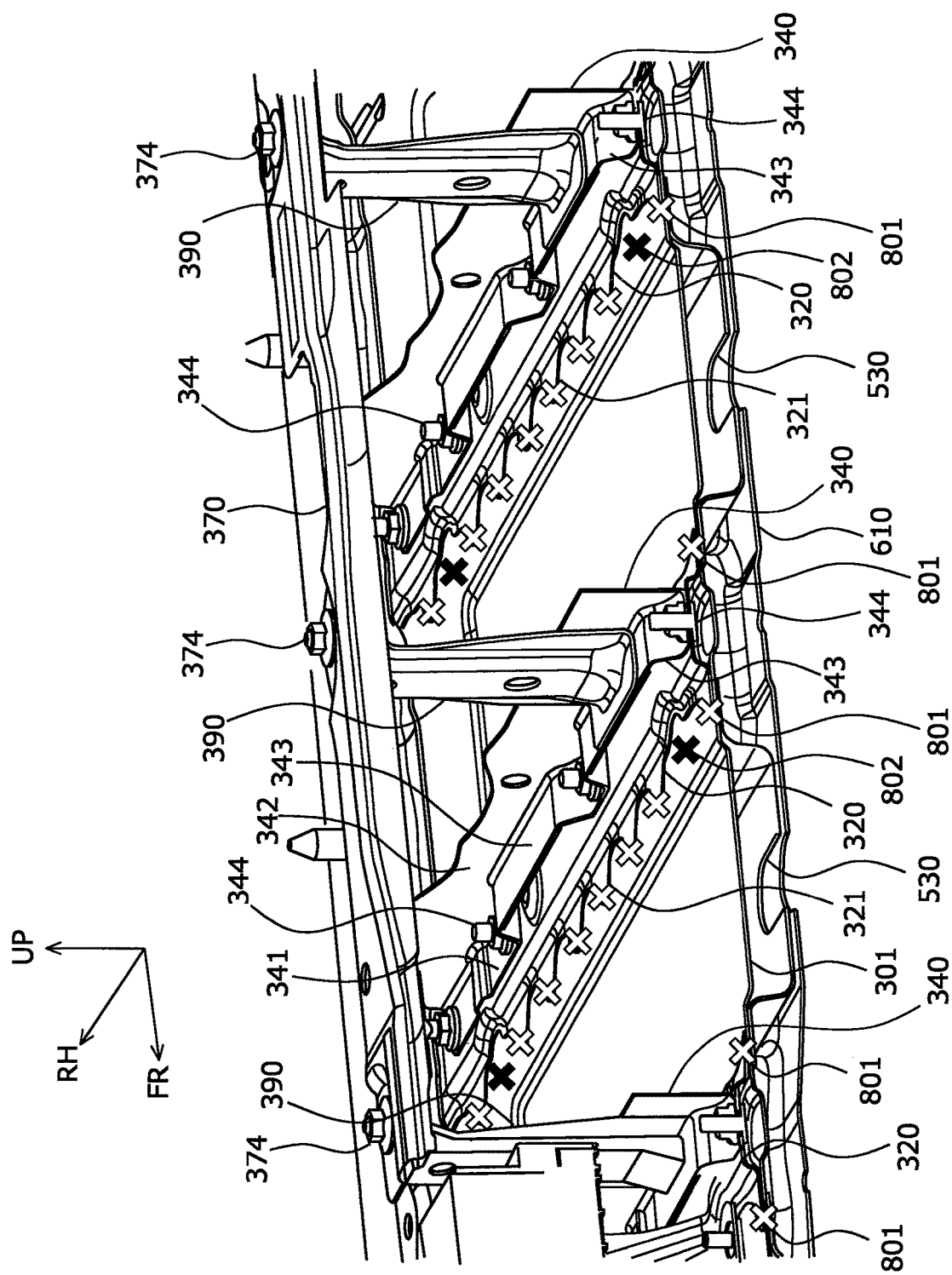
FIG. 12 is an enlarged perspective view of the front portion of the lower case viewed from the upper left front obliquely when the lower case is cut along the front-rear centerline of the battery pack with the middle frame attached to the lower case.

FIG. 12 is an enlarged perspective view of the front portion of the lower case 300 viewed from the upper left front obliquely when the lower case 300 is cut along the front-rear centerline of the battery pack 200 with the middle frame 385 attached to the lower case 300. In FIG. 12, the partition bracket 340 to which the support leg 390 is fixed is illustrated in an enlarged manner.

The partition bracket 340 has a base part 341, a partition wall 342, and a cell case fixing part 343. The base part 341 is a portion that is fastened to the inner crosswise reinforcement 320 by the fastener 344. A plurality of base parts 341 (seven base parts 341) are provided on the partition bracket 340.

The partition wall 342 stands perpendicular to the base part 341 and partitions the battery stacks 900. The partition wall 342 is provided on the rear side in the front-rear direction of the battery pack 200 with respect to the base part 341. The partition wall 342 also serves to support the back of the support leg 390. The height of the partition wall 342 is not uniform in the width direction of the battery stack 900.

The cell case fixing part 343 is a platform formed between adjacent two base parts 341. The cell case fixing part 343, which will be described later, has a function of fixing a nail part formed on the cell case 920 of the battery stack 900. The support leg 390 is welded onto some cell case fixing parts 343.

It should be noted that the X mark drawn in FIG. 12 indicates welding points 801, 802. A plurality of welding margins 321 are formed at substantially constant intervals on both sides in the lateral direction of the inner crosswise reinforcement 320. The open X mark located above the welding margin 321 indicates the welding point 801 to weld the inner crosswise reinforcement 320. As will be described in detail later, in the welding point 801 indicated by the open X, the welding margin 321 of the inner crosswise reinforcement 320, the bottom panel 301 of the lower case 300, and the outer crosswise reinforcement 530 are welded together.

The welding point 802 indicated by the black X is provided at a position where the outer crosswise reinforcement 530 and the outer central lengthwise reinforcement 610 cross each other in the plan view. The part close to the welding point 802 of the inner crosswise reinforcement 320 is bored out so as not to interfere with the welding point 802. As will be described in detail later, in the welding point 802 indicated by the black X mark, the bottom panel 301 of the lower case 300, the outer crosswise reinforcement 530, and the outer central lengthwise reinforcement 610 are welded together.

Figure 13:
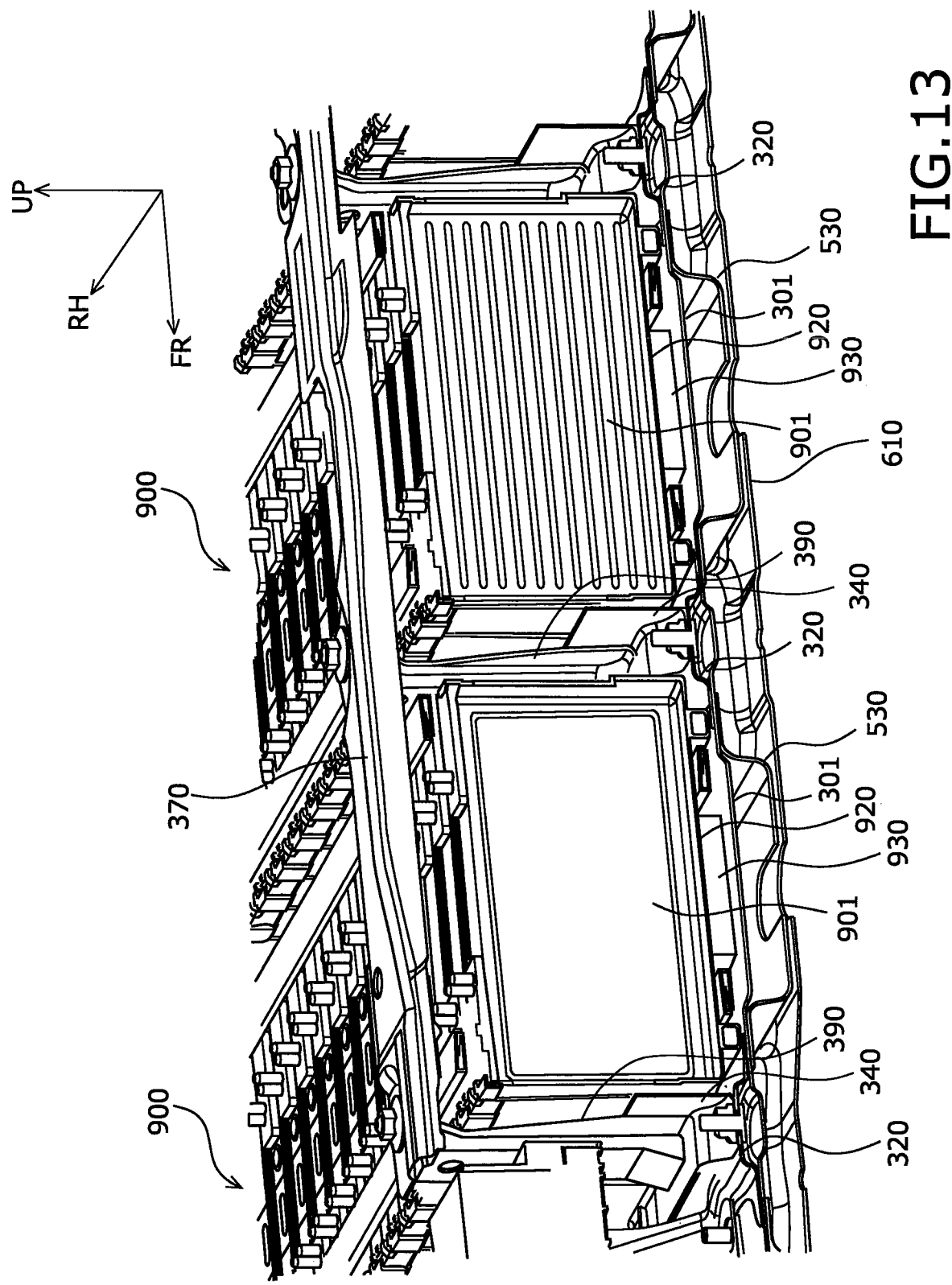
FIG. 13 is an enlarged perspective view of the front portion of the lower case viewed from the upper left front obliquely when the lower case is cut along the front-rear centerline of the battery pack with the middle frame and the battery stack attached to the lower case.

FIG. 13 is an enlarged perspective view of the front portion of the lower case 300 viewed from the upper left front obliquely when the lower case 300 is cut along the front-rear centerline of the battery pack 200 with the middle frame 385 and the battery stack 900 attached to the lower case 300. The two adjacent battery stacks 900 are separated by the partition bracket 340. The support leg 390 fixed to the partition bracket 340 extends upwardly between the two adjacent battery stacks 900.

When the middle frame 385 and the battery stack 900 are attached to the lower case 300, the center plate 370 passes over the battery stack 900. In other words, a plurality of the battery stacks 900 are disposed directly below the center plate 370 so as to be perpendicular to the center plate 370. The center plate 370 is supported by the support legs 390 protruding between the battery stacks 900. In FIG. 13, a heater 930 is provided between the battery stack 900 and the bottom panel 301. This will be described later.

2-5. Detail of Junction Structure between Reinforcements

Next, the bonding structure between reinforcements will be described in detail with reference to FIGS. 14 to 16.

Figure 14:
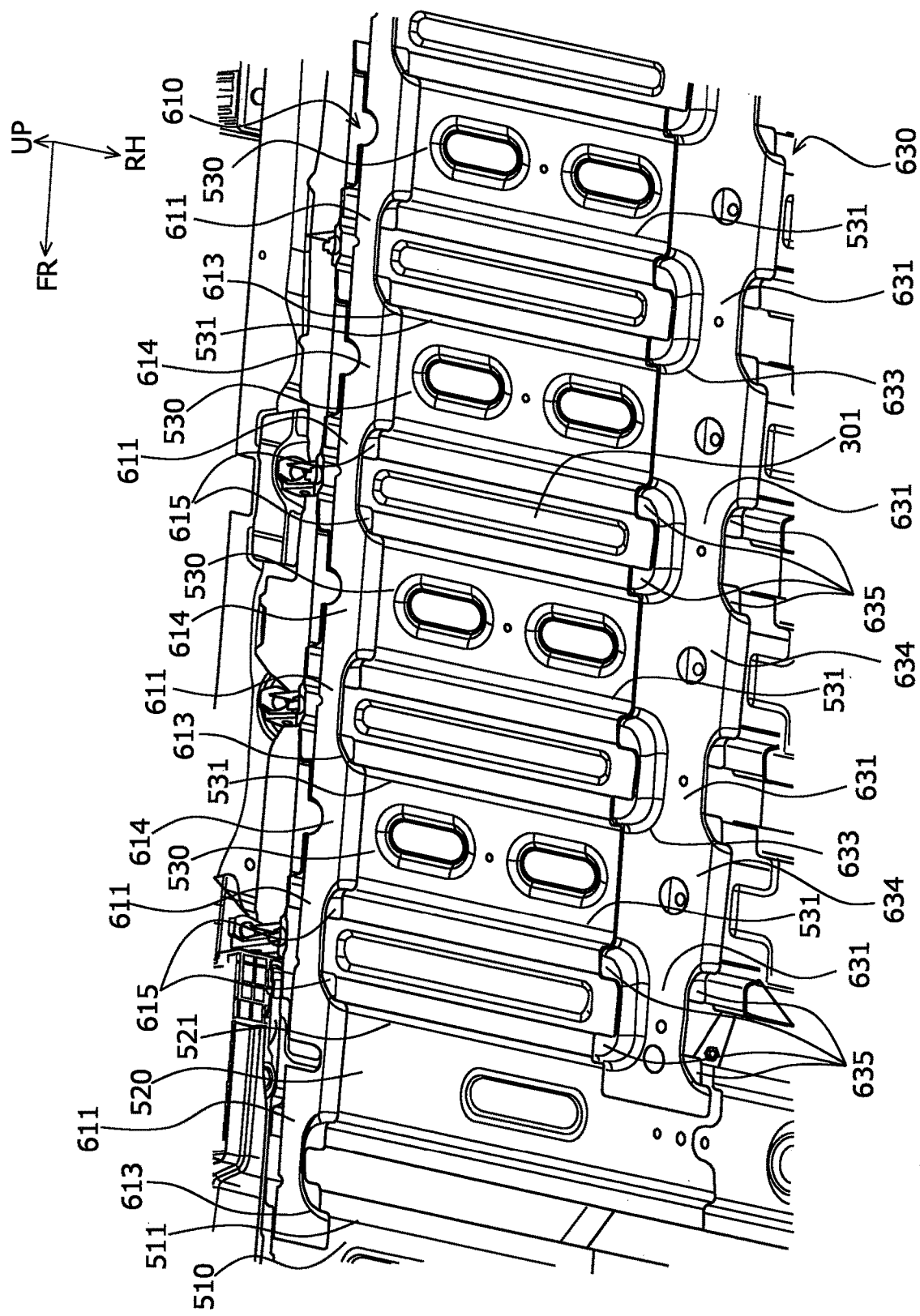
FIG. 14 is an enlarged perspective view of the front portion of the lower case viewed from the lower left obliquely when the lower case is cut along the front-rear centerline of the battery pack with the middle frame attached to the lower case.

FIG. 14 is an enlarged perspective view of the front portion of the lower case 300 viewed from the lower left obliquely when the lower case 300 is cut along the front-rear centerline of the battery pack 200 while the middle frame 385 is attached to the lower case 300. In FIG. 14, the bonding structure of the outer central lengthwise reinforcement 610 and the outer crosswise reinforcements 510, 520, 530 and the bonding structure of the outer side lengthwise reinforcement 630 and the outer crosswise reinforcements 520, 530 are depicted.

The outer central lengthwise reinforcement 610 can be divided into a bracing part 611 and a pressing part 614 according to its roles. Similarly, the outer side lengthwise reinforcement 630 can be divided into a bracing part 631 and a pressing part 634 according to its roles. Although not described, the outer central lengthwise reinforcement 620, the outer side lengthwise reinforcement 640, and 650 can also be divided into a bracing part and a pressing part according to their roles.

The pressing parts 614, 634 have a role of pressing the outer crosswise reinforcements to the bottom panel 301 of the lower case 300. In the case shown in FIG. 14, the outer central lengthwise reinforcement 610 presses the outer crosswise reinforcements 510, 520, 530 by the pressing part 614. The outer side lengthwise reinforcement 630 presses the outer crosswise reinforcements 520, 530 by the pressing part 634. The pressing parts 614, 634 are formed so as to be in close contact with the surfaces of the outer crosswise reinforcements. The pressing parts 614, 634 are bonded to the outer crosswise reinforcement surfaces by welding, adhesives, or the like.

The bracing parts 611, 631 serve as a strut between the adjoining outer crosswise reinforcement and outer crosswise reinforcement. In the examples shown in FIG. 14, the bracing part 611 of the outer central lengthwise reinforcement 610 functions as a strut between the outer crosswise reinforcement 510 and the outer crosswise reinforcement 520, between the outer crosswise reinforcement 520 and the outer crosswise reinforcement 530, and between the outer crosswise reinforcement 530 and the outer crosswise reinforcement 530. The bracing part 631 of the outer side lengthwise reinforcement 630 functions as a strut between the outer crosswise reinforcement 520 and the outer crosswise reinforcement 530 and between the outer crosswise reinforcement 530 and the outer crosswise reinforcement 530.

The bracing parts 611, 631 have an upwardly open hat-shaped cross-section. Both ends of the bracing parts 611, 631 in the front-rear direction are formed so that the widths thereof become wider as they approach the outer crosswise reinforcement, and the ridge lines 613, 633 of the bracing parts 611, 631 are continuously connected to the ridge lines of the outer crosswise reinforcements.

For example, when focusing on the bracing part 611 of the outer central lengthwise reinforcement 610, the ridge line 613 of the bracing part 611 is continuously connected to the ridge line 511 of the outer crosswise reinforcement 510 at the portion abutting the outer crosswise reinforcement 510. Further, at the portion in contact with the outer crosswise reinforcement 530, the ridge line 613 of the bracing part 611 is continuously connected to the ridge line 531 of the outer crosswise reinforcement 530. When focusing on the bracing part 631 of the outer side lengthwise reinforcement 630, the ridge line 633 of the bracing part 631 is continuously connected to the ridge line 531 of the outer crosswise reinforcement 530 at the portion abutting the outer crosswise reinforcement 530. Though not described, a portion of the bracing parts 611, 631 contacting the other outer crosswise reinforcements is also formed in the same manner.

Welding margins 615, 635 are formed at both ends of the bracing parts 611 631. For example, at the welding margin 615 in contact with the outer crosswise reinforcement 530, in particular its flange, the bottom panel 301, the outer crosswise reinforcement 530 and the outer central lengthwise reinforcement 610 are welded together. Also, at the welding margin 635 in contact with the outer crosswise reinforcement 520, in particular its flange, the bottom panel 301, the outer crosswise reinforcement 520 and the outer side lengthwise reinforcement 630 are welded together. Though not described, the welding margins 615, 635 abutting on the other outer crosswise reinforcement are also welded together with the bottom panel 301 with the other outer crosswise reinforcement interposed therebetween.

Figure 15:
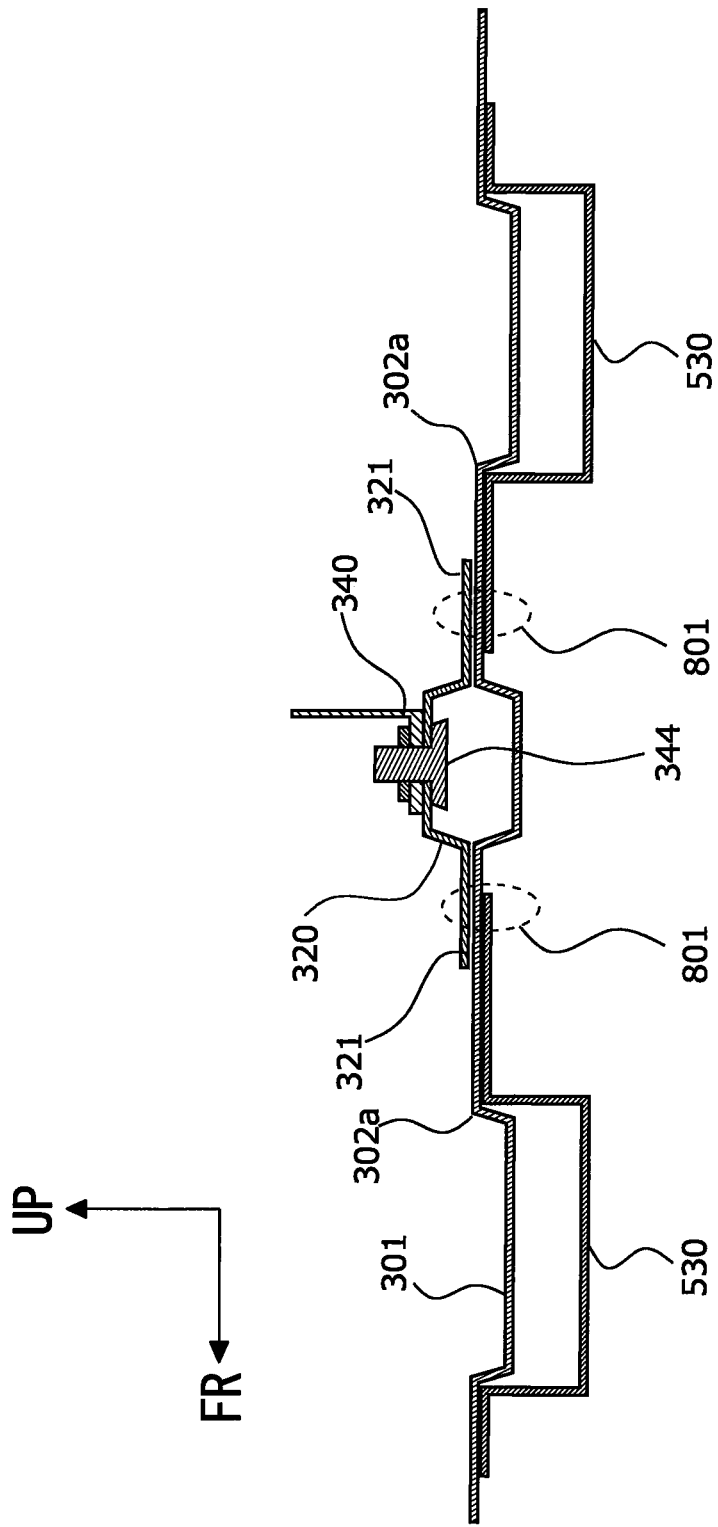
FIG. 15 is an enlarged cross-sectional view schematically showing the junction between the bottom panel of the lower case, the inner crosswise reinforcement, and the outer crosswise reinforcement.

FIG. 15 is an enlarged cross-sectional view schematically showing the junction between the bottom panel 301 of the lower case 300, the inner crosswise reinforcement 320, and the outer crosswise reinforcement 530. Again, the support leg 390 is welded to the partition bracket 340. The partition bracket 340 is fastened to the inner crosswise reinforcement 320 by fasteners 344.

The inner crosswise reinforcement 320 sandwiches the bottom panel 301 with the outer crosswise reinforcement 530. The inner crosswise reinforcement 320 is welded on its welding margin 321. The welding point 801 to be welded includes the welding margin 321 of the inner crosswise reinforcement 320, the bottom panel 301, and the outer crosswise reinforcement 530. These three plate members are bonded by welding. The outer crosswise reinforcement 530 is processed so as to overlap the reinforcing recess 302a formed on the bottom panel 301, more particularly so that mutual valley lines overlap substantially when viewed from the outside.

The welding in the same manner is also applied to welding another inner crosswise reinforcement and another outer crosswise reinforcement. For example, the inner crosswise reinforcement 320 and the outer crosswise reinforcement 520 are welded to each other with a bottom panel 301 interposed therebetween.

Figure 16:
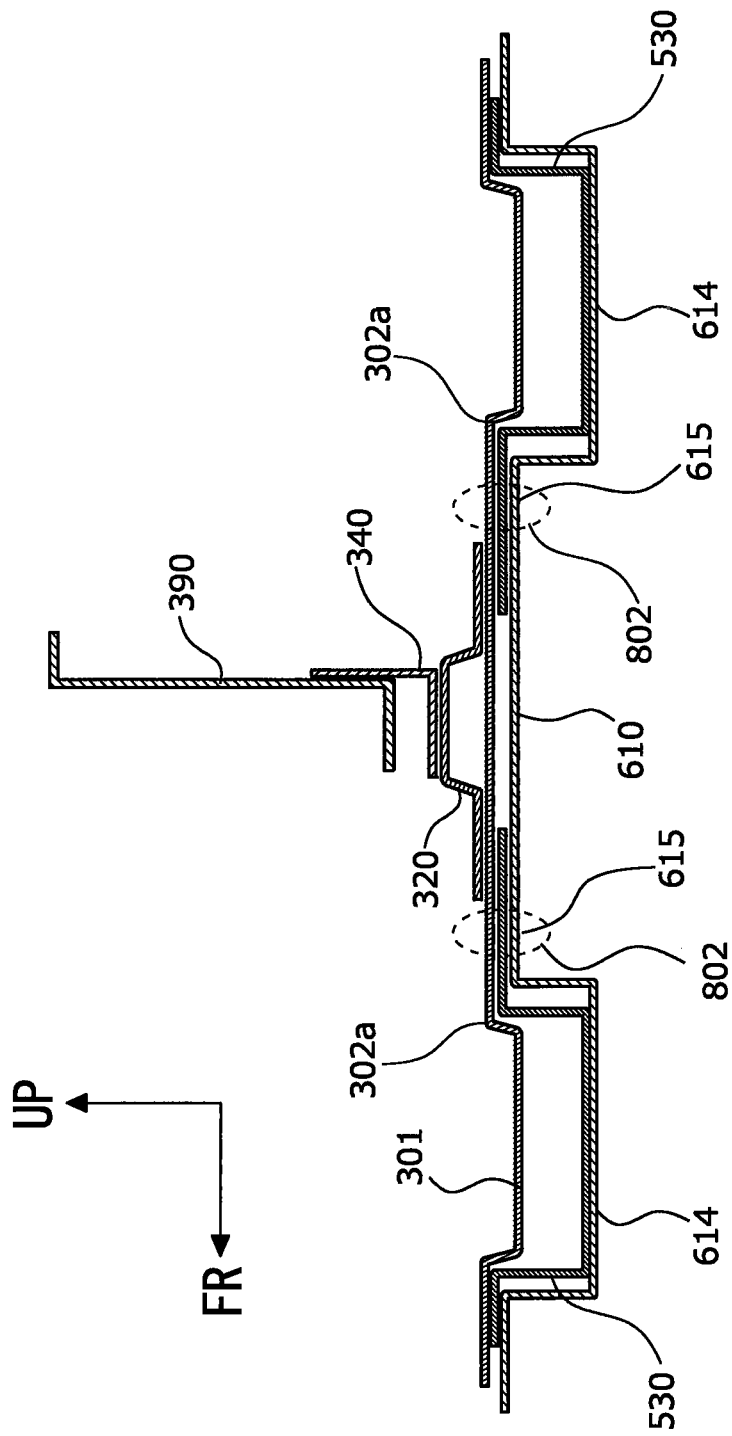
FIG. 16 is an enlarged cross-sectional view schematically showing the junction between the bottom panel of the lower case, the outer crosswise reinforcement, and the outer central lengthwise reinforcement.

FIG. 16 is an enlarged cross-sectional view schematically showing the junction between the bottom panel 301 of the lower case 300, the outer crosswise reinforcement 530, and the outer central lengthwise reinforcement 610. The outer central lengthwise reinforcement 610 sandwiches the outer crosswise reinforcement 530 with the bottom panel 301. The outer central lengthwise reinforcement 610 is welded on its welding margin 615. The welding point 802 to be welded includes the welding margin 615 of the outer central lengthwise reinforcement 610, the outer crosswise reinforcement 530, and the bottom panel 301. These three plate members are bonded by welding. The welding margin 615 of the outer central lengthwise reinforcement 610 is processed so that its valley line, when viewed from the outside, substantially overlaps the valley line of the outer crosswise reinforcement 530 in the vertical direction.

The welding in the same manner is also applied to welding another outer lengthwise reinforcement and another outer crosswise reinforcement. For example, the outer central lengthwise reinforcement 620 and the outer crosswise reinforcement 540 are welded together with the bottom panel 301.

2-6. Detail of Frame Structure of Second Floor

The frame structure of the second floor 360 will be described in detail with reference to FIGS. 17 to 19.

Figure 17:
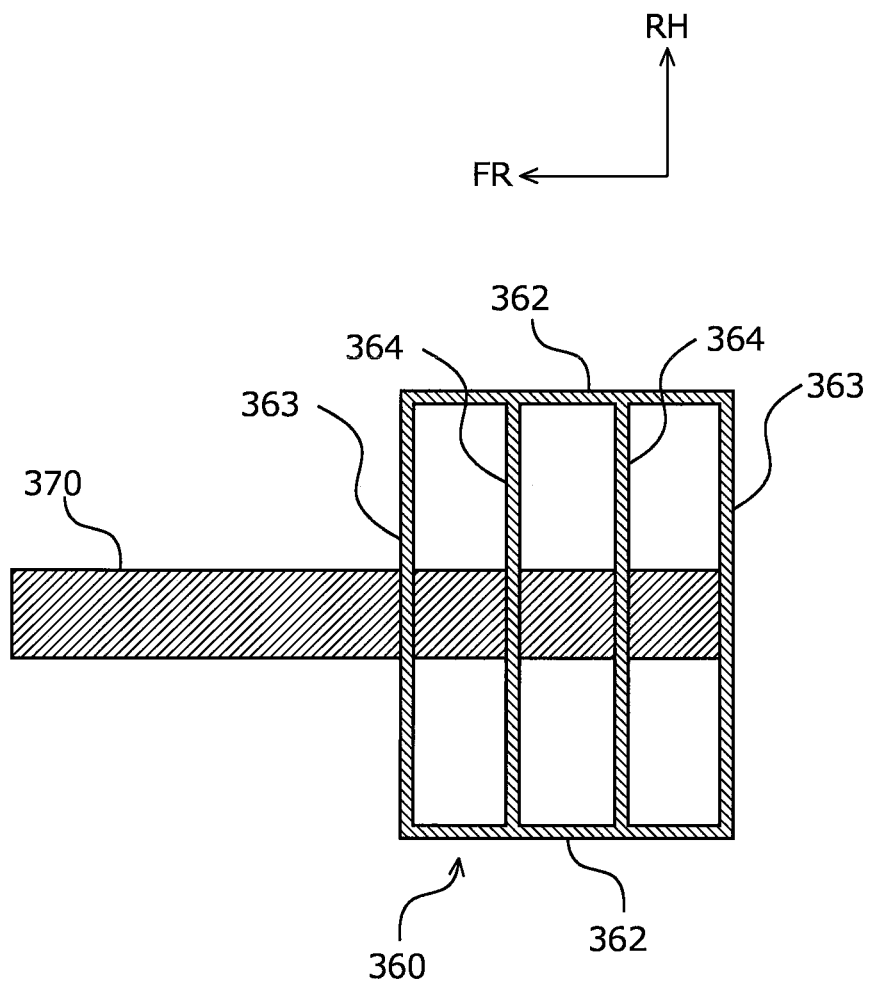
FIG. 17 is a plan view schematically showing the engagement between the center plate and the frame of the second floor.

FIG. 17 is a plan view schematically showing the engagement between the center plate 370 and the frame of the second floor 360. The outer frame of the second floor 360 is formed by the pair of second floor lengthwise frames 362 and the pair of second floor crosswise frames 363. In the outer frame, two pieces of second floor center frames 364 are arranged parallel to the second floor crosswise frame 363. Each of these frames 362, 363, 364 is made of an aluminum hollow square bar, and they are bonded to each other by fasteners, for example.

The second floor 360 rests on the center plate 370. In particular, the second floor crosswise frame 363 and the second floor center frame 364 are perpendicular to the center plate 370 and they rest on the center plate 370. The center plate 370 passes through the center of the second floor 360 and extends to the back second floor crosswise frame 363.

Figure 18:
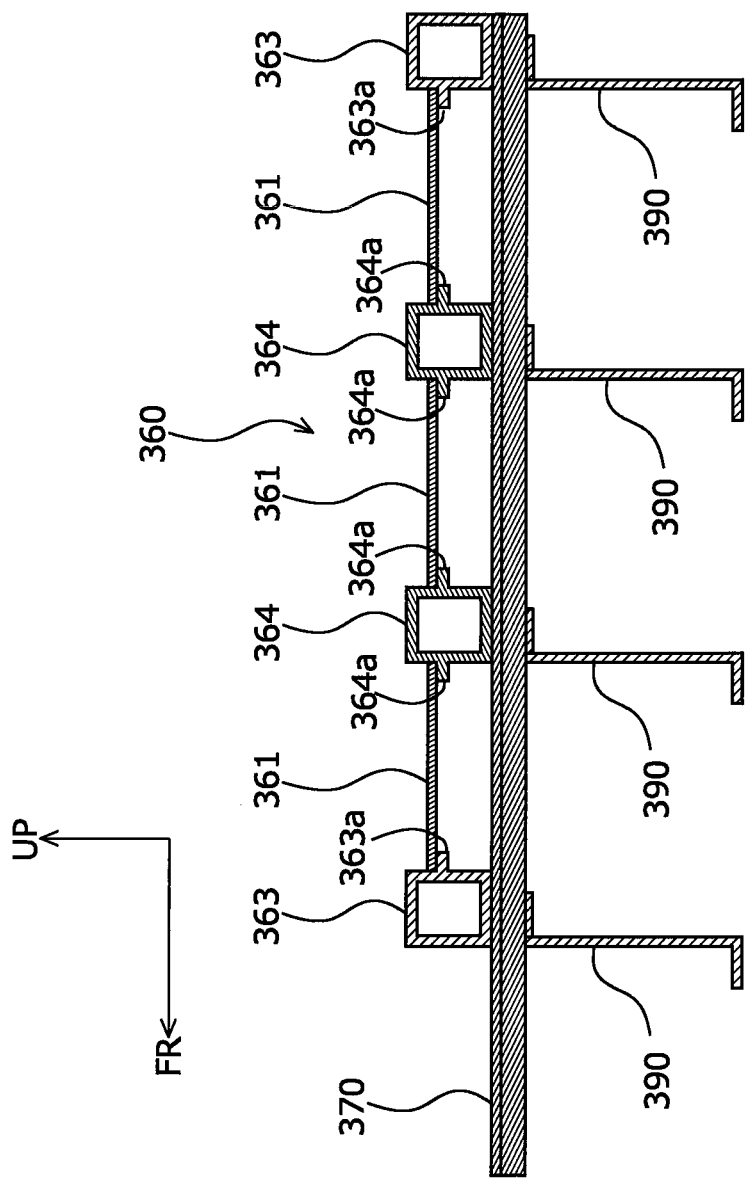
FIG. 18 is a longitudinal section view schematically showing the engagement among the center plate, the support leg, and the frame of the second floor.

FIG. 18 is a longitudinal section view schematically showing the engagement among the center plate 370, the support leg 390, and the frame of the second floor 360. The region on which the second floor 360 of the center plate 370 rests is supported by the support legs 390 having a Z-shape in side view. The second floor crosswise frames 363 and the second floor center frames 364 are disposed at portions supported by the support leg 390 of the center plate 370.

Each of the three regions defined by the second floor crosswise frames 363 and the second floor center frames 364 is provided with the second floor panel 361. A flange 363a for mounting the second floor panel 361 is formed on the second floor crosswise frame 363 on the side where the second floor panel 361 is located. A flange 364a for mounting the second floor panel 361 is formed on both sides of the second floor center frame 364.

Figure 19:
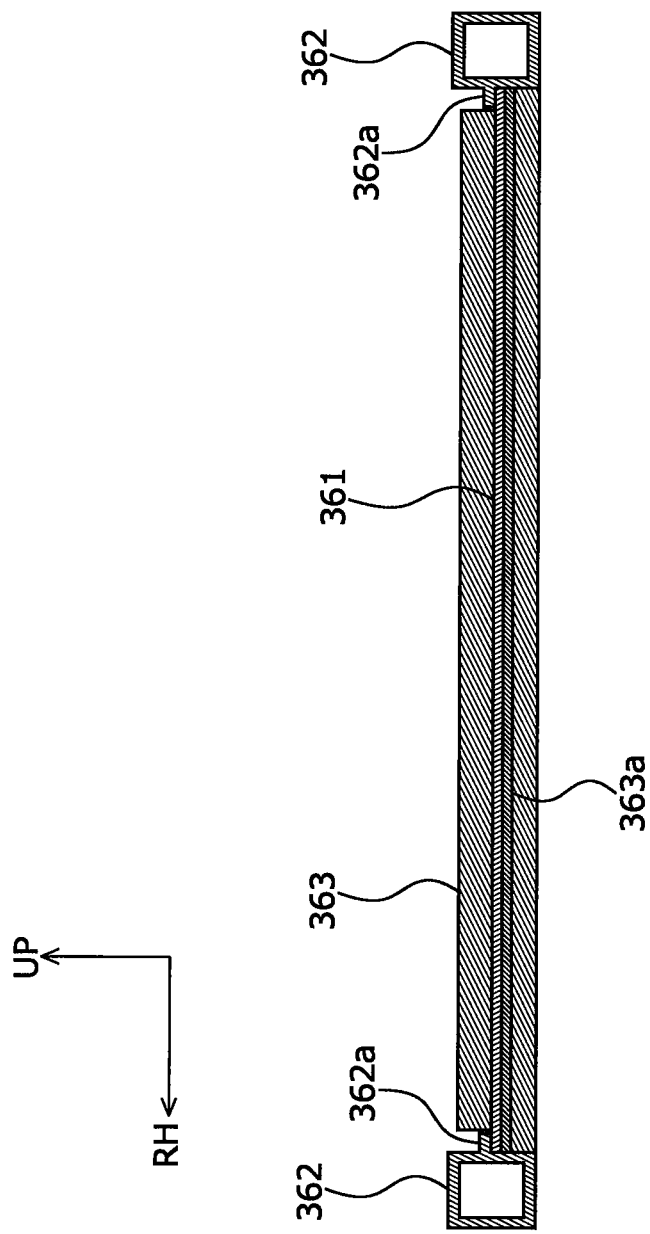
FIG. 19 is a cross section view schematically showing the structure of the second floor.

FIG. 19 is a cross section view schematically showing the structure of the second floor 360. As shown in FIG. 19, a flange 362a is formed on the second floor lengthwise frame 362 on the side where the second floor panel 361 is located. This flange 362a is located above the second floor panel 361. The second floor panel 361 is clamped and fixed between the flange 362a of the second floor lengthwise frame 362 and the flange 363a, 364a of the second floor crosswise frame 363 and second floor center frame 364.

2-7. Detail of Lower Case Rear End

The end portion of the lower case 300 will be described in detail with reference to FIGS. 20 to 25.

Figure 20:
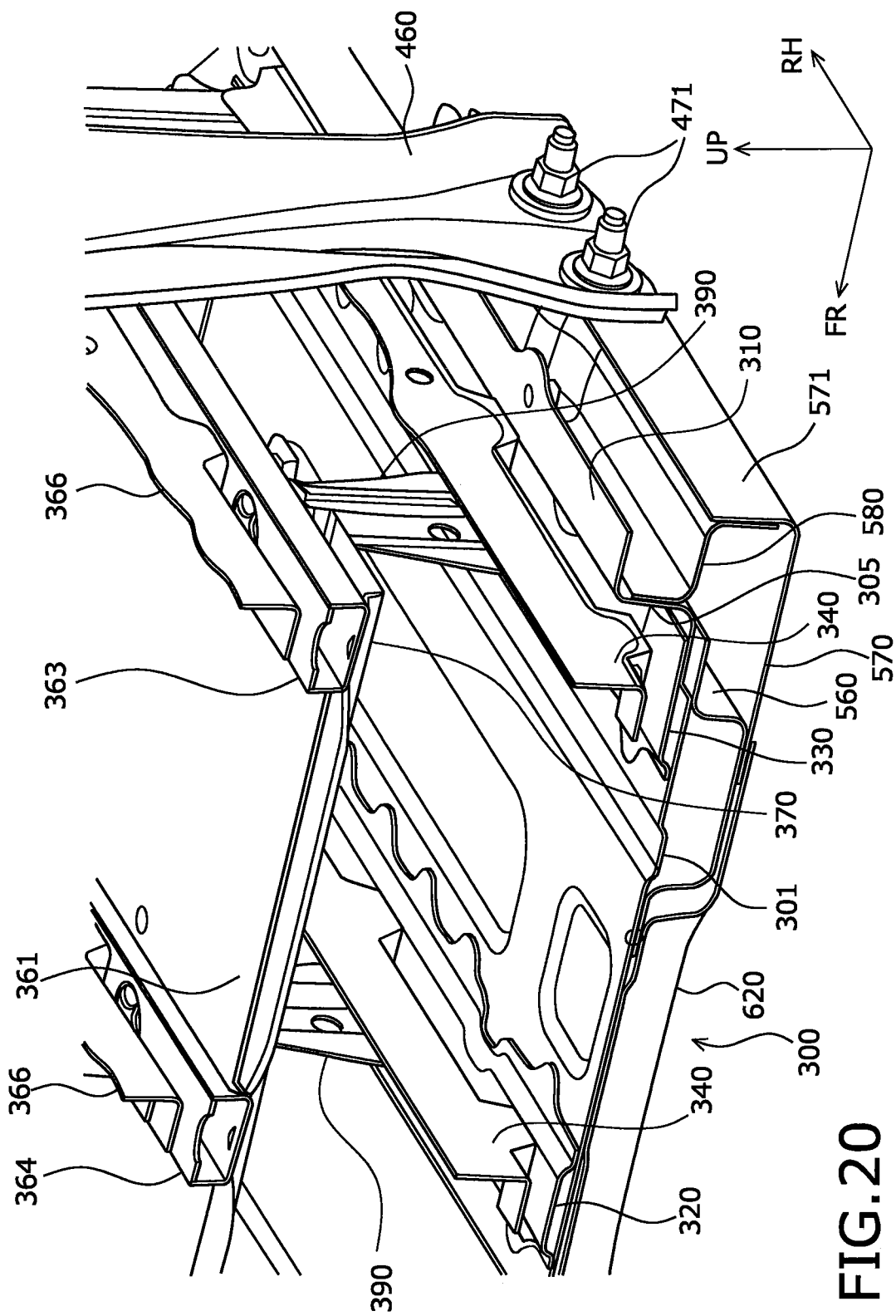
FIG. 20 is an enlarged perspective view of the rear portion of the lower case viewed from the upper left rear obliquely when the lower case is cut along the front-rear centerline of the battery pack with the middle frame attached to the lower case.

FIG. 20 is an enlarged perspective view of the rear portion of the lower case 300 viewed from the upper left rear obliquely when the lower case 300 is cut along the front-rear centerline of the battery pack 200 with the middle frame 385 attached to the lower case 300. The outer central lengthwise reinforcement 620 extends along the centerline at the outer rear of the bottom panel 301 of the lower case 300.

The outer central lengthwise reinforcement 620 overlaps the outer crosswise reinforcement 560 disposed on the rear end of the bottom panel 301 and extending in the width direction. The outer rear end bracket 570 to which the case fixing rear arm 460 is attached is disposed further rearward and outward with respect to the outer crosswise reinforcement 560. The outer central lengthwise reinforcement 620 also overlaps the outer rear end bracket 570.

The outer rear end bracket 570 protrudes rearward from the rear end of the lower case 300. A case rear face 305 of the rear end of the lower case 300 stands substantially vertically, and a bracket rear face 571 to which the case fixing rear arm 460 of the outer rear end bracket 570 is attached also stands substantially vertically. Between the rear end of the lower case 300 and the outer rear end bracket 570 is disposed a rear end inner bracket 580 having a Z-shaped cross-section in a side view. The rear end inner bracket 580 is bonded to the case rear face 305 and the bracket rear face 571 so as to connect the lower case 300 and the outer rear end bracket 570.

Figure 21:
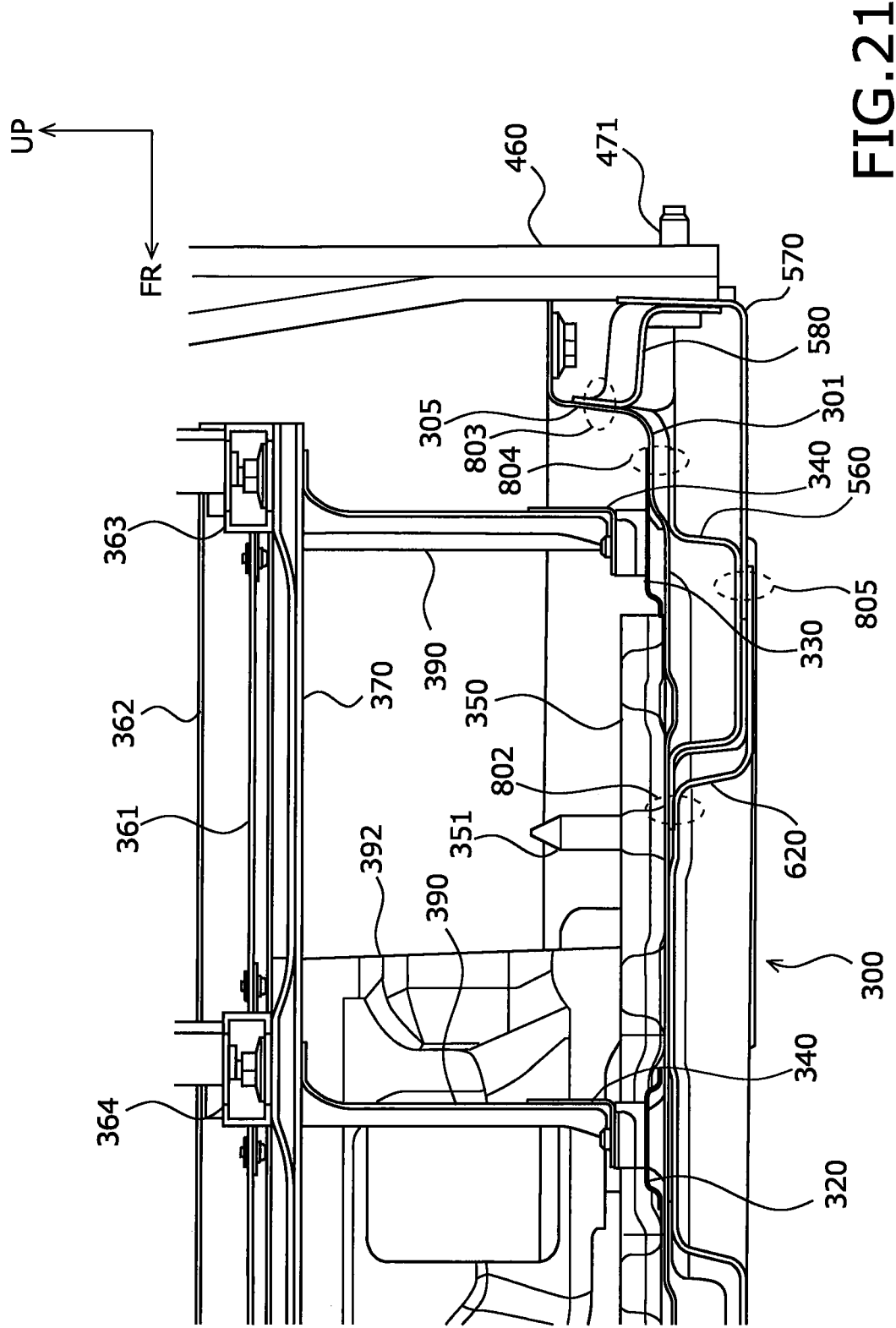
FIG. 21 is an enlarged side view of the rear portion of the lower case viewed from the left side when the lower case is cut along the front-rear centerline of the battery pack with the middle frame attached to the lower case.

FIG. 21 is an enlarged side view of the rear portion of the lower case 300 viewed from the left side when the lower case 300 is cut along the front-rear centerline of the battery pack 200 with the middle frame 385 attached to the lower case 300. The case fixing rear arm 460 is bonded to the outer rear end bracket 570 with the rear end inner bracket 580 by a fastener (bolt and nut) 471 through the outer rear end bracket 570 and the rear end inner bracket 580.

The outer rear end bracket 570 on which the case fixing rear arm 460 is mounted, together with the outer crosswise reinforcement 560, the rear end inner bracket 580 and the lower case 300, forms a closed cross-section. The outer rear end bracket 570 and the rear end inner bracket 580 are bonded by the fastener 471 as described above. When the rear end inner bracket 580 is cut in a plane perpendicular to the centerline, the cross-section in the vicinity of the centerline is a hat shape opened downward.

The lower case 300 and the outer rear end bracket 570 are welded together at a welding point 803 of the case rear face 305. The welding point 803 is provided at a plurality of locations. The outer crosswise reinforcement 560 (in particular its flange) and the lower case 300 (in particular its bottom panel 301) are welded together in a welding point 804 which also overlaps the inner crosswise reinforcement 330 (in particular its flange). The welding point 804 is provided at a plurality of locations.

The outer rear end bracket 570 and the outer crosswise reinforcement 560 are welded together with the outer central lengthwise reinforcement 620. A portion where these three plate members overlap with each other is defined as a welding point 805. The welding point 805 is provided at one or a plurality of locations. The outer central lengthwise reinforcement 620 and the outer crosswise reinforcement 560 are welded to each other in the welding point 802 overlapping with the bottom panel 301.

In FIG. 21, an alignment pin 351 is depicted which is positioned between two support legs 390 adjoining in the front-rear direction of the battery pack 200 and protrudes from the fixing base 350. This alignment pin 351 is used to position the battery stack 900. In particular, the stack support bracket 912 (refer to FIG. 4) that restricts the longitudinal motion of the battery stack 900 is attached to the alignment pin 351.

Figure 22:
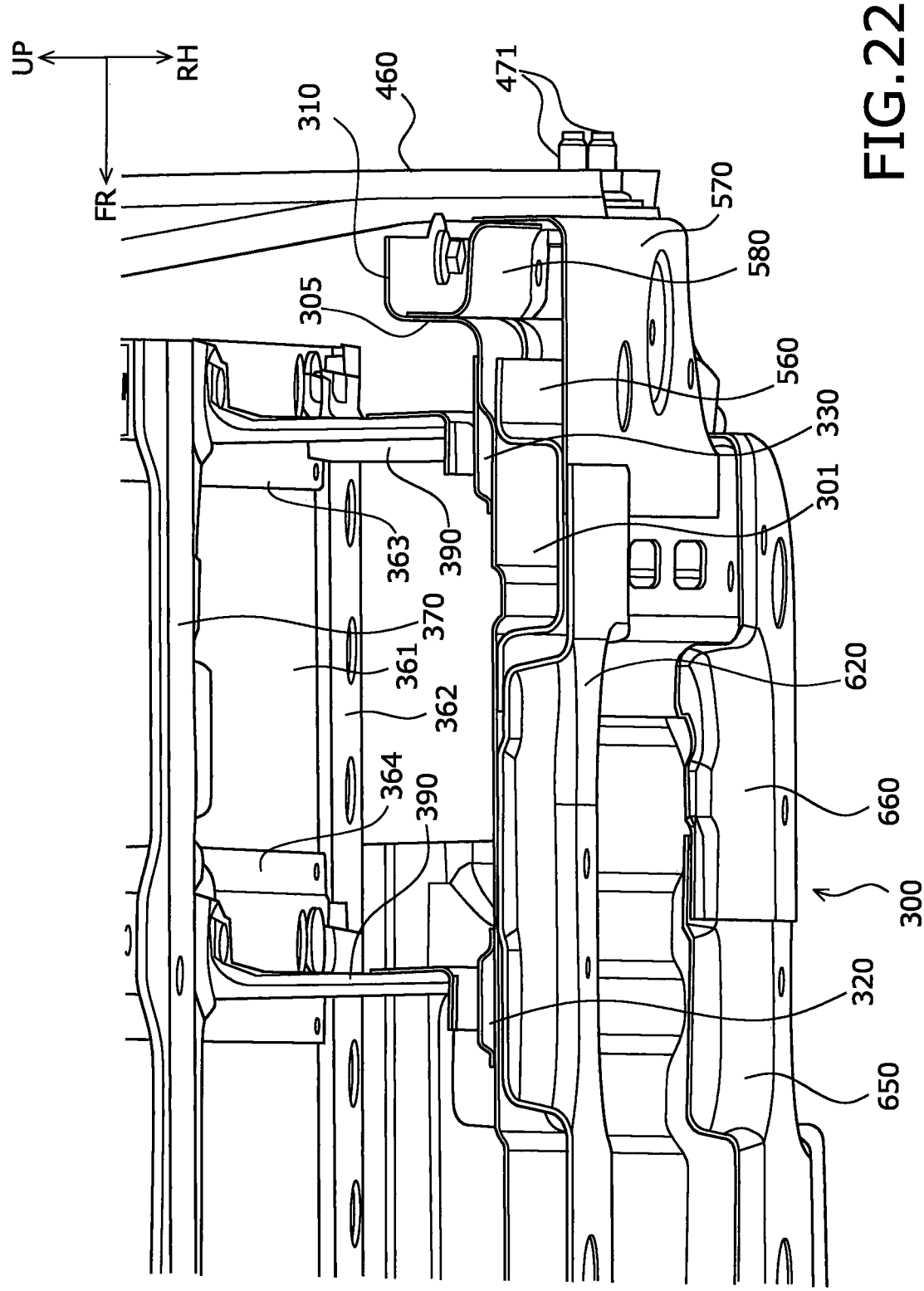
FIG. 22 is an enlarged perspective view of the rear portion of the lower case viewed from the lower left obliquely when the lower case is cut along the front-rear centerline of the battery pack with the middle frame attached to the lower case.

FIG. 22 is an enlarged perspective view of the rear portion of the lower case 300 viewed from the lower left obliquely when the lower case 300 is cut along the front-rear centerline of the battery pack 200 with the middle frame 385 attached to the lower case 300. The outer corner reinforcement 660 is bonded to the end of the outer crosswise reinforcement 560 to which the outer rear end bracket 570 is bonded.

The outer corner reinforcement 660 connects the outer crosswise reinforcement 560 extending in the width direction of the battery pack 200 and the outer side lengthwise reinforcement 650 extending in the front-rear direction of the battery pack 200. The outer corner reinforcement 660 is welded together with the outer crosswise reinforcement 560 to the bottom panel 301 at a portion overlapping the outer crosswise reinforcement 560. The outer corner reinforcement 660 is welded to the bottom panel 301 together with the outer side lengthwise reinforcement 650 at a portion overlapping the outer side lengthwise reinforcement 650.

Figure 23:
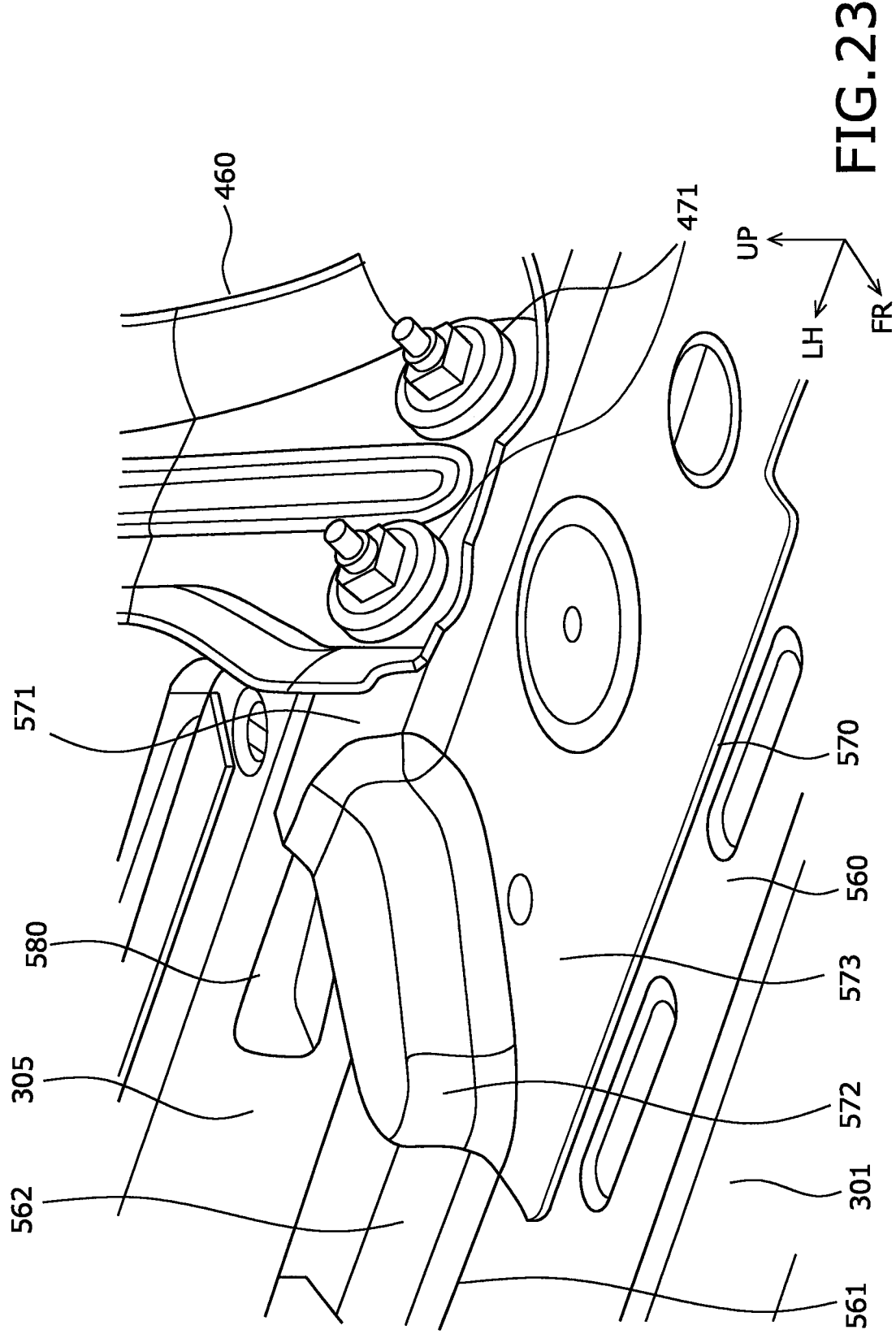
FIG. 23 is a perspective view showing the structure of the outer rear end of the lower case to which the case fixing rear arm is attached.

FIG. 23 is a perspective view showing the structure of the outer rear end of the lower case 300 to which the case fixing rear arm 460 is attached. The outer rear end bracket 570 has the bracket rear face 571 to which the case fixing rear arm 460 is fixed, and a supporting surface 573 bonded to the face of the outer crosswise reinforcement 560 and substantially perpendicular to the bracket rear face 571. The supporting surface 573 has a trapezoidal shape that gradually widens from the side of the bracket rear face 571 to the side to be bonded to the outer crosswise reinforcement 560.

The case fixing rear arm 460 has a bracket side face 572 in addition to the bracket rear face 571 and the supporting surface 573. The bracket side face 572 stands generally perpendicular to the supporting surface 573, intersects generally perpendicular to the bracket rear face 571, and is continuously connected to the rear face 562 of the outer crosswise reinforcement 560.

Figure 24:
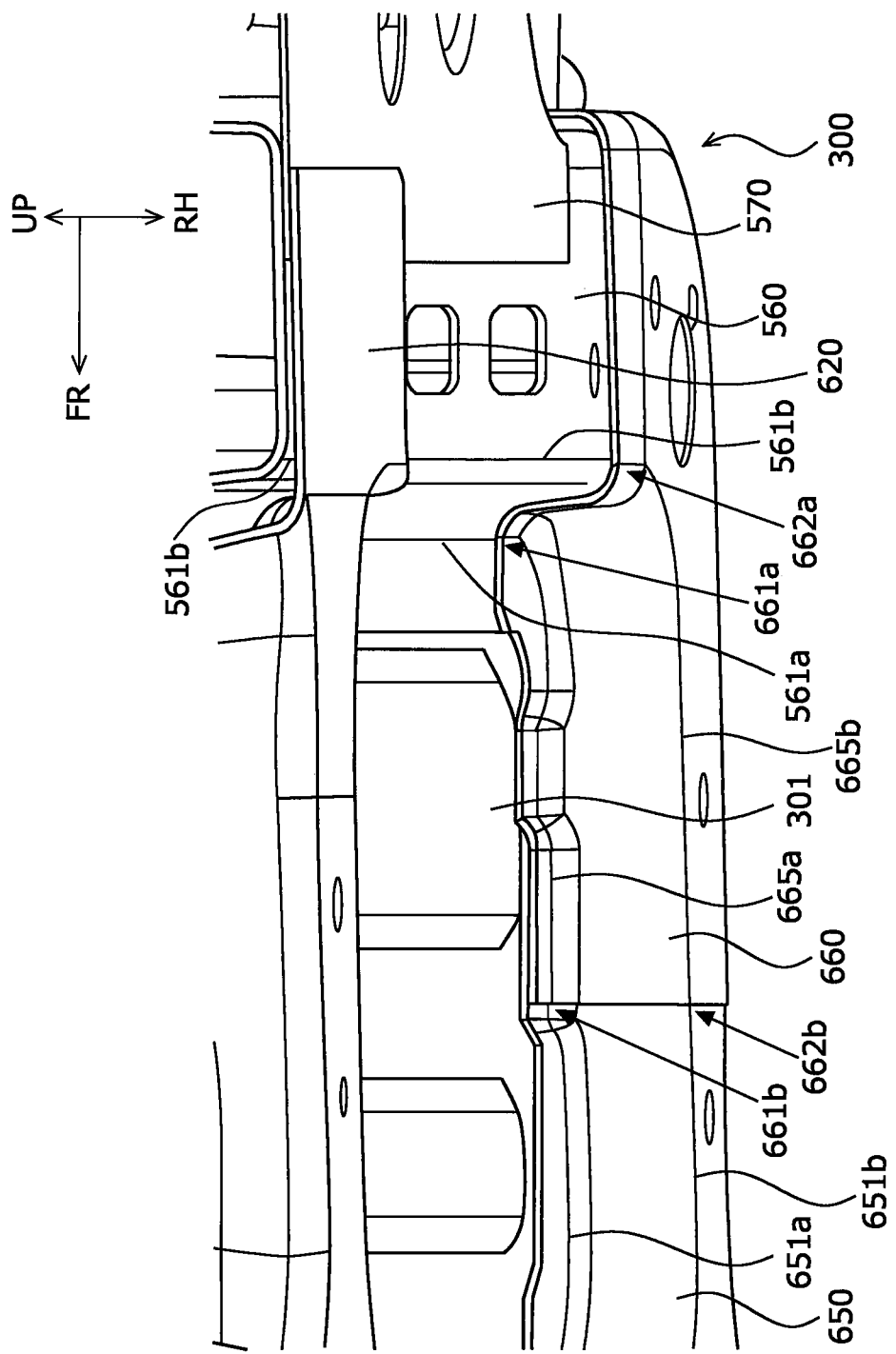
FIG. 24 is an enlarged perspective view of the bottom surface of the right rear side of the lower case when viewed from the lower left obliquely.

FIG. 24 is an enlarged perspective view of the bottom surface of the right rear side of the lower case 300 when viewed from the lower left obliquely FIG. 24 shows in detail the connection state between the outer corner reinforcement 660 and the outer crosswise reinforcement 560 and the connection state between the outer corner reinforcement 660 and the outer side lengthwise reinforcement 650 inside the corners of the outer corner reinforcement 660.

An inner valley line 665a of the outer corner reinforcement 660 is substantially continuously connected to an inner valley line 561a of the outer crosswise reinforcement 560 in an inner corner upside 661a and substantially continuously connected to an inner valley line 651a of the outer side lengthwise reinforcement 650 in an inner corner upside 661b. In addition, an inner ridge line 665b of the outer corner reinforcement 660 is substantially continuously connected to an inner ridge line 561b of the outer crosswise reinforcement 560 in an inner corner downside 662a, and substantially continuously connected to an inner ridge line 651b of the outer side lengthwise reinforcement 650 in an inner corner downside 662b.

Figure 25:
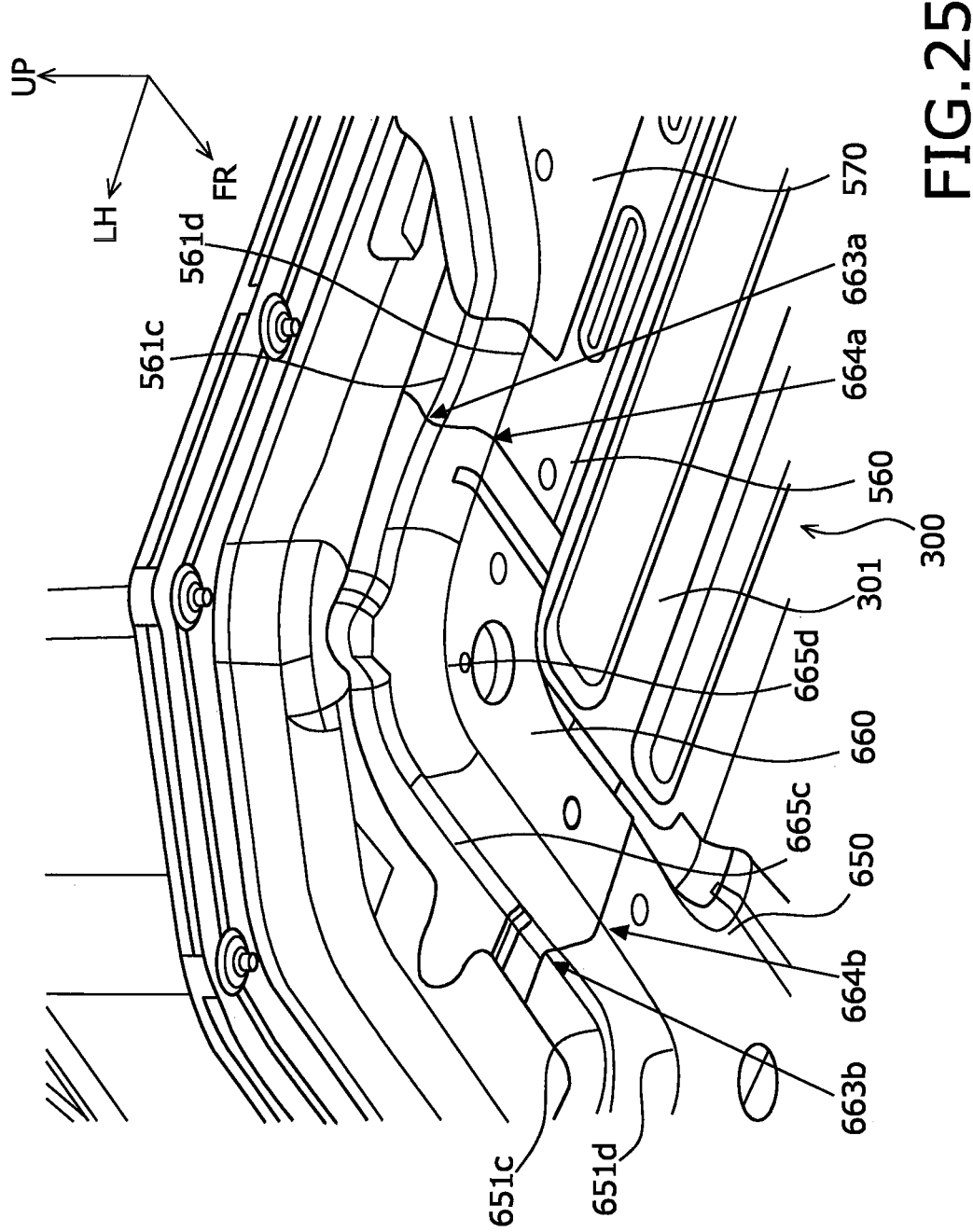
FIG. 25 is enlarged perspective view of the bottom surface of the left rear side of the lower case viewed from the lower left rear obliquely.

FIG. 25 is enlarged perspective view of the bottom surface of the left rear side of the lower case 300 viewed from the lower left rear obliquely. FIG. 25 shows in detail the connection state between the outer corner reinforcement 660 and the outer crosswise reinforcement 560 and the connection state between the outer corner reinforcement 660 and the outer side lengthwise reinforcement 650 outside the corners of the outer corner reinforcement 660.

An outer valley line 665c of the outer corner reinforcement 660 is substantially continuously connected to an outer valley line 561c of the outer crosswise reinforcement 560 in an outer corner upside 663a and substantially continuously connected to an outer valley line 651c of the outer side lengthwise reinforcement 650 in an outer corner upside 663b. In addition, an outer ridge line 665d of the outer corner reinforcement 660 is substantially continuously connected to an outer ridge line 561d of the outer crosswise reinforcement 560 in an outer corner downside 664a, and substantially continuously connected to an outer ridge line 651d of the outer side lengthwise reinforcement 650 in the outer corner downside 664b.

2-8. Heating/Cooling Device

Next, a heating/cooling device included in the battery pack 200 will be described with reference to FIGS. 26 to 29.

Figure 26:
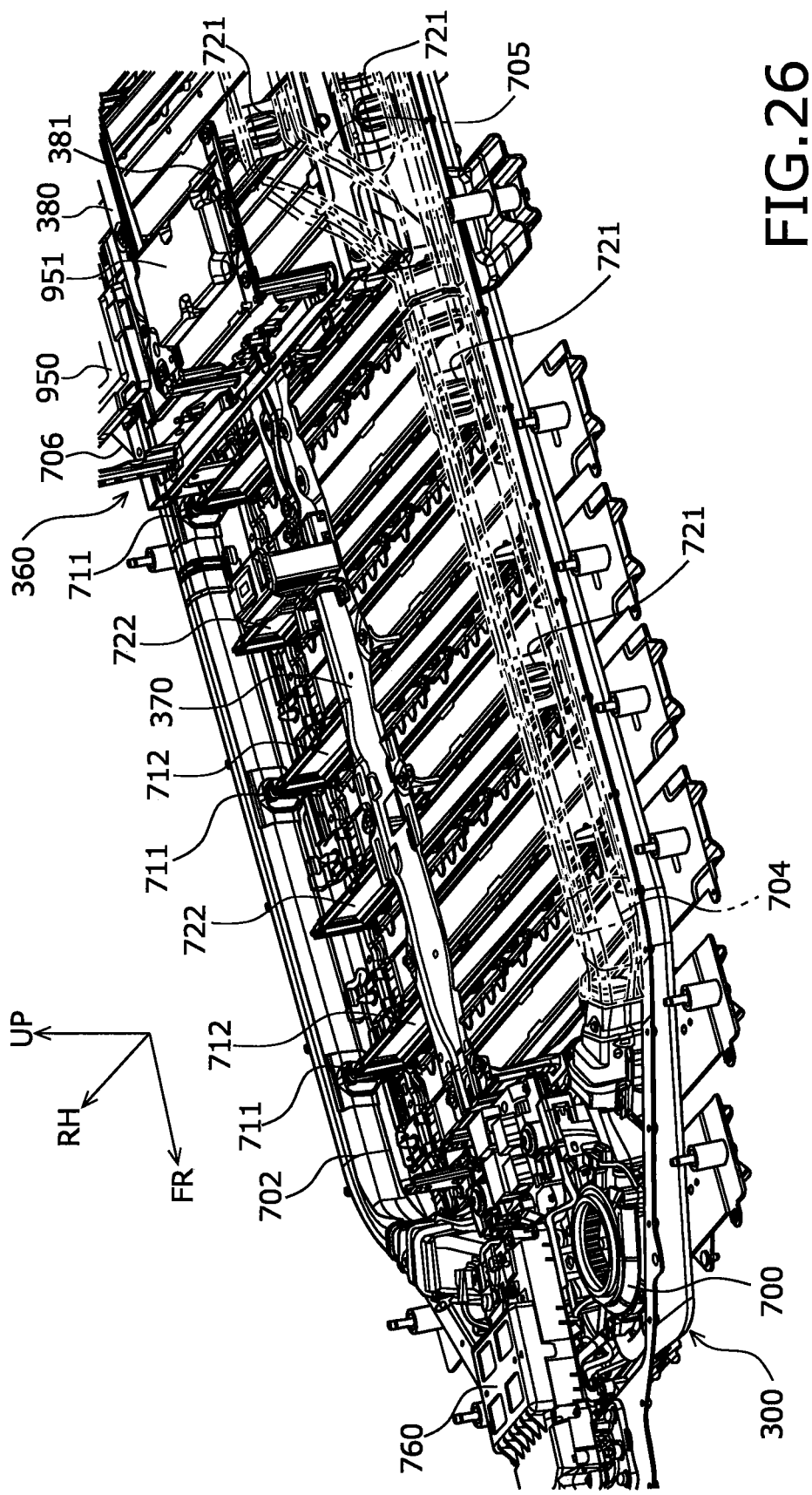
FIG. 26 is a perspective view of the lower case with the middle frame and the heating/cooling device attached viewed from the upper left front obliquely.

FIG. 26 is a perspective view of the lower case 300 with the middle frame 385 and the heating/cooling device attached viewed from the upper left front obliquely. The battery pack 200 incorporates the heating/cooling device to keep the battery stack 900 within proper operating temperatures. However, heating and cooling are performed by separate devices. Here, an overall image of the cooling device will be described with reference to FIG. 26.

A blower 700 is disposed alongside the junction box 760 at the distal end of the lower case 300. The blowers 700 are arranged in a pair on the left and right sides of the junction box 760 and located on the front side in the battery pack 200 (on the lower case 300). The air blown out from the blowers 700 is cooled by the heat exchange with refrigerant in a pair of heat exchangers (not shown), and then the air is sent into the battery pack 200 by the air ducts 702, 704, 705, 706 laid on the lower case 300. In the heat exchanger, air does not flow in or out between the outside, and the blower 700 sucks air inside the battery pack 200 and sends it again. That is, the cooler is configured as an internal air circulating device for circulating air inside the battery pack 200.

The air ducts are laid along the left and right side edges of the lower case 300. Specifically, along the left side edge of the lower case 300, a left air duct 704 extending in the front-rear direction from the blower 700 toward the rear of the lower case 300 is laid. The left air duct 704 branches off halfway to the second floor 360 and becomes a second floor left air duct 705 that blows air to the second floor 360. A right air duct 702 is laid along the right side edge of the lower case 300 and extends in the front-rear direction from the blower 700 toward the rear of the lower case 300. The right air duct 702 also branches halfway to the second floor 360 and becomes a second floor right air duct 706 that blows air to the second floor 360 (only a portion of the second floor right air duct 706 is shown in FIG. 26). That is, the air ducts 702 704, 705, 706 are arranged along the front-rear direction of the battery pack 200 on the outer side in the width direction of the plurality of the battery stacks 900.

As will be described later in detail, baffle plates 712, 722 are provided at regular intervals in the lower case 300 in the front-rear direction. This means that the baffle plates 712, 722 are installed in the gap between the adjacent battery stacks 900. Although not shown in the drawing, the baffle plates 712, 722 are also provided in the second floor 360. The air sent out from the blowers 700 is sent to the battery stacks 900 from the baffle plates 712, 722.

There are two types of baffle plates 712, 722. The first baffle plate 712 is a baffle plate that is arranged behind the odd-numbered battery stack 900 from the front, and is connected to an air distributor 711 provided on the right air duct 702. The air distributor 711 is provided for each baffle plate 712. The second baffle plate 722 is a baffle plate that is arranged behind the even-numbered battery stack 900 from the front, and is connected to an air distributor 721 provided on the right air duct 704. The air distributor 721 is provided for each baffle plate 722. The air distributors 711, 721 are also provided in the second floor 360 together with the baffle plates 712, 722 (the air distributor 722 on the second floor 360 is not shown in FIG. 26). The air distributor 711 is provided mainly for guiding the air from the front to the odd-numbered battery stack 900, and the air distributor 721 is provided mainly for guiding the air from the front to the even-numbered battery stack 900. Incidentally, the position where the air distributor is provided may be changed so that the target battery stacks 900 of the left and right air ducts 702, 704 are reversed.

Figure 27:
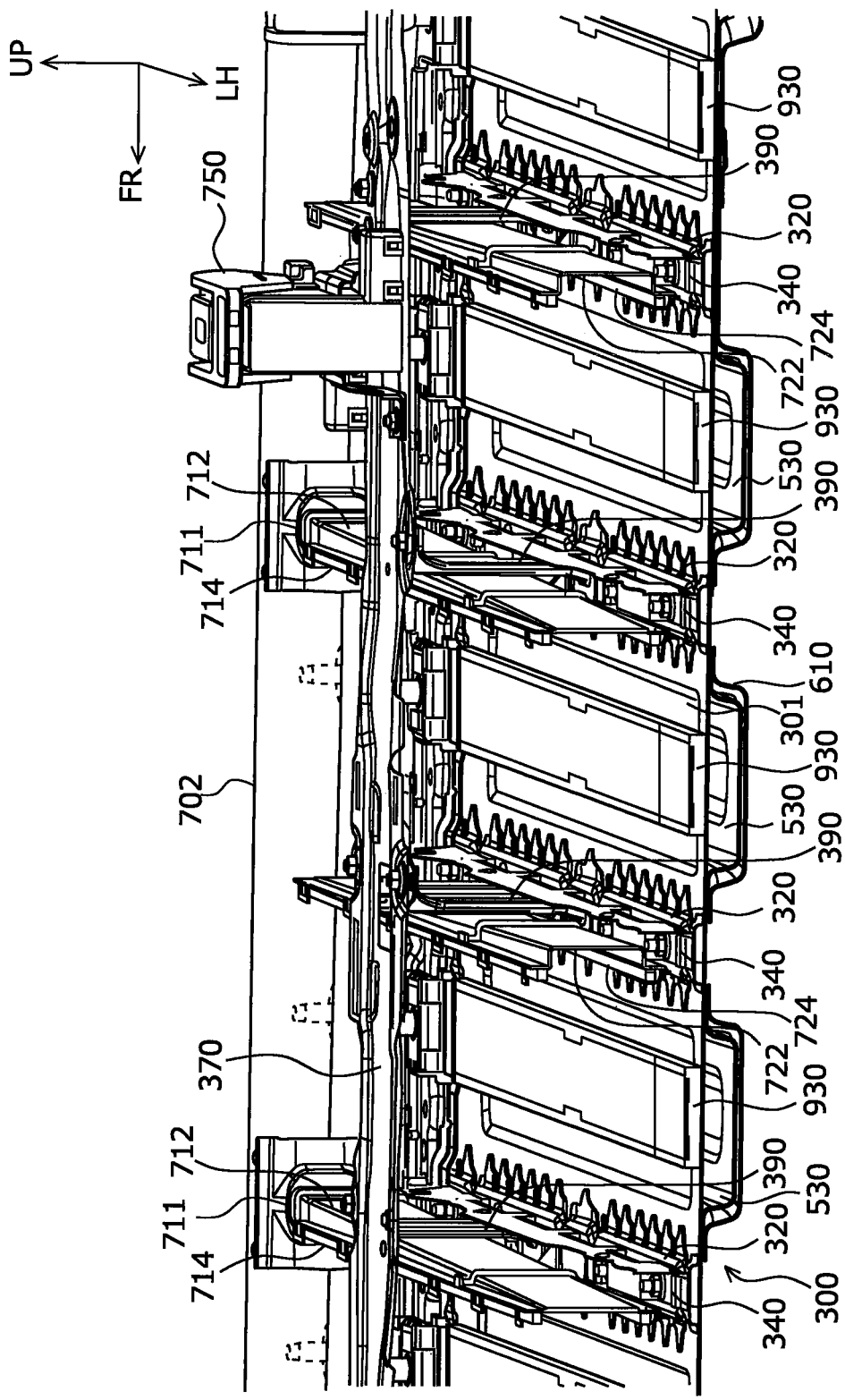
FIG. 27 is an enlarged perspective view of the front portion of the lower case viewed from the upper left rear obliquely when the lower case is cut along the front-rear centerline of the battery pack with the middle frame and the heating/cooling device attached to the lower case.
Figure 28:
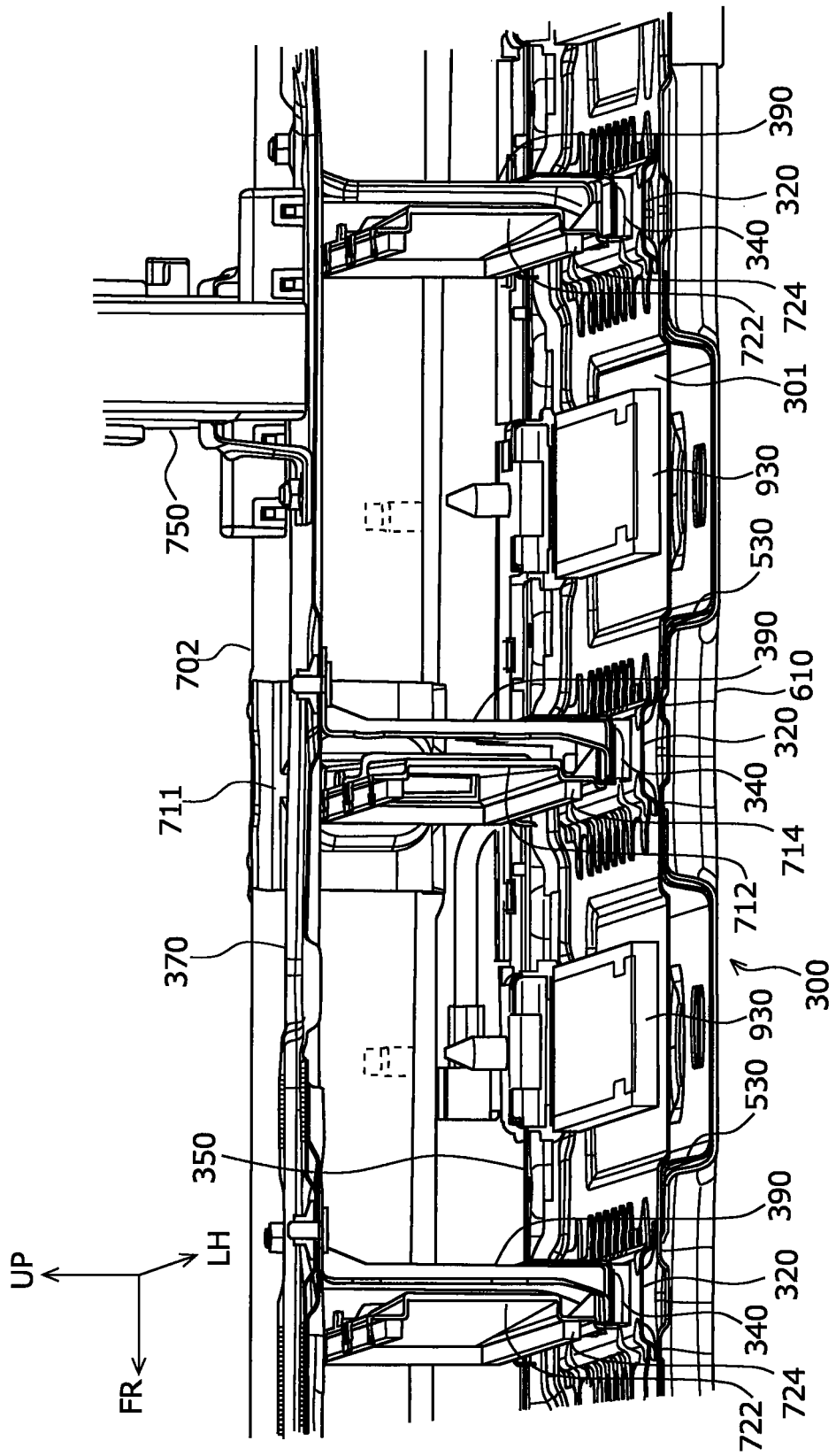
FIG. 28 is a greatly enlarged perspective view of the front portion of the lower case viewed from the upper left obliquely when the lower case is cut along the front-rear centerline of the battery pack with the middle frame and the heating/cooling device attached to the lower case.
Figure 29:
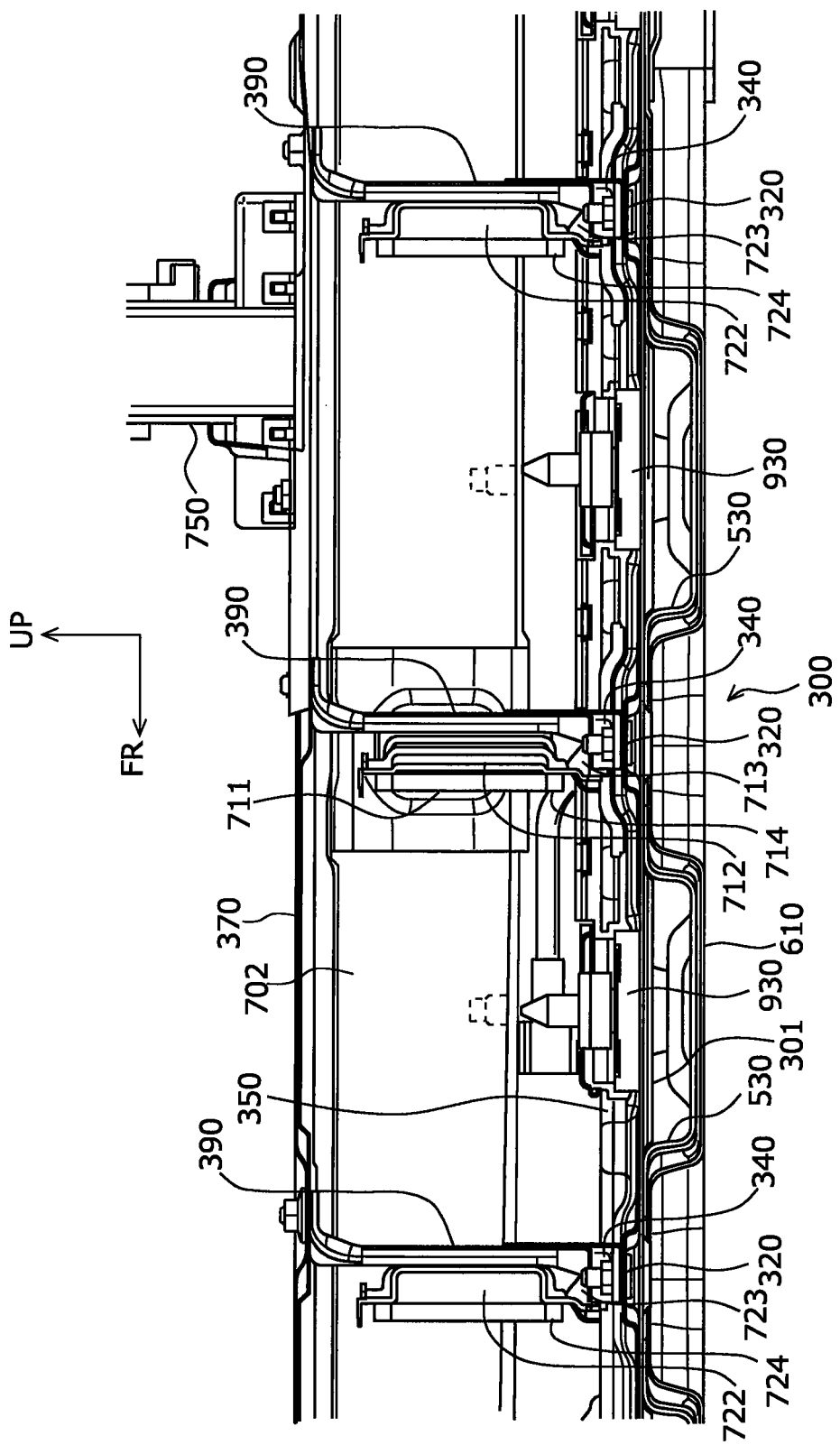
FIG. 29 is a greatly enlarged side view of the front portion of the lower case viewed from the left side when the lower case is cut along the front-rear centerline of the battery pack with the middle frame and the heating/cooling device are attached to the lower case.

FIGS. 27 to 29 are views showing the lower case 300 cut along the centerline in the front-rear direction of the battery pack 200 while the middle frame 385 and the heating/cooling device are attached to the lower case 300. The sight direction differs among FIGS. 27 to 29. FIG. 27 is an enlarged perspective view of the front portion of the lower case 300 viewed from the upper left rear obliquely. FIG. 28 is a greatly enlarged perspective view of the front portion of the lower case 300 viewed from the upper left obliquely. FIG. 29 is a greatly enlarged side view of the front portion of the lower case 300 viewed from the left side.

As shown in these figures, the baffle plates 712, 722 are attached to the partition bracket 340 along with the support leg 390. In particular, as shown in FIG. 29, brackets 713, 723 are stood on the partition bracket 340, and baffle plates 712, 722 are supported by the brackets 713, 723. The brackets 713, 723 are bonded to the partition bracket 340, for example by welding. Since the height of the baffle plates 712, 722 are less than or equal to the height of the support leg 390, the baffle plates 712, 722 don't interfere with the center plate 370 disposed thereabove.

Figure 62:
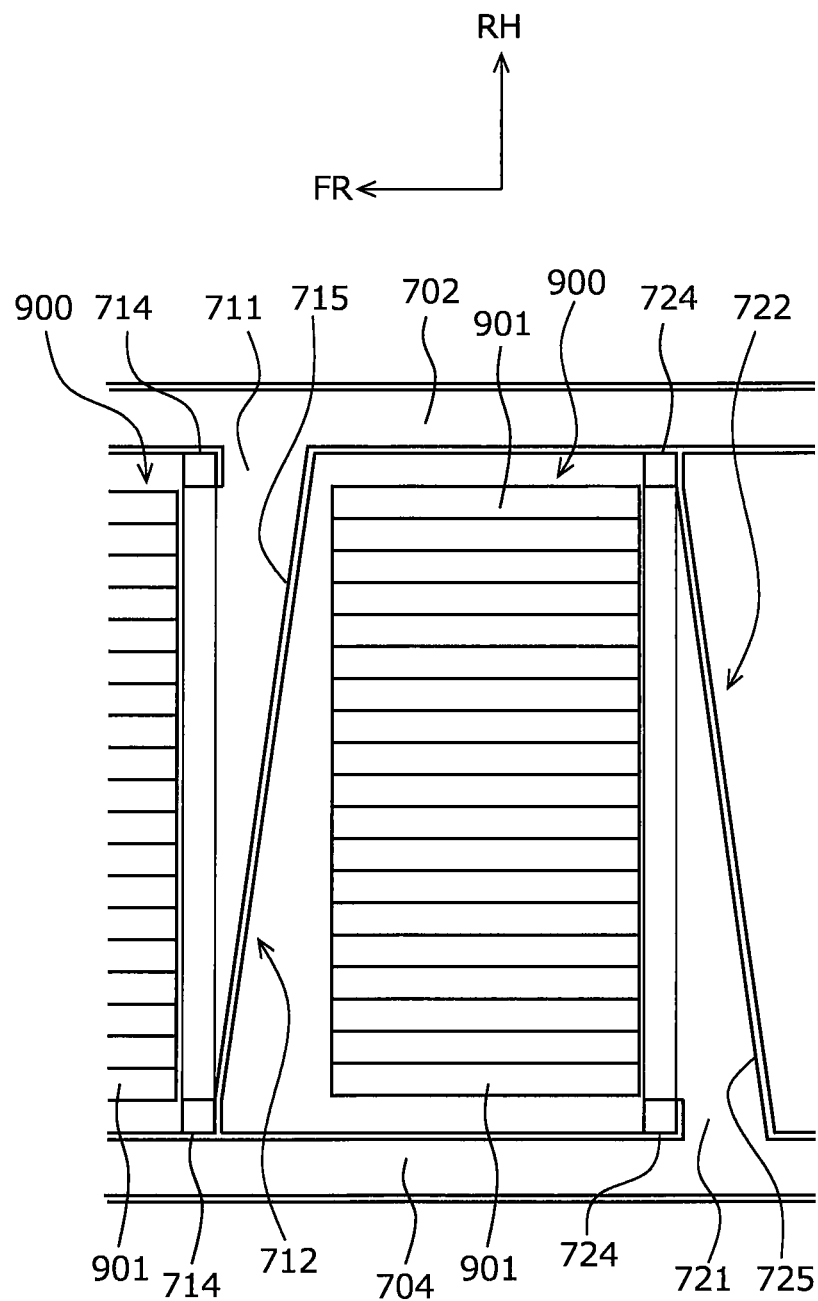
FIG. 62 is a supplementary view of FIG. 28 and is a schematic plan view of the baffle plate viewed from above when the baffle plate is cut parallel to the bottom surface of the lower case of the battery pack.

The baffle plates 712, 722 has a hat-shaped cross section open toward the battery stack 900 that is an object to be blown. FIG. 62 is a supplementary view of FIG. 28 and is a schematic plan view of the baffle plate 712, 722 viewed from above when the baffle plate 712, 722 is cut parallel to the bottom surface of the lower case 300. As shown in FIG. 62, the back walls 715 725 of the baffle plates 712, 722 are inclined from the air distributors 711, 721 side toward the other side so that the distance from the rear surface of the battery stack 900 becomes shorter. In other words, the baffle plates 712, 722 has, in the plan view, a triangular shape in which the width is the widest at the outlet of the air distributors 711, 721 and gradually narrows toward the tip. Between the edges of the baffle plates 712, 722 and the battery stack 900, packings 714, 724 for preventing air leakage are provided.

With the above-described construction, the cross-sectional area of the flow path of the baffle plate 712 gradually decreases as the distance from the air distributor 711 increases. Also, the cross-sectional area of the flow path of the baffle plate 722 gradually decreases as the distance from the air distributor 721 (refer to FIG. 26) increases. Incidentally, in FIGS. 27 to 29, a structure in which air is distributed from the air distributor 711 provided in the right air duct 702 to the baffle plate 712 is illustrated, but a structure in which air is distributed from the air distributor 721 provided in the left air duct 704 to the baffle plate 722 is the same.

The battery stack 900 is heated by an electric heater 930. The heater 930 is mounted on the bottom panel 301 between the adjacent two partition brackets 340. That is, the heater 930 is provided for each battery stack 900. When the battery stack 900 is mounted in the lower case 300, the heater 930 is sandwiched between the battery stack 900 and the bottom panel 301, as depicted, for example, in FIG. 13. The heater 930 has substantially the same length as the length of the battery stack 900. However, the heater 930 may be an assembly of a plurality of heaters disposed in the longitudinal direction of the battery stack 900.

2-9. Cable Laying Structure

Next, cable laying structure will be described with reference to FIGS. 30 and 31. A plurality of cables 751 including a power line and a signal line are laid in the battery pack 200.

Figure 30:
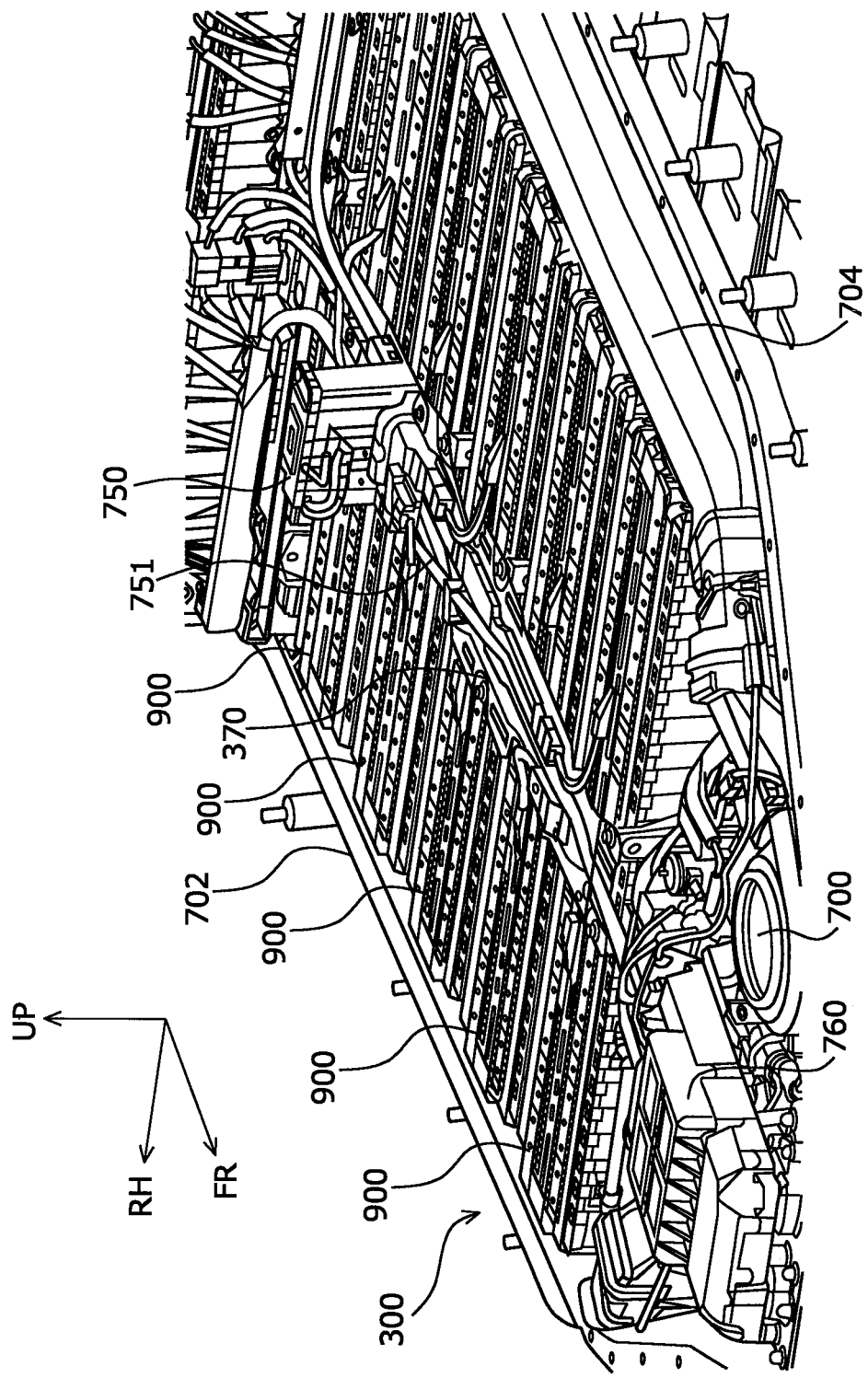
FIG. 30 is a perspective view of the front portion of the lower case with the battery stack, the middle frame, the cables, and the heating/cooling device attached viewed from the upper left front obliquely.

FIG. 30 is a perspective view of the front portion of the lower case 300 with the battery stack 900, the middle frame 385, the cables, and the heating/cooling device attached viewed from the upper left front obliquely. The center plate 370 extending in the front-rear direction of the lower case 300 is provided on the battery stacks 900 arranged in the lower case 300.

The cables 751 laid in the battery pack 200 include cables connected to the respective battery stacks 900, cables connected to the junction box 760 and the blower 700 placed at the distal end portion of the lower case 300, cables connected to the battery ECUs 950, 951, and the like. These cables 751 are combined and passed over the center plate 370. That is, the center plate 370 is used as a passage through which the cables 751 pass.

At least some cables 751 are connected to the service plug 750 provided on the center plate 370. When the upper case 210 is attached to the lower case 300, the service plug 750 protrudes from the upper case 210. When the battery pack 200 is mounted on the vehicle, the service plug 750 is connected to the vehicle connector.

Figure 31:
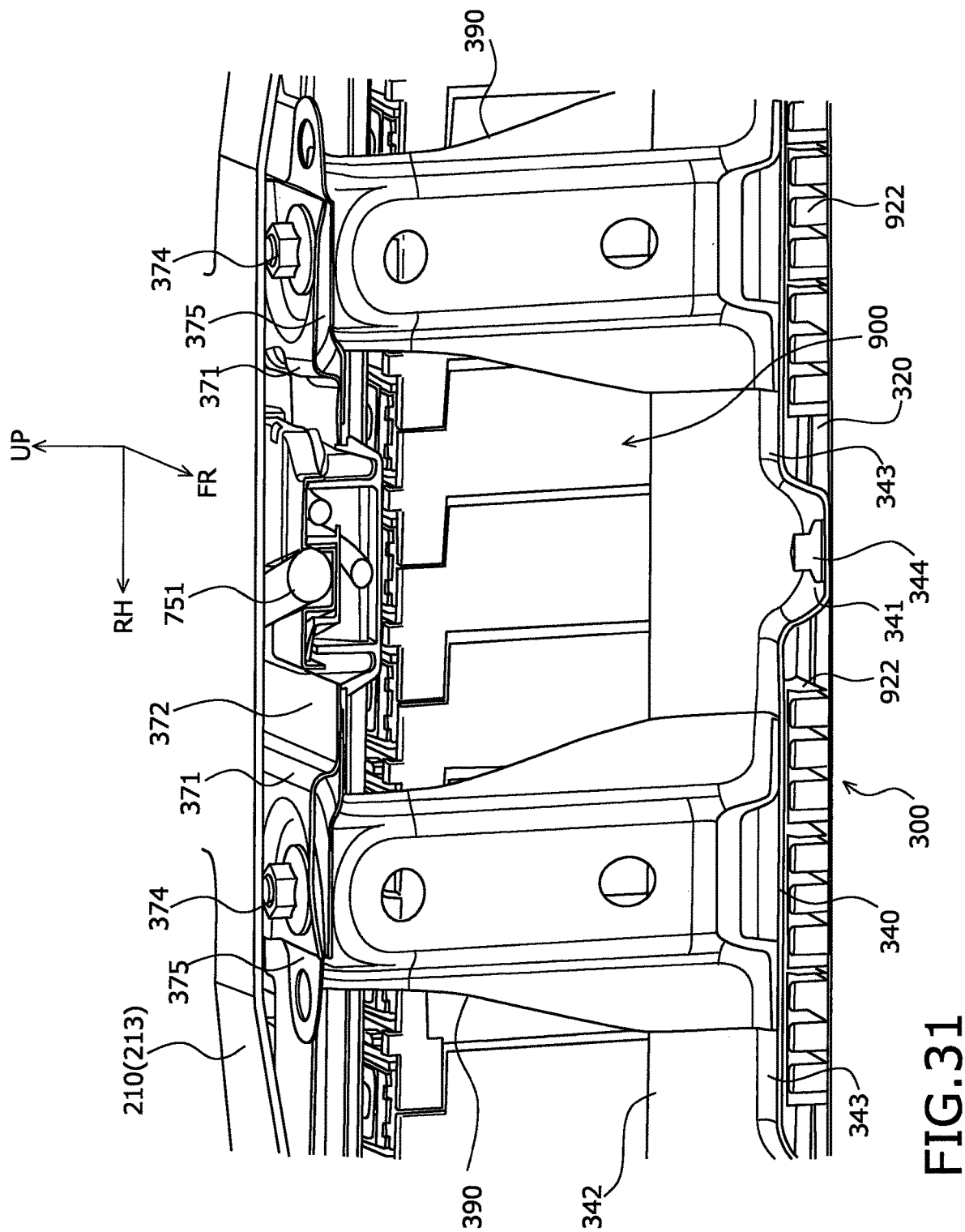
FIG. 31 is an enlarged perspective view of the periphery of the center plate viewed from the upper front obliquely when the battery pack is cut in the width direction.

FIG. 31 is an enlarged perspective view of the periphery of the center plate 370 viewed from the upper front obliquely when the battery pack 200 is cut in the width direction. The center plate 370 has the flanges 371 on the left and right. The support leg 390 is fastened to the flange 371 through a shim plate 375 by the fastener 374. A closed cross-section is formed between the shim plate 375 and the flange 371 around the fastener 374.

Between the left and right flanges 371, there is the recess 372 that is one step lower than the flange 371. When the upper case 210 is mounted on the lower case 300, a space is formed between the upper case 210 and the recess 372. The cables 751 are passed through the space.

2-10. Battery Stack Fixing Structure

The fixing structure of the battery stack 900 will be described with reference to FIGS. 32 and 33.

Figure 32:
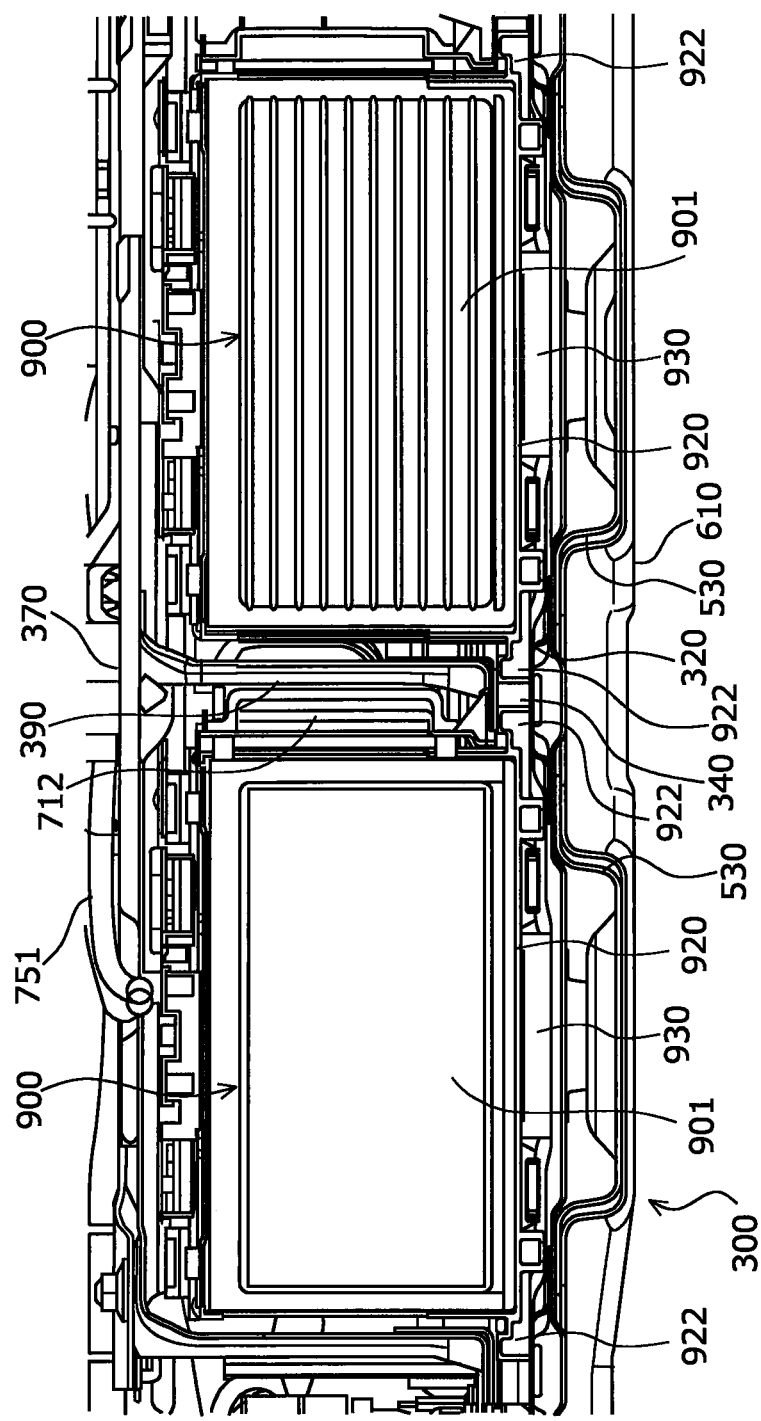
FIG. 32 is a greatly enlarged side view of the front portion of the lower case viewed from the left side when the lower case is cut along the front-rear centerline of the battery pack with the middle frame, the heating/cooling device and the battery stack attached to the lower case.

FIG. 32 is a side view of the front of the lower case 300 when FIG. 32 is a greatly enlarged side view of the front portion of the lower case 300 viewed from the left side when the lower case 300 is cut along the front-rear centerline of the battery pack 200 with the middle frame 385, the heating/cooling device and the battery stack 900 attached to the lower case 300. The battery stack 900 has the cell case 920 that accommodates the cell 901. A nail part 922 extending toward the partition bracket 340 is formed on the bottom of the cell case 920.

The nail part 922 penetrates into the space between the partition bracket 340 and the inner crosswise reinforcement 320. The upward motion of the cell case 920 is restricted by the right and left nail parts 922 entering below the partition bracket 340. The engagement of the nail part 922 with the partition bracket 340 is illustrated in detail in FIG. 33.

Figure 33:
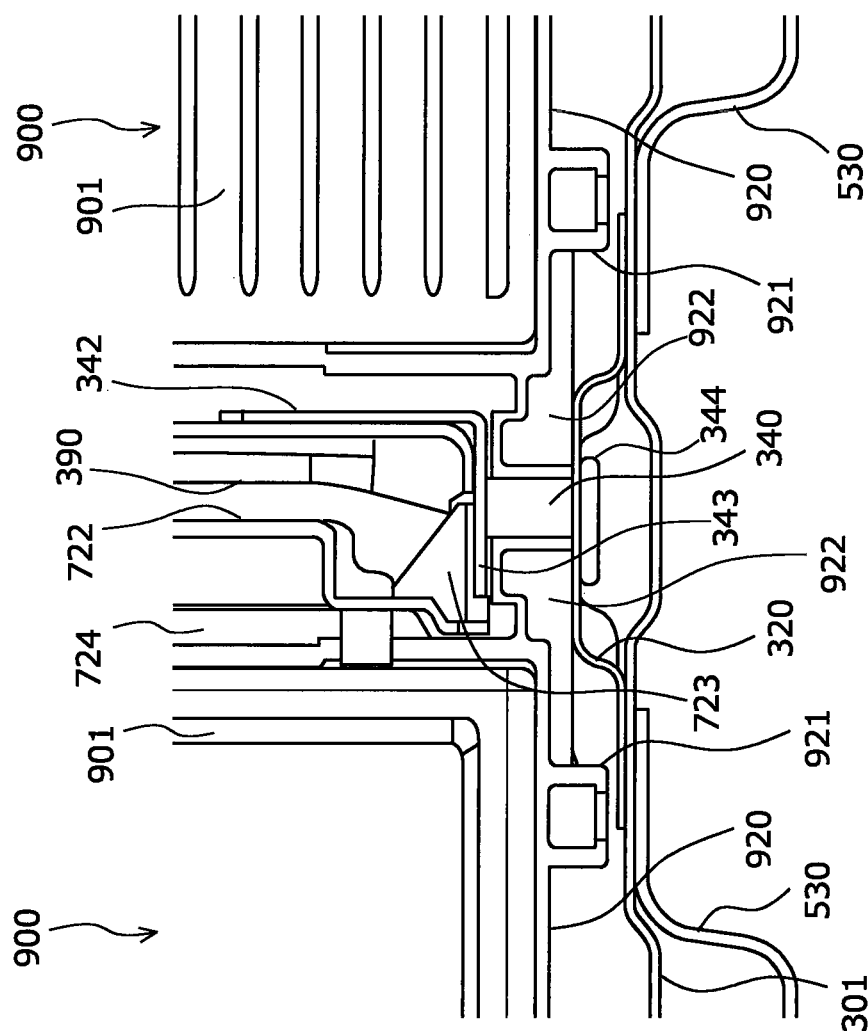
FIG. 33 is an enlarged side view of the periphery of the partition bracket viewed from the left side when the lower case is cut along the front-rear centerline of the battery pack with the middle frame, the battery stack, and the heating/cooling device attached to the lower case.

FIG. 33 is an enlarged side view of the periphery of the partition bracket 340 viewed from the left side when the lower case 300 is cut along the front-rear centerline of the battery pack 200 with the middle frame 385, the battery stack 900, and the heating/cooling device attached to the lower case 300. The partition bracket 340 is bonded to the inner crosswise reinforcement 320 by the fastener 344.

The partition bracket 340 has the cell case fixing portion 343. The bracket 723 for supporting the support leg 390 and the baffle plate 722 is bonded to the cell case fixing portion 343. The cell case fixing portions 343 are formed on both left and right sides of the partition bracket 340, that is, on the front side and the rear side in the front-rear direction of the battery pack 200. The cell case fixing portion 343 forms a gap with the inner crosswise reinforcement 320.

The partition bracket 340 is provided on both sides in the lateral direction of each battery stack 900. The nail part 922 is also formed on the right and left sides of the cell case 920, that is, on the front and rear sides in the front-to-rear direction of the battery pack 200. By the nail part 922 entering the gap formed by the cell case fixing portion 343 and the inner crosswise reinforcement 320, the cell case 920 is restrained from moving up, down, left and right, and the battery stack 900 is fixed to the lower case 300. The state in which the nail part 922 engages with the cell case fixing portion 343 is also illustrated in FIG. 31.

3. Body structure

Next, body structure of the vehicle according to the embodiment will be described.

3-1. Overview of Body Structure

First, outview of the body structure will be described with reference to FIG. 34.

Figure 34:
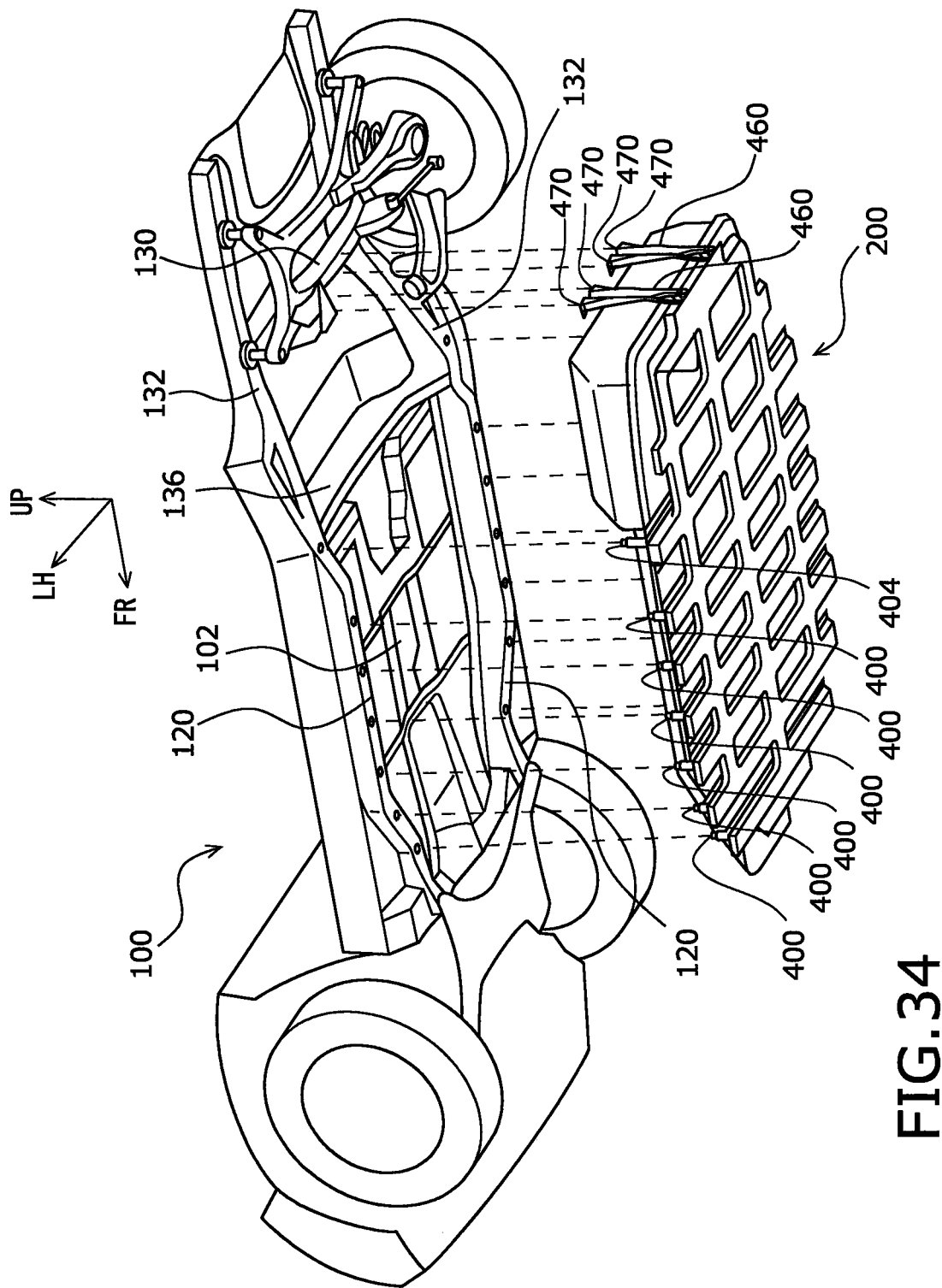
FIG. 34 is a perspective view obliquely from the lower left rear showing a state in which the battery pack according to the embodiment is mounted on the vehicle.

FIG. 34 is a perspective view obliquely from the lower left rear showing a state in which the battery pack 200 according to the embodiment is mounted on the vehicle 100. The battery pack 200 is mounted below the floor of the vehicle 100. The term "floor" in the present disclosure means the entire of the floor panel 102, the frame member supporting the floor panel 102, and the reinforcement for reinforcing the floor panel 102, and is not limited to the floor panel 102 only.

A pair of underfloor side reinforcements 120, a pair of rear floor side members 132, a rear underfloor cross member 130, and a front underfloor reinforcement 136 are provided below the floor of the vehicle 100. They are bonded to the floor panel 102, for example by welding.

The underfloor side reinforcements 120 are disposed on the right side and the left side in the width direction of the vehicle 100, respectively, and extend from the center to the front side in the front-rear direction of the vehicle 100. The rear floor side members 132 are disposed on the right side and the left side in the width direction of the vehicle 100, respectively, and extends in the front-rear direction at the rear portion of the vehicle 100. The rear underfloor cross member 130 is a member extending in the width direction of the vehicle 100, and both ends thereof are bonded to the vicinity of the central portion of the left and right rear floor side members 132. The front underfloor reinforcement 136 is a member extending in the width direction of the vehicle 100, and both ends thereof are bonded to the vicinity of the front ends of the left and right rear floor side members 132.

As described above, the battery pack 200 includes a plurality of hanging bolt 400 404 and a fastener 470. The battery pack 200 is fixed below the floor of the vehicle 100 using them. Specifically, the left six hanging bolt 400 of the battery pack 200 are fastened to the left underfloor side reinforcement 120 and the right six hanging bolt 400 of the battery pack 200 are fastened to the right underfloor side reinforcement 120.

The last hanging bolt 404 is longer than the other hanging bolts 400. The left hanging bolt 404 is fastened at the front end of the left rear floor side member 132 in the vicinity of the portion to which the front underfloor reinforcement 136 is bonded. The right hanging bolt 404 is fastened at the front end of the right rear floor side member 132 in the vicinity of the portion to which the front underfloor reinforcement 136 is bonded.

Two fasteners 470 are attached to the upper ends of the pair of case fixing rear arms 460. Total four fasteners 470 are fastened to the rear underfloor cross member 130. All of the hanging bolts 400, 404 and fasteners 470 are fastened to the frame member or reinforcement of the vehicle 100, thereby the battery pack 200 being fixed to the vehicle 100 and being integrated with the vehicle 100.

3-2. Body Frame Structure

The body frame structure will be described in detail with reference to FIGS. 35 to 38.

Figure 35:
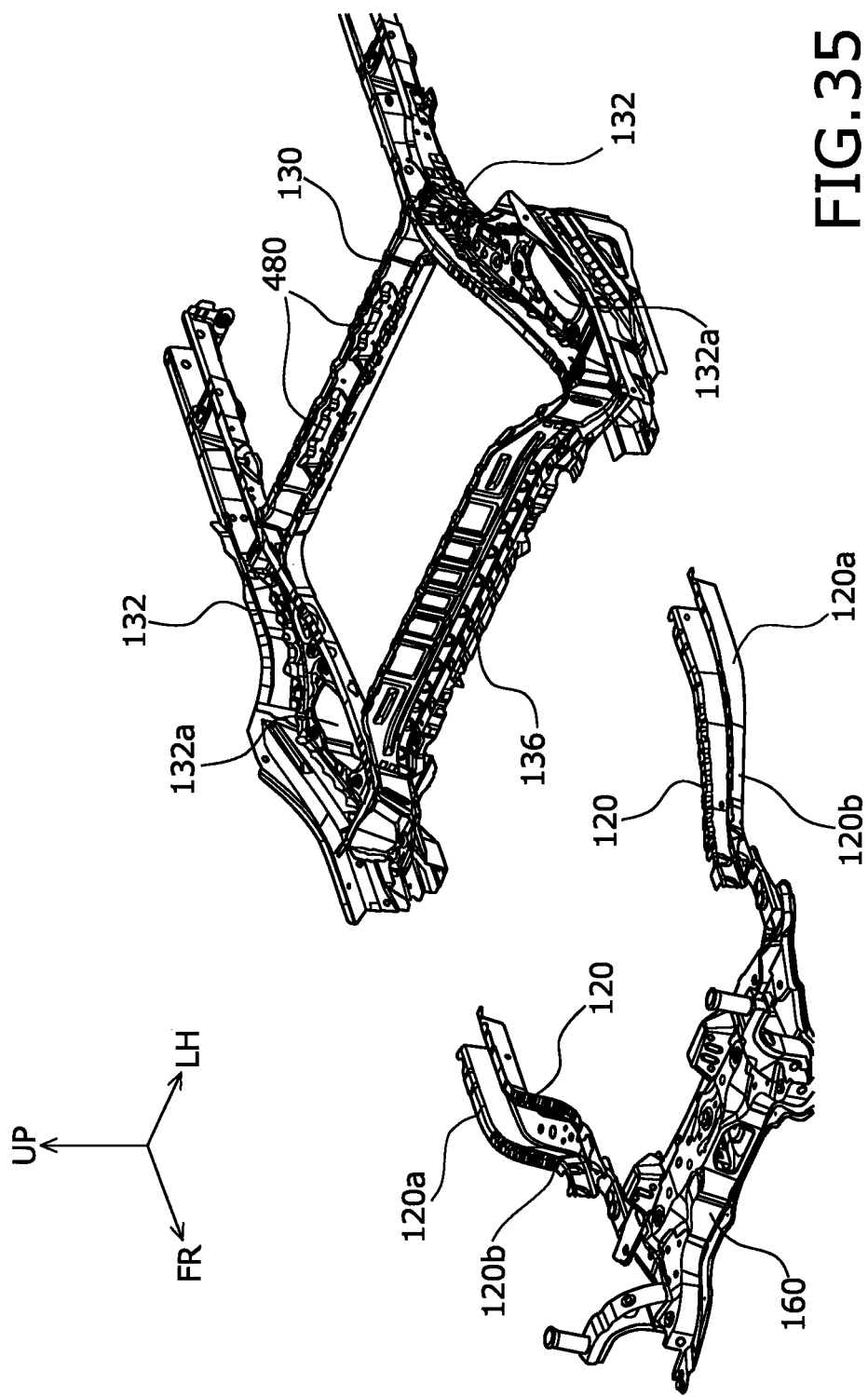
FIG. 35 is a perspective view showing in detail the frame structure under the floor of the vehicle according to the embodiment.

FIG. 35 is a perspective view showing in detail the frame structure under the floor of the vehicle 100 according to the embodiment. Below the floor of the vehicle 100, a front suspension member 160 is provided in addition to the frame member and reinforcement described above. The front suspension member 160 is connected to the front end of the underfloor side reinforcement 120.

The underfloor side reinforcement 120 has an upwardly open hat-shaped cross-section with a flange and is bonded to the floor panel 102 at the flange. The underfloor side reinforcement 120 is composed of a rear part 120a having a substantially constant distance from the counterpart underfloor side reinforcement 120, and a front part 120b connected to the front side of the rear part 120a and decreasing in distance from the counterpart underfloor side reinforcement 120 toward the front. That is, in the front part 120b, the distances between the pair of underfloor side reinforcement 120 widen from the front to the rear. The underfloor side reinforcement 120 may be a single member or a plurality of members bonded together. In the embodiment, at least the rear part 120a is configured by bonding a plurality of members. In FIG. 35, some members constituting the rear part 120a are not shown.

The rear floor side member 132 has an upwardly open hat-shaped cross-sectional configuration. The front end of the rear floor side member 132 is bonded to the rear end of the underfloor side reinforcement 120 either directly or through another member. The front side of the rear floor side member 132 curves upwardly toward the rear. In the curved portion, a trailing arm fixing opening 132a for fixing the trailing arm is opened. The rear floor side member 132 may be a single member or a plurality of members bonded together.

The rear underfloor cross member 130 has an upwardly open hat-shaped cross-section. The junction position of the rear underfloor cross member 130 to the rear floor side member 132 is rearward of the position of the trailing arm fixing opening 132a and is the front end of the rear side part of the rear floor side member 132 which extends straight rearwardly. In the rear underfloor cross member 130, a pair of bulkheads 480 spaced from each other in the left and right direction are arranged. The bulkhead 480 is disposed at a position where the case fixing rear arm 460 in the rear underfloor cross member 130 is fastened to the rear underfloor cross member 130 and is fixed to the inside of the rear underfloor cross member 130, for example by welding. In addition, the bulkhead 480, the rear underfloor cross member 130, and the case fixing rear arm 460 are overlapped substantially vertically and are fastened by the fastener 470.

The front underfloor reinforcement 136 has an L-shaped cross-section in which the long side stands vertically and the short side protrudes forward. The junction position of the front underfloor reinforcement 136 to the rear floor side member 132 is forward of the position of the trailing arm fixing opening 132a. The front underfloor reinforcement 136 and the rear underfloor cross member 130 are spaced apart a distance in which the high ceiling 212 of the upper case 210 of the battery pack 200 is accommodated.

Figure 36:
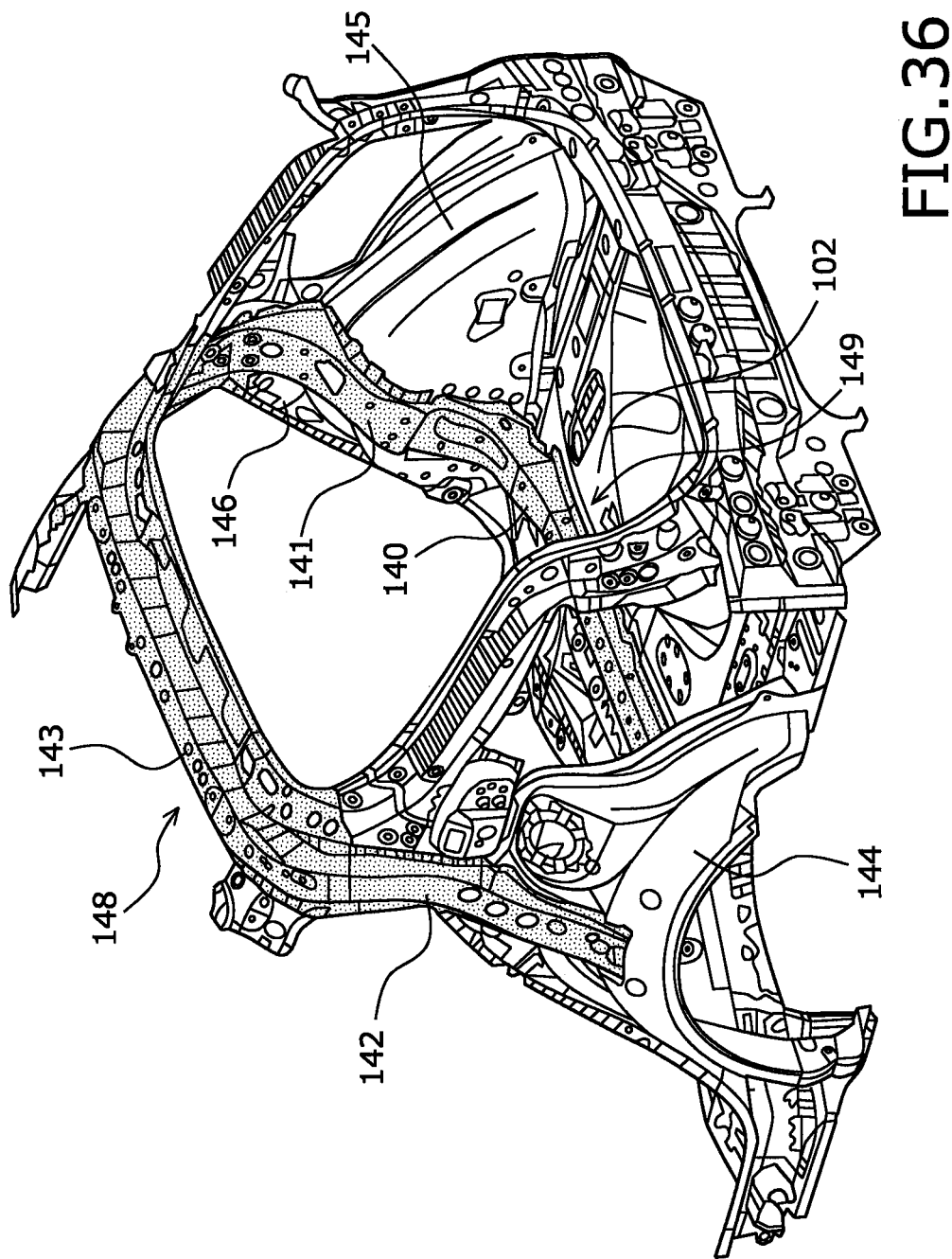
FIG. 36 is a perspective view showing in detail the frame structure of the rear section of the vehicle according to the embodiment.

FIG. 36 is a perspective view showing in detail the frame structure of the rear section of the vehicle 100 according to the embodiment. An annular frame composed of a plurality of frame member 140, 141, 142, 143 is provided on the rear section of the vehicle 100.

The frame member constituting the annular frame includes the rear on-floor cross member 140, the quarter pillar inner reinforcement 141, the quarter pillar outer reinforcement 142, and the roof reinforcement 143. The roof reinforcement 143 is a member for reinforcing the roof of the vehicle 100 and extends in the width direction of the vehicle 100. The roof reinforcement 143 has a hat-shaped cross-section that opens toward the interior of the passenger compartment, i.e., opens downwardly.

The quarter pillar inner reinforcement 141 and the quarter pillar outer reinforcement 142 are members constituting the rear pillar of the vehicle. The quarter pillar inner reinforcement 141 has a hat-shaped cross-section that opens toward the exterior of the passenger compartment. On the other hand, the quarter pillar outer reinforcement 142 has a hat-shaped cross-section that opens toward the interior of the passenger compartment. Each upper end is bonded to the end of the roof reinforcement 143. The quarter pillar inner reinforcement 141 is also depicted in FIG. 1.

The upper side of the quarter pillar inner reinforcement 141 and the upper side of the quarter pillar outer reinforcement 142 are bonded together. The underside of the quarter pillar inner reinforcement 141 is bonded to a wheel house inner panel 145 forming the interior of the wheelhouse. The underside of the quarter pillar outer reinforcement 142 is bonded to a wheel house outer panel 144 forming the exterior of the wheelhouse.

The rear on-floor cross member 140 has a downwardly open hat-shaped cross-section. The both ends of the rear on-floor cross member 140 are bonded to the lower ends of the left and right quarter pillar inner reinforcements 141. As will be described later, the rear on-floor cross member 140 is bonded to the rear underfloor cross member 130 with the floor panel 102 interposed therebetween.

Figure 37:
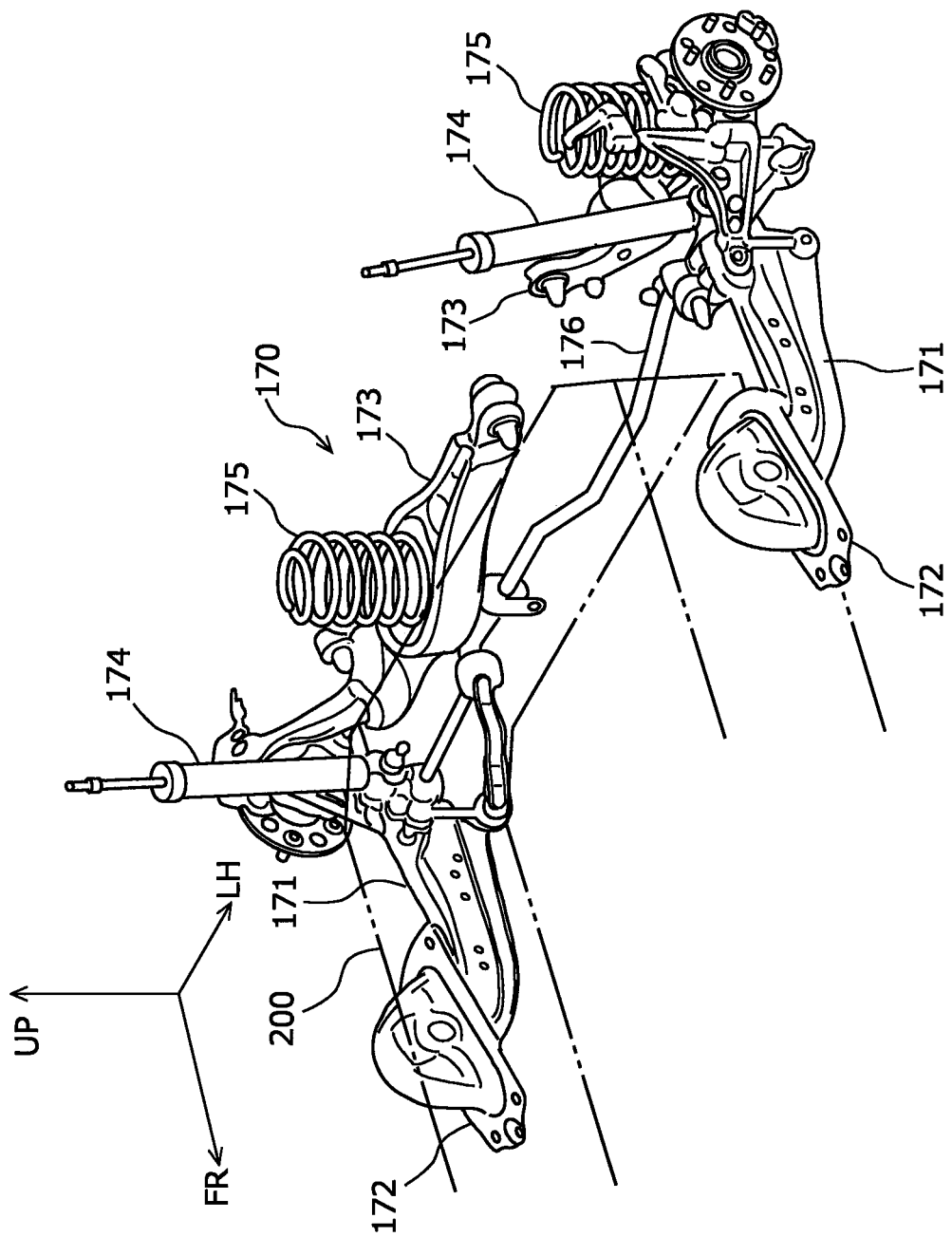
FIG. 37 is a perspective view showing in detail the structure of the rear suspension of the vehicle according to the embodiment.

FIG. 37 is a perspective view showing in detail the structure of a rear suspension 170 of the vehicle 100 according to the embodiment. The rear of the battery pack 200 reaches the rear suspension 170 supporting the rear wheel 104 (refer to FIG. 1). For the position of the rear suspension 170 in the body 101 (refer to FIG. 1), reference is made to the position of a shock absorber fixing part 179 shown in FIG. 1. The position of the shock absorber fixing part 179 (refer to FIG. 1) in the longitudinal direction of the body 101 (refer to FIG. 1) at least partially overlaps the position of the rear on-floor cross member 140 (refer to FIG. 36) in the longitudinal direction of the body 101.

The rear suspension 170 is provided with a trailing arm 171 which swings about a trailing arm fixing part 172. The trailing arm 171 is connected to the rear suspension arm 173. A shock absorber 174 is attached to the trailing arm 171, and a coil spring 175 is attached to the rear suspension arm 173. The left and right trailing arms 171 are connected by a stabilizer bar 176. Of the rear suspension 170, the shock absorber 174 is also depicted in FIG. 1.

The battery pack 200 is designed to be wide enough to fit between the left and right trailing arms 171. In addition, the shapes of the respective components of the rear suspension 170 are adjusted so as not to interfere with the rear end of the battery pack 200.

Figure 38:
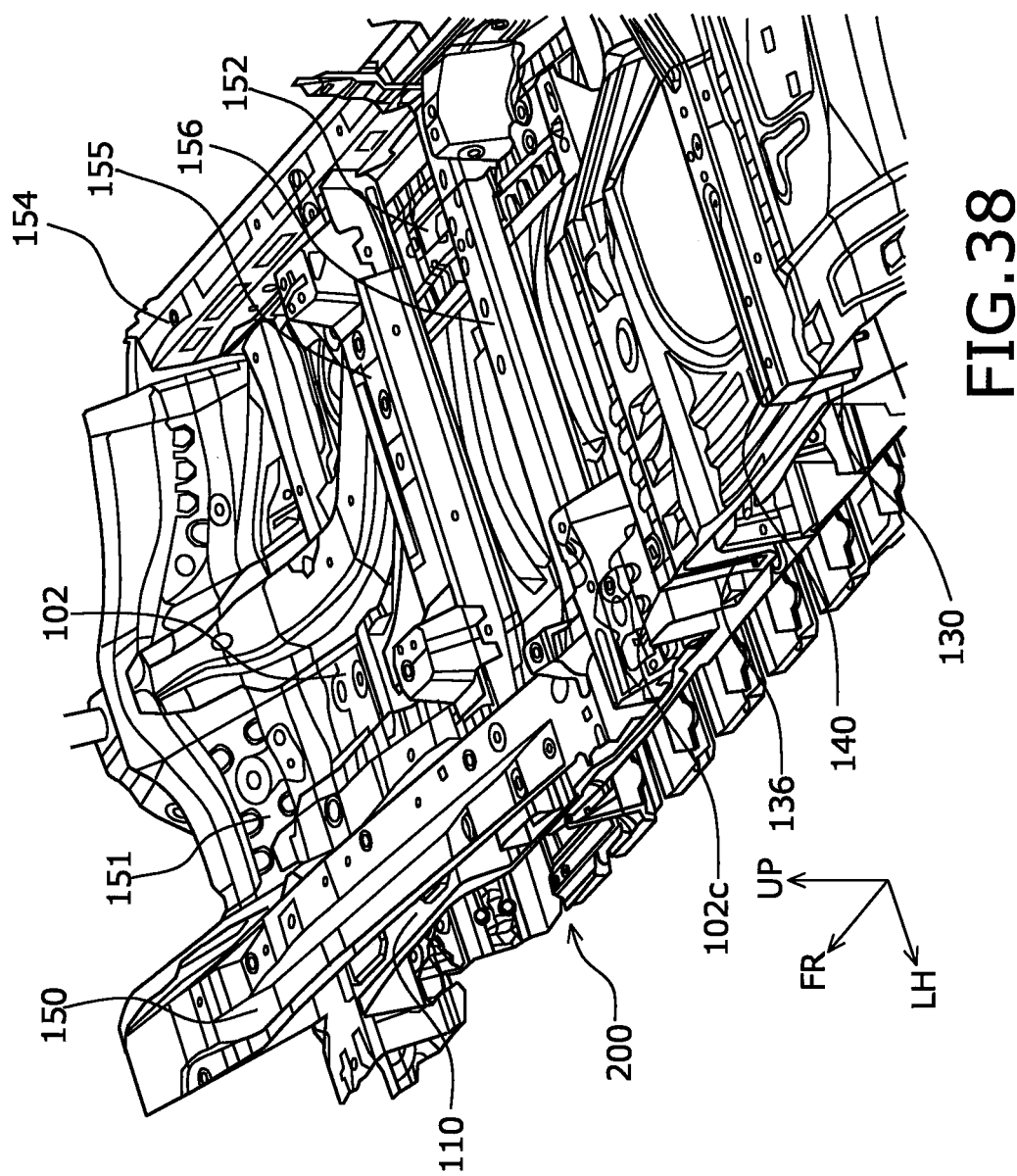
FIG. 38 is a perspective view of the front portion of the floor when the floor is cut along the front-rear centerline of the vehicle with the battery pack mounted below the floor and not equipped with the battery stack and the heating/cooling device, showing the floor structure of the vehicle according to the embodiment.

FIG. 38 is a perspective view of the front portion of the floor when the floor is cut along the front-rear centerline of the vehicle 100 with the battery pack 200 mounted below the floor and not equipped with the battery stack 900 and the heating/cooling device, showing the floor structure of the vehicle 100 according to the embodiment. In this view, the frame member and the reinforcement are shown, which are provided in particular on the upper portion of the floor.

A step 102c is formed on the floor panel 102 of the vehicle 100 along the front underfloor reinforcement 136. The floor panel 102 of the front of the vehicle 100 is one step lower than that of the rear. This corresponds to the fact that, in the upper case 210 of the battery pack 200, the low ceiling 211 of the front part is lower than the high ceiling 212 of the rear part by one step.

The front floor panel 102 of the vehicle 100 is bonded to the dash panel 151 at its front end. In the floor panel 102, a floor tunnel 110 is formed on the center line of the vehicle 100. The floor tunnel 110 is slightly higher than the other portions, which corresponds to the fact that, in the upper case 210 of the battery pack 200, the central ridge 213 is higher than the other portions. In addition, the floor tunnel 110 has a higher front end, which corresponds to the fact that, in the upper case 210 of the battery pack 200, the front ridge 214 of the front end is higher than the other portions by one step.

On the floor tunnel 110, a tunnel cover reinforcement 150 is provided along the centerline of the vehicle 100, which extends to the step portion of the floor panel 102. The tunnel cover reinforcement 150 has a downwardly open hat-shaped cross-section. A side sill 154 is also provided in the front-rear direction of the vehicle 100. The side sill 154 is disposed at the right and left ends of the vehicle 100 (only the right side sill 154 is shown).

In addition, a pair of on-floor side reinforcements 152 are provided symmetrically with respect to the centerline of the vehicle 100 (only the right on-floor side reinforcement 152 is shown). The on-floor side reinforcement 152 extends in the front-rear direction of the vehicle 100 and, in the plan view, overlaps a underfloor side reinforcement 120 (not shown) located beneath the floor panel 102. More specifically, the on-floor side reinforcement 152 overlaps each of the front part 120b and the rear part 120a of the underfloor side reinforcement 120 in a vertical view. The on-floor side reinforcement 152 has a downwardly open hat-shaped cross-section with a flange portion and is bonded to the floor panel 102 at the flange portion. The flange portion of the on-floor side reinforcement 152 is disposed so as to overlap the floor panel 102 and the flange portion of the underfloor side reinforcement 120 when viewed in the vertical direction, and they are welded by three-ply welding.

A first seat cross member 155 and a second seat cross member 156 are provided in the width direction of the vehicle 100. These are located below the front seat 105 (refer to FIG. 1). The second seat cross member 156 is disposed behind the first seat cross member 155 in the front-rear direction of the vehicle 100. The first seat cross member 155 and the second seat cross member 156 both have a downwardly open hat-shaped cross-section and are bonded to the floor pane 1102. The first seat cross member 155 and the second seat cross member 156 both pass over the on-floor side reinforcement 152, pass through the tunnel cover reinforcement 150, and are bonded to the right and left side sill 154.

3-3. Mounting Structure of Battery Pack Under Floor

The underfloor mounting structure of the battery pack 200 will be described with reference to FIGS. 39 to 45.

Figure 39:
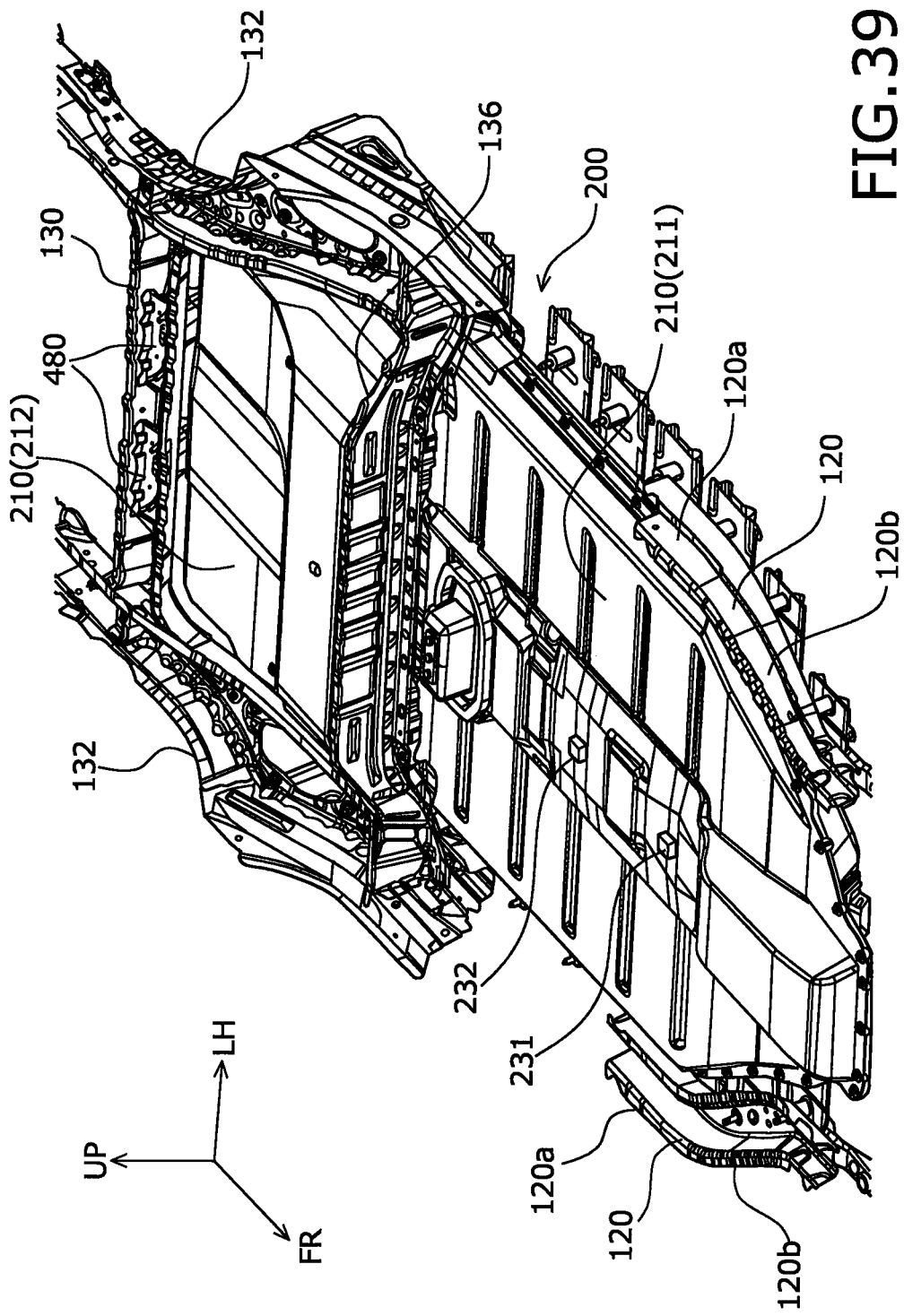
FIG. 39 is a perspective view showing the engagement between the battery pack and the frame structure under the floor when the battery pack is mounted under the floor of the vehicle according to the embodiment.

FIG. 39 is a perspective view showing the engagement between the battery pack 200 and the frame structure under the floor when the battery pack 200 is mounted under the floor of the vehicle 100 according to the embodiment. However, in this view, some members constituting the rear part 120a of the underfloor side reinforcement 120 are not shown.

When the battery pack 200 is mounted below the floor of the vehicle 100, the battery pack 200 is accommodated in an area surrounded by the left and right underfloor side reinforcements 120, the left and right rear floor side members 132, and the rear underfloor cross member 130. The rear portion of the battery pack 200, that is, the high ceiling 212 of the upper case 210, is accommodated in an area surrounded by the left and right rear floor side member 132, the rear underfloor cross member 130, and the front underfloor reinforcement 136. The distance between the front parts 120b of the left and right underfloor side reinforcements 120 decrease toward the front, which corresponds to the structure of the distal end of the battery pack 200.

Figure 40:
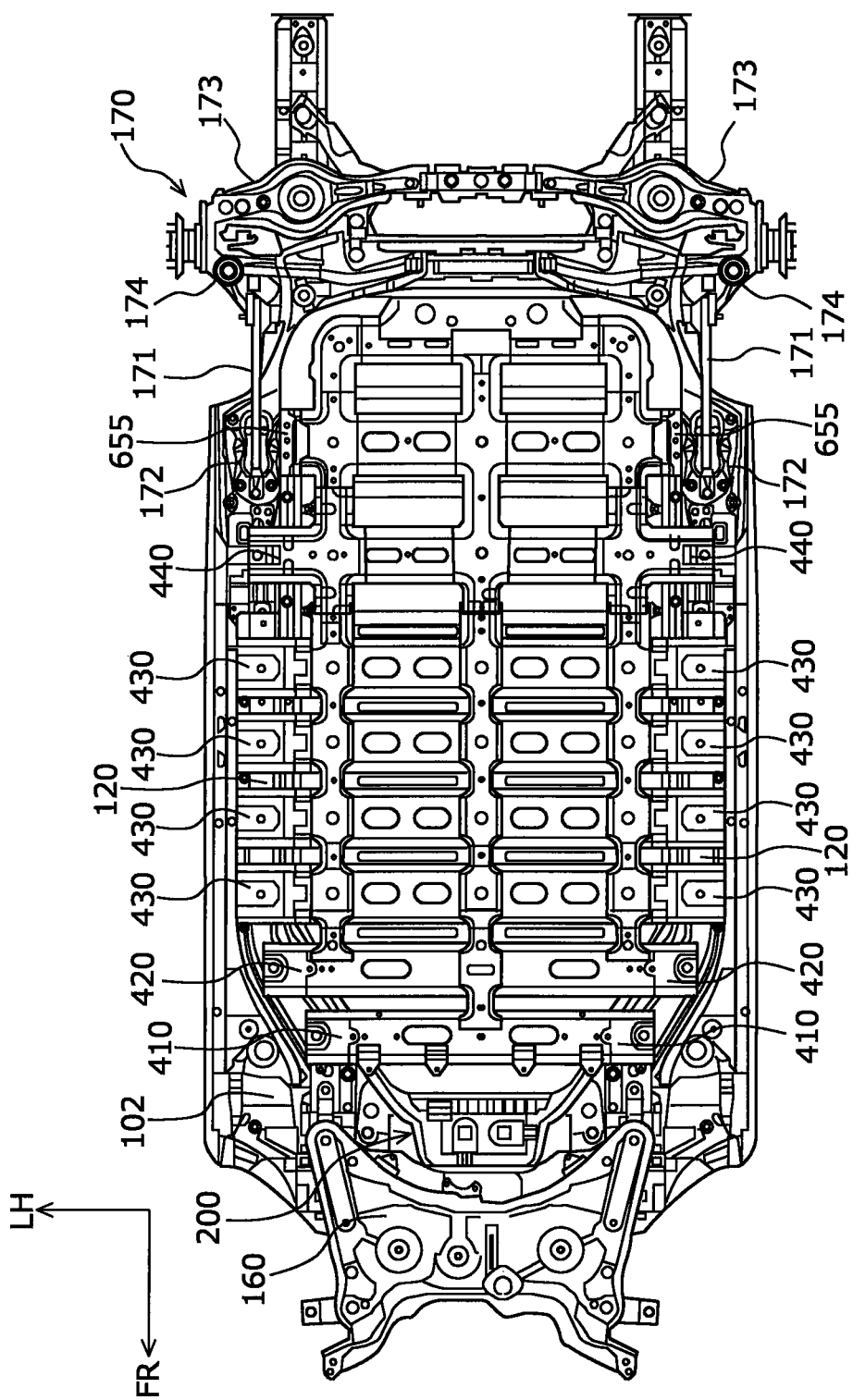
FIG. 40 is a bottom view showing the state in which the battery pack mounted below the floor of the vehicle according to the embodiment.

FIG. 40 is a bottom view showing the state in which the battery pack 200 mounted below the floor of the vehicle 100 according to the embodiment. The battery pack 200 fitted between the left and right underfloor side reinforcements 120 is bonded to the underfloor side reinforcements 120 by the case fixing side arms 410, 420, 430, 440. In other words, the battery pack 200 is held from below by the case fixing side arms 410 420, 430, 440 suspended from the underfloor side reinforcement 120.

The rear portion of the battery pack 200 is fitted between the left and right trailing arms 171. Interference between the trailing arm fixing part 172 and the battery pack 200 is of concern when attaching and detaching the trailing arm 171. However, even the extension plate 655 closest to the trailing arm fixing part 172 is accommodated inside the trailing arm fixing part 172 in the plan view.

Figure 41:
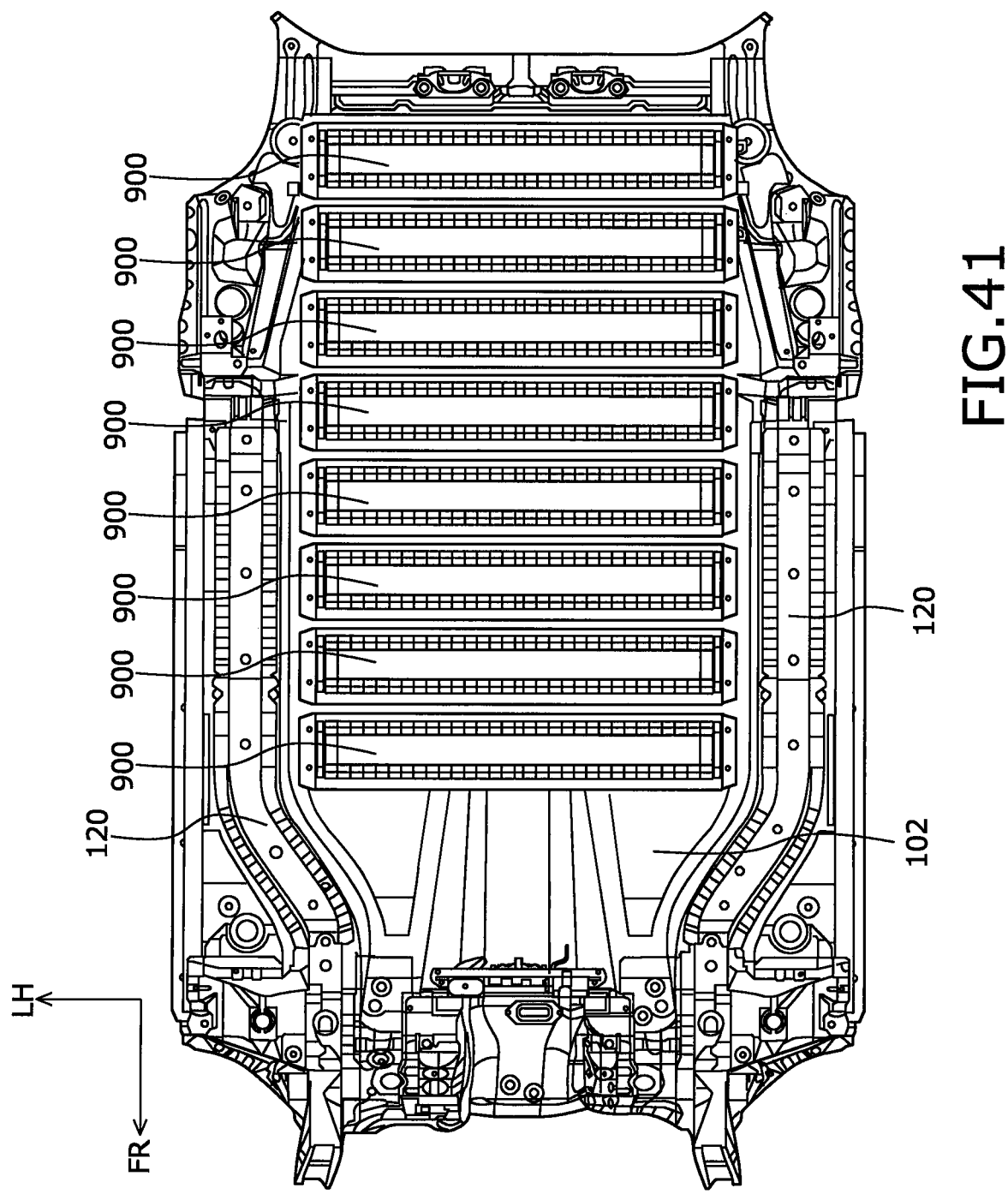
FIG. 41 is a bottom view showing the positional relation between the battery stack and the floor when the battery pack is mounted below the floor of the vehicle according to the embodiment.

FIG. 41 is a bottom view showing the positional relation between the battery stack 900 and the floor when the battery pack 200 is mounted below the floor of the vehicle 100 according to the embodiment. The battery stacks 900 are arranged in eight rows in the front-rear direction of the vehicle 100. However, for the last three rows, the battery stacks 900 are arranged in upper and lower two stages. For the battery stacks 900 of five rows from the front end, the right and left thereof are sandwiched by the underfloor side reinforcements 120. Though not shown, the right and left sides of the battery stacks 900 of the last three rows in the upper and lower two stages are sandwiched by the rear suspensions.

Figure 42:
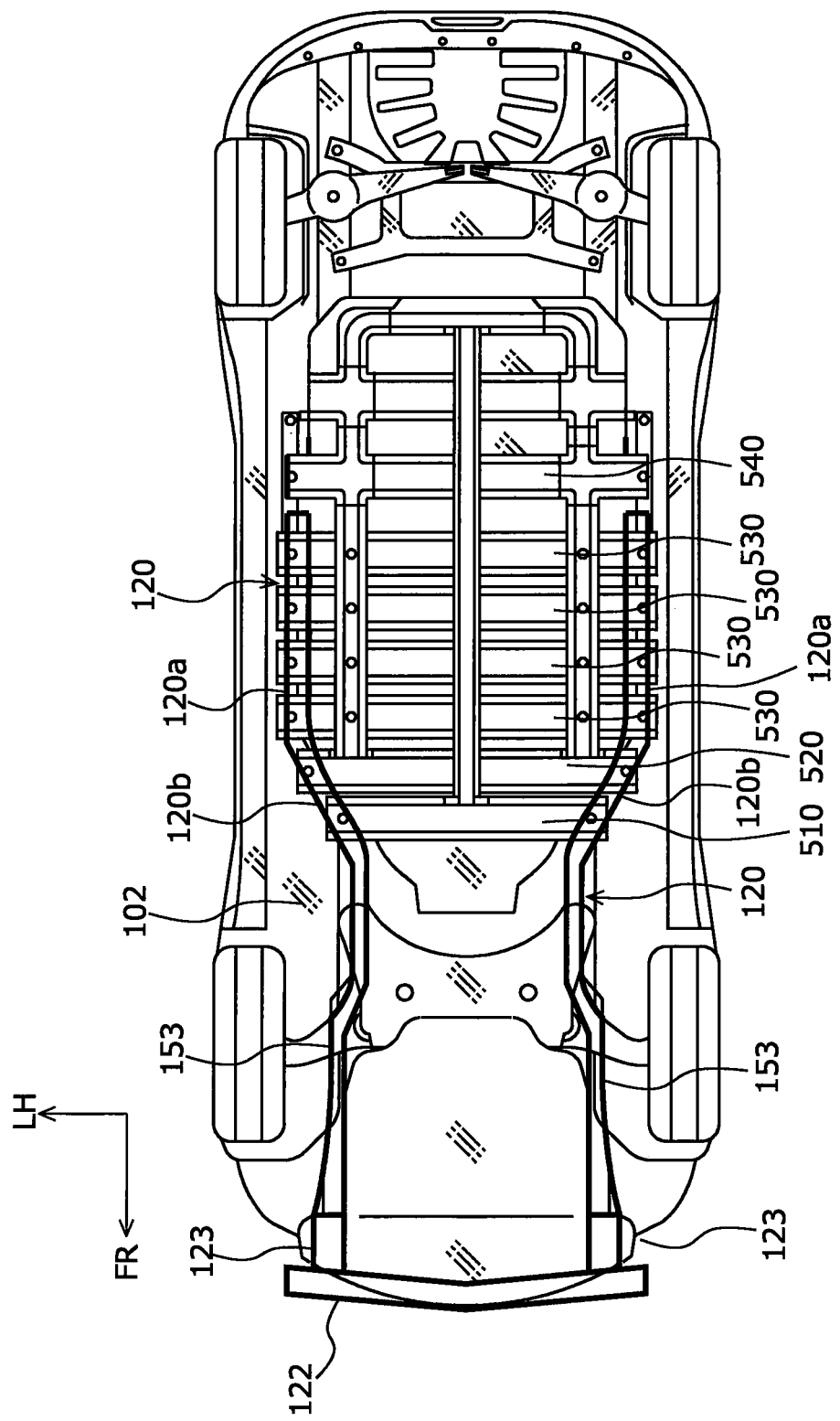
FIG. 42 is a bottom view showing the reinforcement structure below the floor of the vehicle according to the embodiment.

FIG. 42 is a bottom view showing the reinforcement structure below the floor of the vehicle 100 according to the embodiment. A pair of front side members 153 are provided on the front side of the vehicle 100. The front side member 153 is a frame member which is disposed on each of the right and left side in the width direction of the vehicle 100, and extends in the front-rear direction of the vehicle 100. A crash box 123 is attached to the front end of the front side member 153. A bumper reinforcement 122 extending in the width direction is bridged between the left and right crash boxes 123.

The front side member 153 is bonded at its rear end to the front end of the front part 120b of the underfloor side reinforcement 120. The front part 120b of the underfloor side reinforcement 120 is inclined outward in the width direction of the vehicle 100 towards the rear, and is connected to the rear part 120a. The distances between the left and right underfloor side reinforcements 120 increase in the front part 120b toward the rear, and become constant in the rear part 120a. In FIG. 42, in order to simplify the positional relationship of these members, these members are clearly shown by solid lines.

When the battery pack 200 is mounted on the vehicle 100, a plurality of outer crosswise reinforcements are fixed to the underfloor side reinforcement 120 via hanging bolts. As a result, the left and right underfloor side reinforcements 120 are connected by the plurality of the outer crosswise reinforcements. More specifically, the right and left front parts 120b, of which the distance is widened toward the rear, are connected by the outer crosswise reinforcement 510 and the outer crosswise reinforcement 520. The left and right rear parts 120a are connected by the four outer crosswise reinforcements 530.

Figure 43:
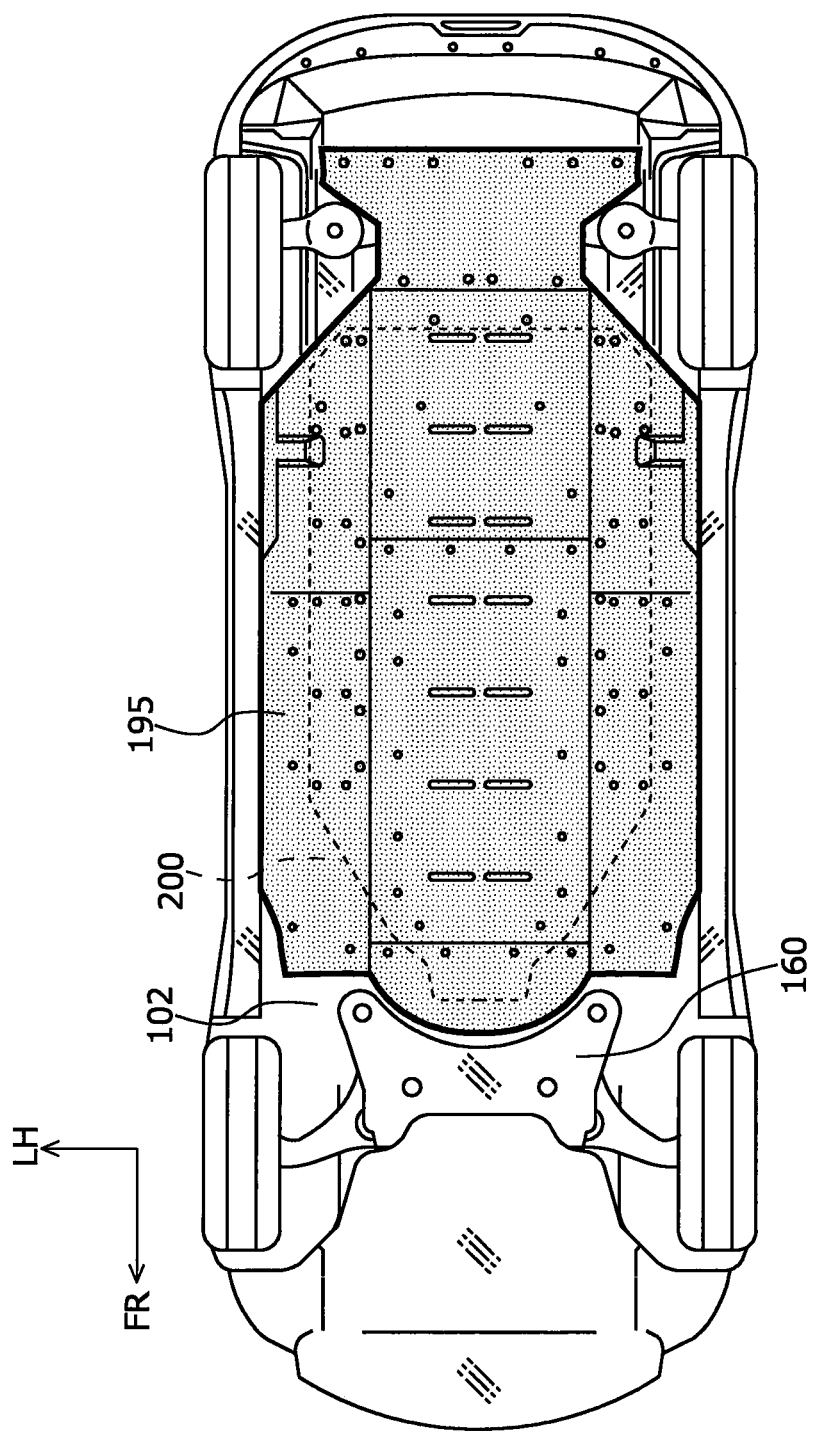
FIG. 43 is a bottom view showing the state in which the undercover is attached below the floor of the vehicle according to the embodiment.

FIG. 43 is a bottom view showing the state in which an undercover 195 is attached below the floor of the vehicle 100 according to the embodiment. The undercover 195 is provided from the vicinity of the front suspension member 160 to the rear end of the vehicle 100 so as to cover the entire bottom surface of the battery pack 200. Although not shown, the undercover 195 is disposed so as to overlap with the underfloor side reinforcement 120. The undercover 195 may be a single cover component or may be composed of a plurality of cover components.

Figure 44:
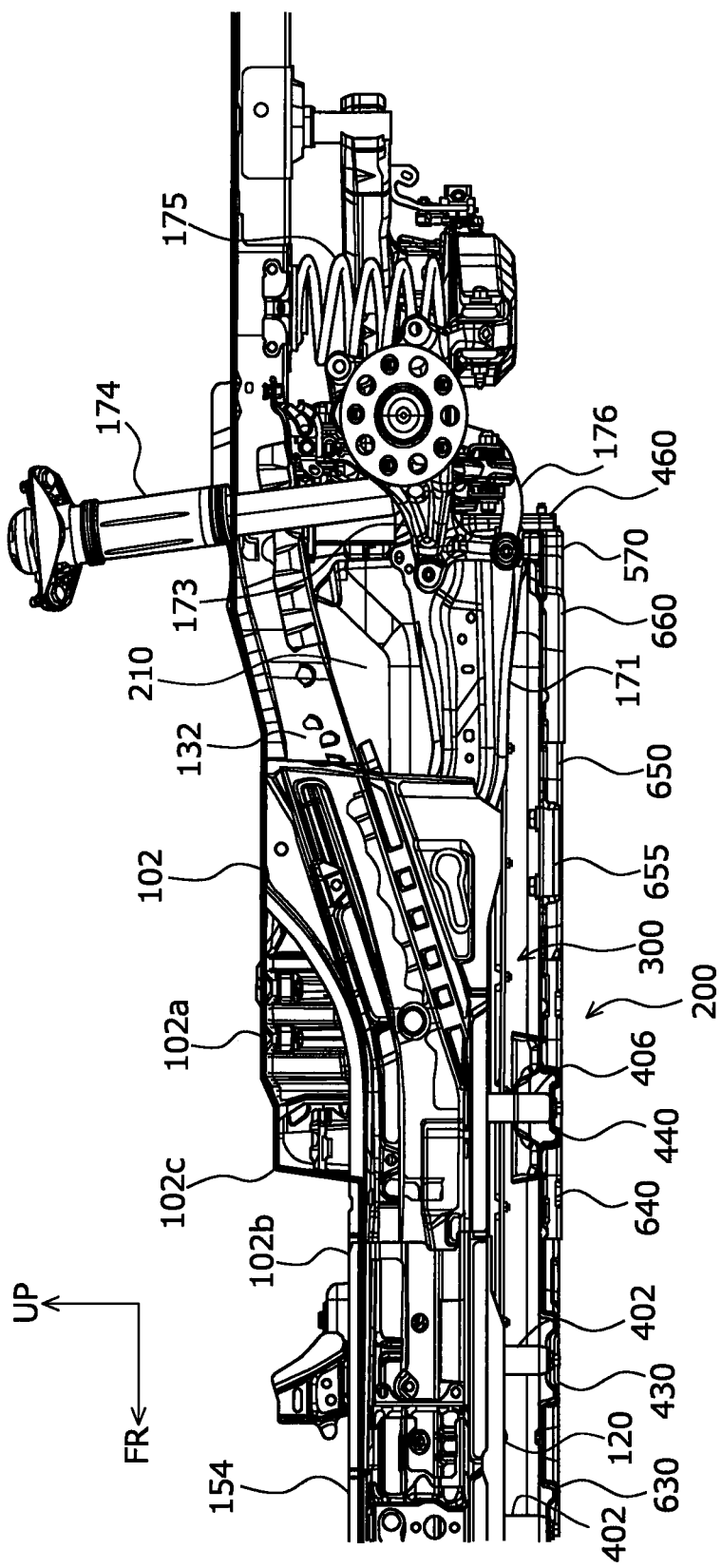
FIG. 44 is a left side view of the rear portion of the floor showing the battery pack mounted below the floor of the vehicle according to the embodiment.

FIG. 44 is a left side view of the rear portion of the floor showing the battery pack 200 mounted below the floor of the vehicle 100 according to the embodiment. The rear floor side member 132 is provided at the rear portion of the floor. The rear floor side member 132 comprises a front portion curved upwardly towards the rear and a rear portion extending straight towards the rear end. The floor panel 102 has a floor panel rear part 102a made to the height of the rear part of the rear floor side member 132 and a floor panel front part 102b made to the height of the side sill 154. Therefore, the floor panel 102 has a step 102c between the floor panel rear part 102a and the floor panel front part 102b.

The rear end of the battery pack 200 extends past the rear end of the underfloor side reinforcement 120 to the rear floor side member 132. Since the underfloor side reinforcement 120 is located at a relatively low position, the length of the collar 402 used to fix the case fixing side arm 430 to the underfloor side reinforcement 120 is short. On the other hand, since the rear floor side member 132 is curved upwardly toward the rear, the collar 406 which is longer than the collar 402 is required in order to fix the last case fixing side arm 440 to the rear floor side member 132. In other words, the long collar 406 is used to enable coupling between the rear floor side member 132 and the case fixing side arm 440.

For fixing the rear end of the battery pack 200, the case fixing rear arm 460 is used instead of combining the case fixing side arm and the collar. This is explained in more detail in the following chapters.

Figure 45:
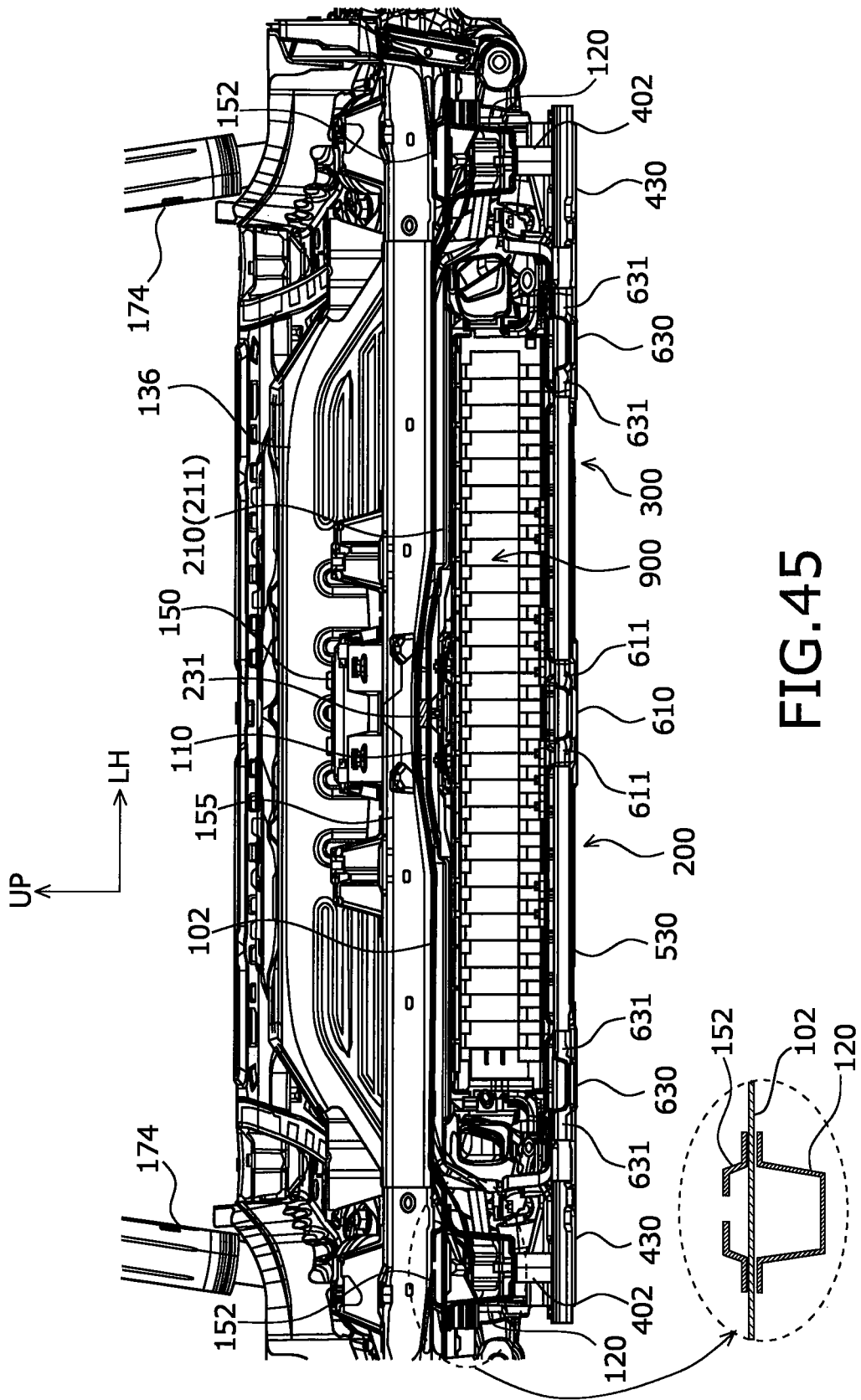
FIG. 45 is a front view of a cross-sectional plane of the floor and the battery pack viewed from the front, showing the state in which the battery pack is mounted below the floor of the vehicle according to the embodiment.

FIG. 45 is a front view of a cross-sectional plane of the floor and the battery pack 200 viewed from the front, showing the state in which the battery pack 200 is mounted below the floor of the vehicle 100 according to the embodiment. The battery pack 200 is sandwiched between a pair of underfloor side reinforcements 120 from the left and right. The on-floor side reinforcement 152 is provided on the side opposite to the underfloor side reinforcement 120 across the floor panel 102. The underfloor side reinforcement 120 has a deep hat-shaped cross-section that opens upwardly, and the on-floor side reinforcement 152 has a shallow hat-shaped cross-section that opens downwardly, both of which are bonded with the floor panel 102 in between. The on-floor side reinforcement 152 is held from above by seat cross members extending in the width direction (only the first seat cross member 155 is shown in FIG. 45).

The lower case 300 of the battery pack 200 is reinforced and supported on its bottom surface by a plurality of reinforcements. In FIG. 45, the bottom surface of the lower case 300 is reinforced and supported by the outer crosswise reinforcement 530 extending in the width direction, and the outer central lengthwise reinforcement 610 and outer side lengthwise reinforcement 630 extending in the front-rear direction. In front view, the bracing parts 611, 631 of the outer central lengthwise reinforcement 610 and the outer side lengthwise reinforcement 630 overlap the longitudinal side of the outer crosswise reinforcement 530. Although not shown in the drawings, in other combinations of the outer lengthwise reinforcement and the outer crosswise reinforcement, the bracing part of the outer lengthwise reinforcement overlaps the longitudinal side of the outer crosswise reinforcement when viewed from the front.

A gap is provided between the upper case 210 of the battery pack 200 and the floor panel 102. The vertical position of the battery pack 200 is adjusted by the length of the left and right collars (only the collar 402 is shown in FIG. 45). As will be described later in detail, a elastic member (only first elastic member 231 is displayed in FIG. 45) is interposed between the central ridge 213 of the upper case 210 and the floor tunnel 110 of the floor pane 1102.

3-4. Mounting Structure of Battery Pack Rear End

The rear end mounting structure of the battery pack 200 will be described in detail with reference to FIGS. 46 to 49.

Figure 46:
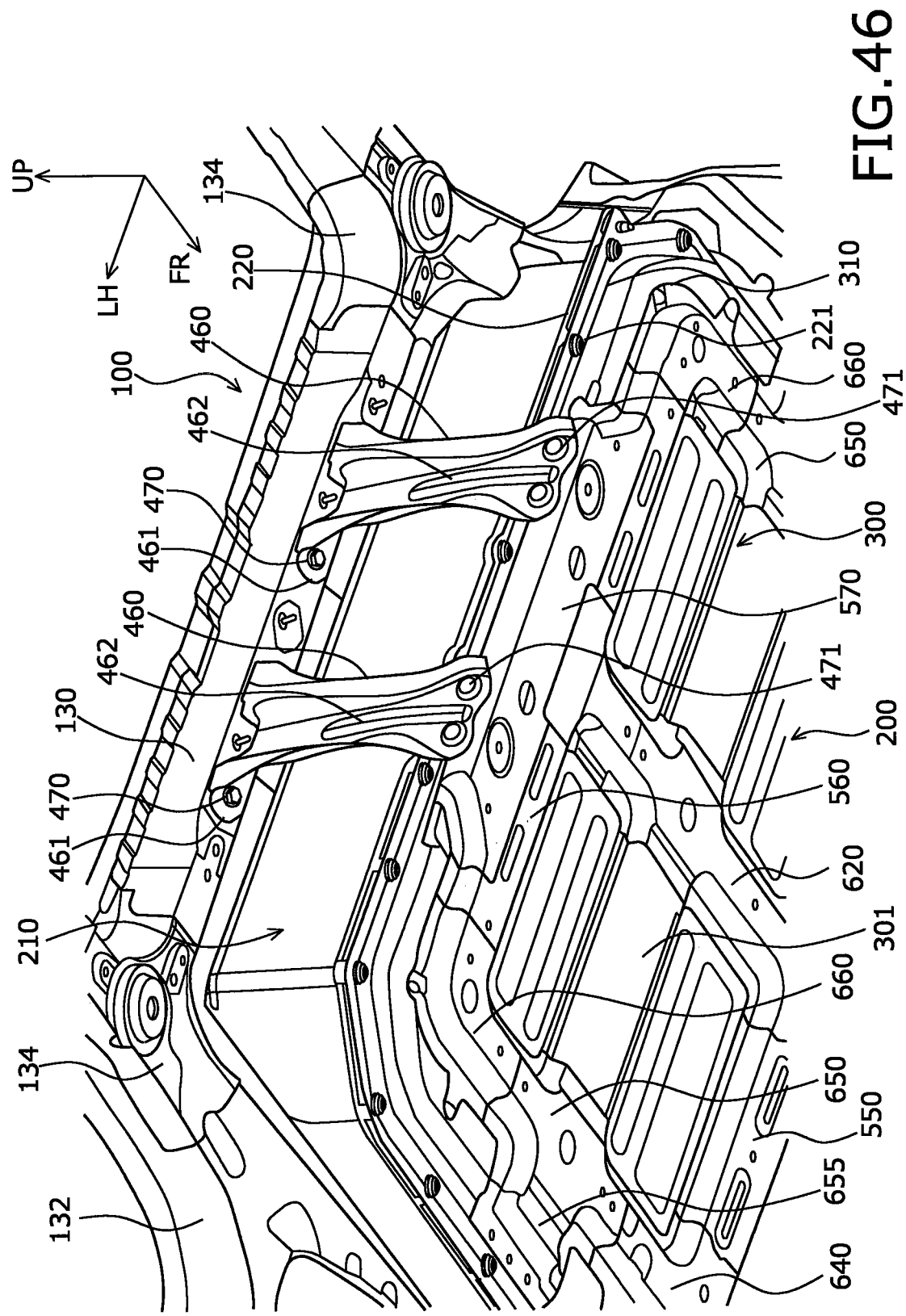
FIG. 46 is an enlarged perspective view of the rear end of the lower case viewed from the lower left rear obliquely, showing the case fixing rear arm of the battery pack attached to the rear underfloor cross member.

FIG. 46 is an enlarged perspective view of the rear end of the lower case 300 viewed from the lower left rear obliquely, showing the case fixing rear arm 460 of the battery pack 200 attached to the rear underfloor cross member 130. The case fixing rear arm 460 has a rearwardly open hat-shaped cross-section. At its upper end, the case fixing rear arm 460 has a folded part 461 in which the collar of the hat is folded back forward.

The vehicle member close to the rear end of the battery pack 200 is the rear underfloor cross member 130 that extends in the width direction of the vehicle 100. The rear underfloor cross member 130 is bonded to the rear floor side member 132 via a bracket 134. However, since there is a distance from the lower case 300 of the battery pack 200 to the rear underfloor cross member 130, it is difficult to fix them by using a hanging bolt and a collar as used for fixing the side portion. Thus, the case fixing rear arm 460 extending from the rear end of the lower case 300 is used to fix the rear end of the battery pack 200 to the vehicle 100.

The lower end of the case fixing rear arm 460 is fastened to the outer rear end bracket 570. The folded part 461 at the top end is fastened to the rear underfloor cross member 130, thereby fixing the rear end of the battery pack 200 to the vehicle 100. The fastener 471 is used for the fastening between the outer rear end bracket 570 and the case fixing rear arm 460, and the fastener 470 is also used for the fastening between the rear underfloor cross member 130 and the case fixing rear arm 460. A rib 462 for reinforcing is formed on the case fixing rear arm 460. The rib 462 extends upwardly between the two fasteners 471.

Figure 47:
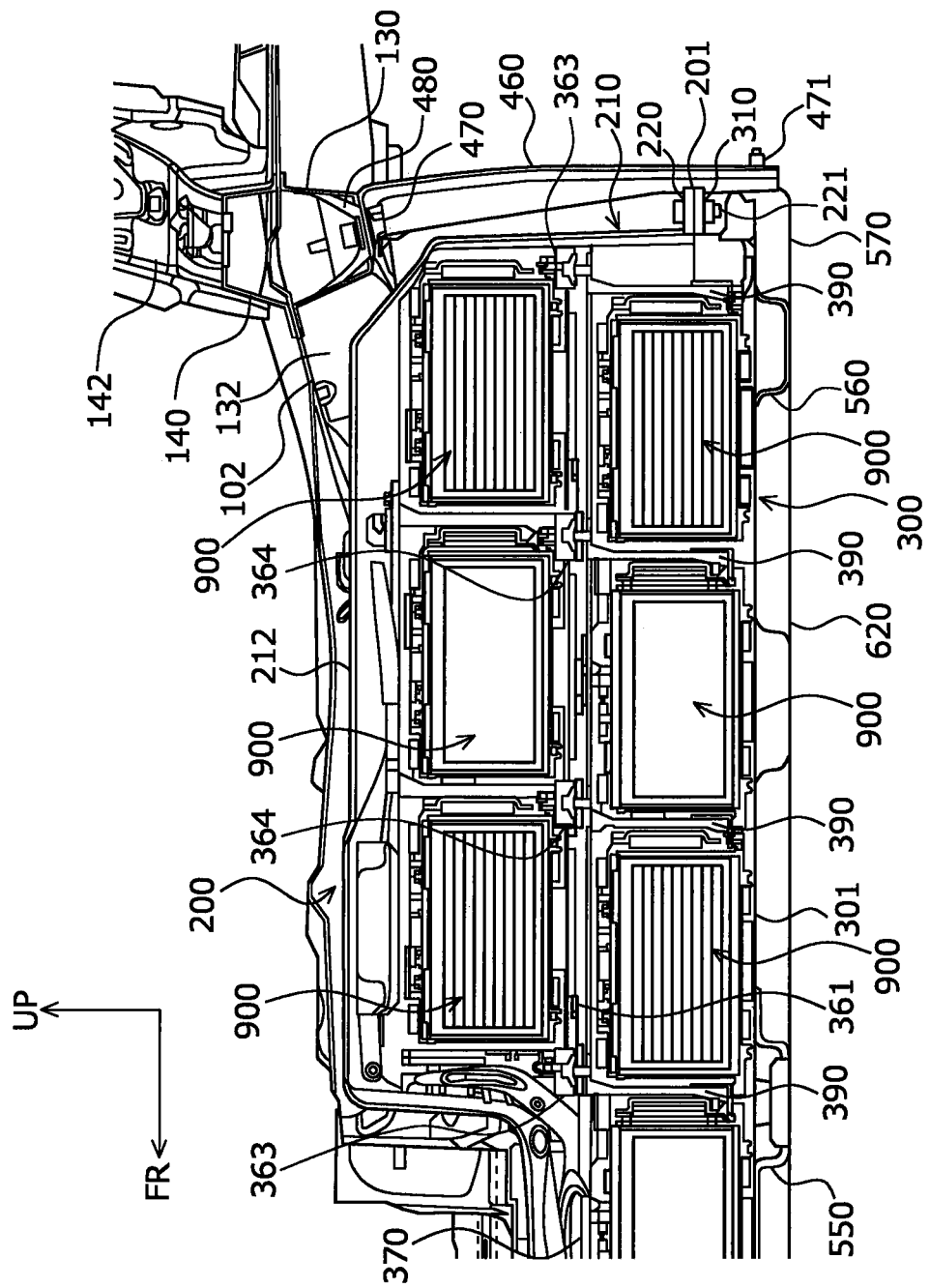
FIG. 47 is an enlarged side view of the rear portion of the floor and the battery pack viewed from the left side when the floor and the battery pack are cut along the front-rear centerline of the vehicle with the battery pack mounted below the floor.

FIG. 47 is an enlarged side view of the rear portion of the floor and the battery pack 200 viewed from the left side when the floor and the battery pack 200 are cut along the front-rear centerline of the vehicle 100 with the battery pack 200 mounted below the floor. The case fixing rear arm 460 is forward tilted toward the front of the vehicle 100. More specifically, the case fixing rear arm 460 rises directly from the fastening point with the outer rear end bracket 570, bends forward, and extends to the fastening point with the rear underfloor cross member 130. Thus, when the battery pack 200 is mounted on the vehicle 100, the rear end 201 of the battery pack 200 is positioned in the lower rear of the rear underfloor cross member 130.

The bulkhead 480 is disposed at a position in the rear underfloor cross member 130 where the case fixing rear arm 460 is fastened to the rear underfloor cross member 130, and is fixed to the inside of the rear underfloor cross member 130 by welding or the like. The rear underfloor cross member 130 is bonded to the rear on-floor cross member 140 with the floor panel 102 interposed therebetween.

Figure 48:
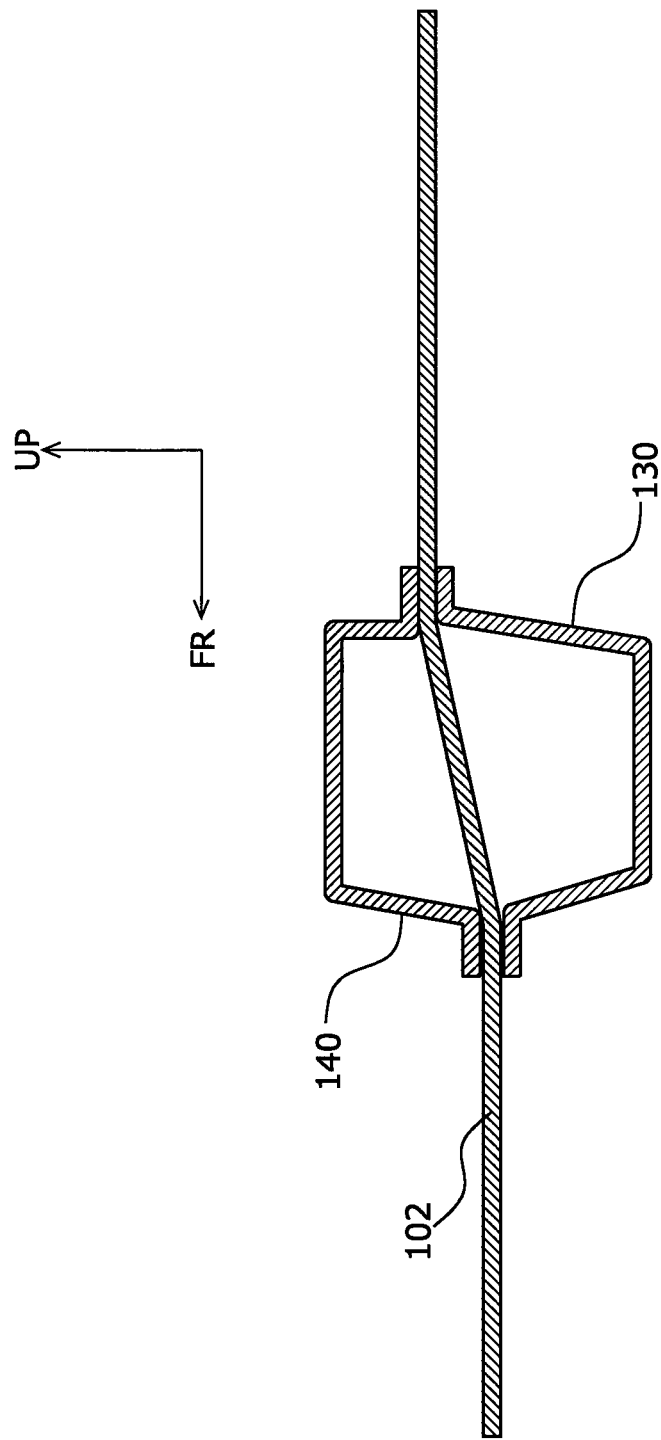
FIG. 48 is an enlarged cross-sectional view schematically showing the junction between the rear underfloor cross member, the rear on-floor cross member, and the floor panel.

FIG. 48 is an enlarged cross-sectional view schematically showing the junction between the rear underfloor cross member 130, the rear on-floor cross member 140, and the floor panel 102. The rear underfloor cross member 130 has an upwardly open hat-shaped cross-section and the rear on-floor cross member 140 has a downwardly open hat-shaped cross-section. The open side of the rear underfloor cross member 130 and the open side of the rear on-floor cross member 140 both form a closed cross-section with the floor panel 102, and the open side of the rear underfloor cross member 130 and the open side of the rear on-floor cross member 140 face each other substantially vertically across the floor panel 102.

Figure 49:
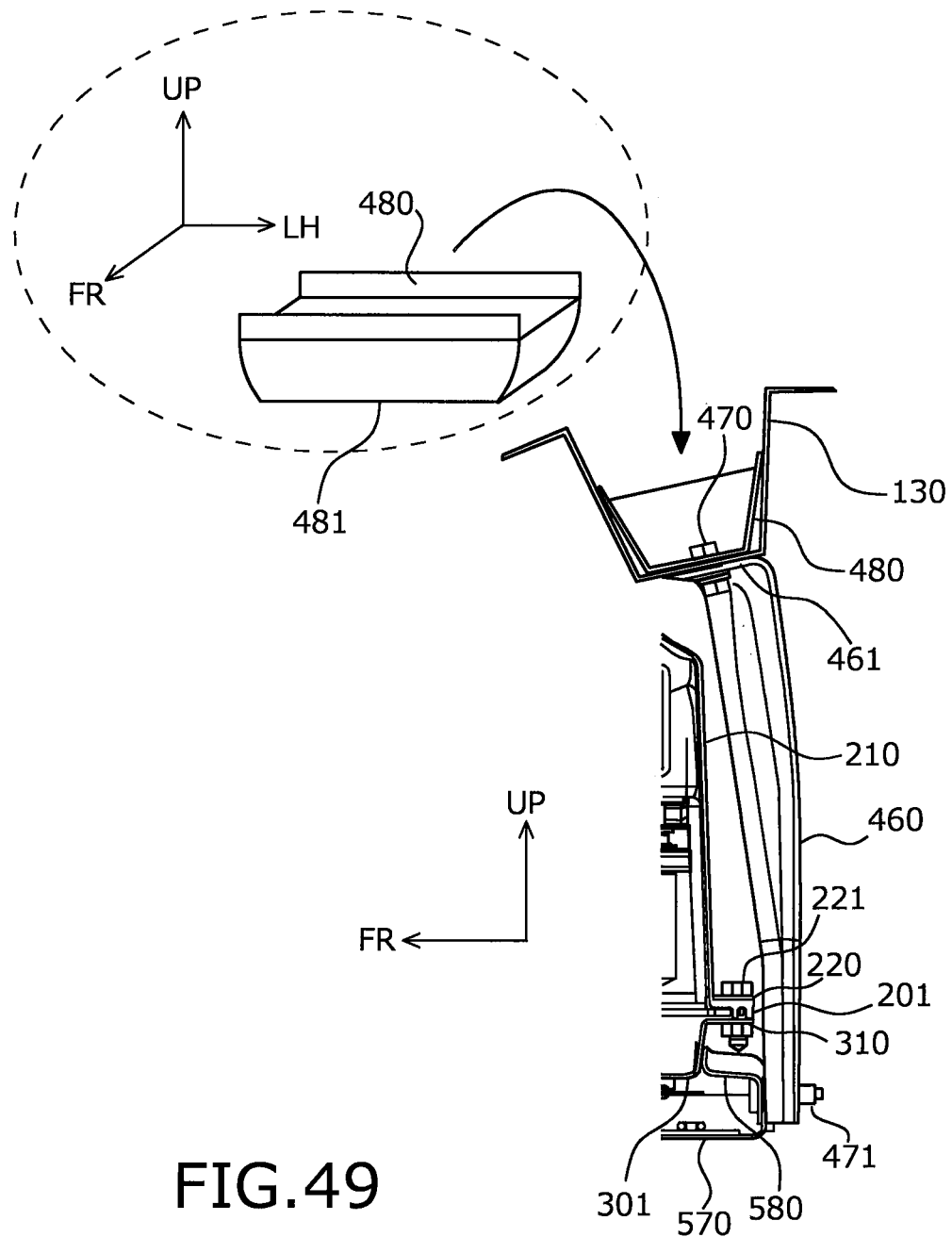
FIG. 49 schematically shows a detail of the structure for fixing the case fixing rear arm to the rear underfloor cross member.

FIG. 49 schematically shows a detail of the structure for fixing the case fixing rear arm 460 to the rear underfloor cross member 130. The bulkhead 480 for reinforcement is accommodated in the rear underfloor cross member 130 having a hat-shaped cross-section. The bulkhead 480 has a box or dish shape with an open top. The fastener 470 is mounted to sandwich the bottom 131 of the rear underfloor cross member 130 between the bottom 481 of the bulkhead 480 and the folded part 461 of the case fixing rear arm 460.

3-5. Upper Case Supporting Structure

Next, the supporting structure of the upper case 210 will be described with reference to FIGS. 50 to 55.

Figure 50:
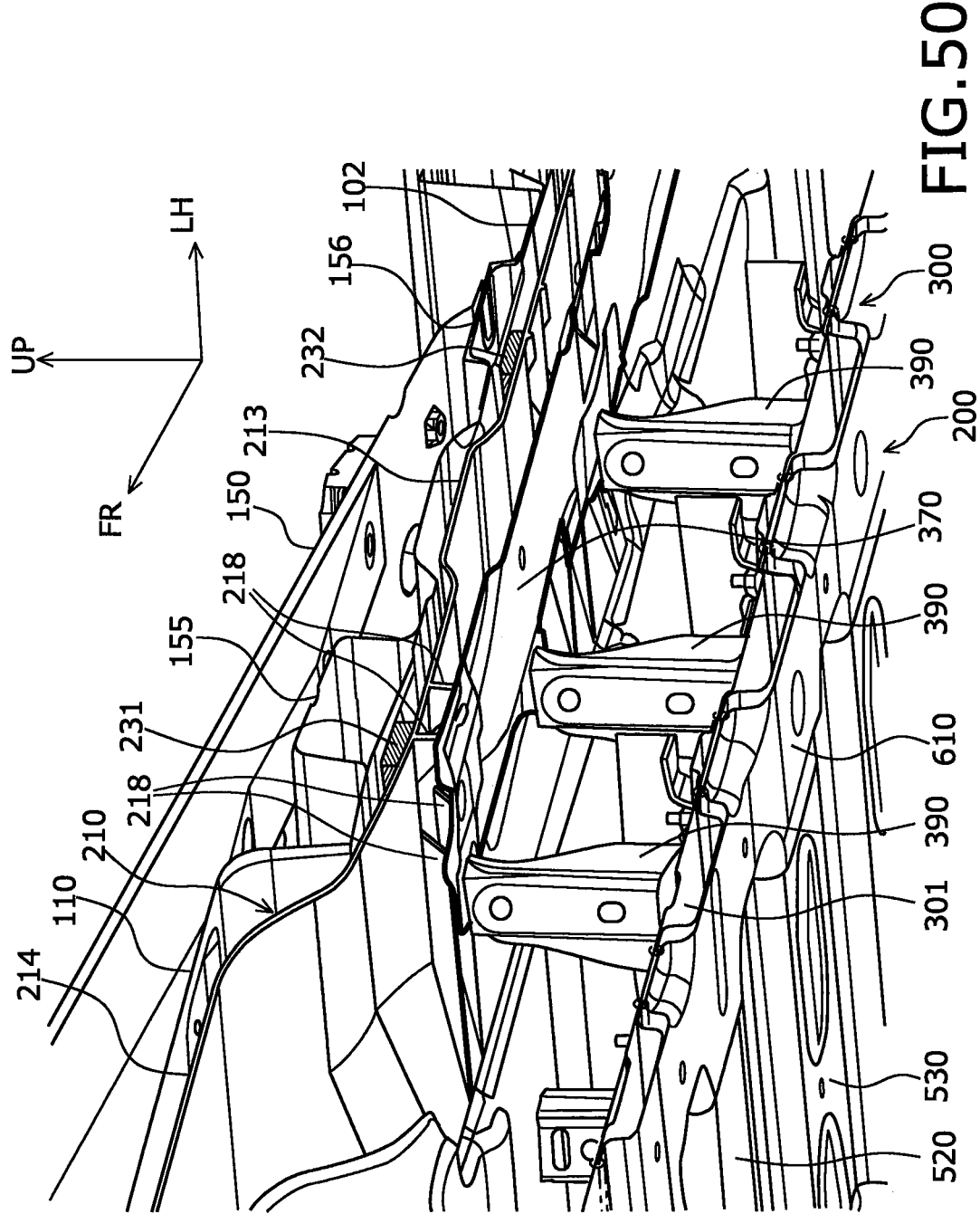
FIG. 50 is an enlarged perspective view of the floor and the battery pack viewed from the lower left front obliquely when the floor is cut along the front-rear centerline of the vehicle with the battery pack mounted under the floor and not equipped with the battery stack and the heating/cooling device, showing the supporting structure of the upper case.

FIG. 50 is an enlarged perspective view of the floor and the battery pack 200 viewed from the lower left front obliquely when the floor is cut along the front-rear centerline of the vehicle 100 with the battery pack 200 mounted under the floor and not equipped with the battery stack 900 and the heating/cooling device, showing the supporting structure of the upper case 210. A plurality of the support legs 390, which are support members, extend upwardly from the bottom of the lower case 300. The center plate 370 is bridged over the upper ends of the support legs 390 aligned along the centerline.

Directly above the center plate 370 is the central ridge 213 of the upper case 210. A plurality of spaced apart ribs 218 are formed on the back surface of the central ridge 213. The respective ribs 218 extend in the left and right direction, and thereby the upper case 210 is reinforced. The rib 218 and the center plate 370 abut and the center plate 370 supports the rib 218 from below. That is, the support leg 390 serves as a support member that supports the upper case 210 from below via the center plate 370 and the rib 218, as well as a support member that supports the center plate 370. The shape of the lower edge of the rib 218 is formed so as to substantially coincide with the shape of the opposing center plate 370.

A gap is secured between the upper case 210 and the floor panel 102. Two elastic members 231, 232 are disposed in the gap, and are sandwiched between the surface of the upper case 210 and the bottom surface of the floor panel 102. The forwardly disposed first elastic member 231 is located directly below the first seat cross member 155. The rearwardly disposed second elastic member 232 is located directly below the second seat cross member 156.

Figure 51:
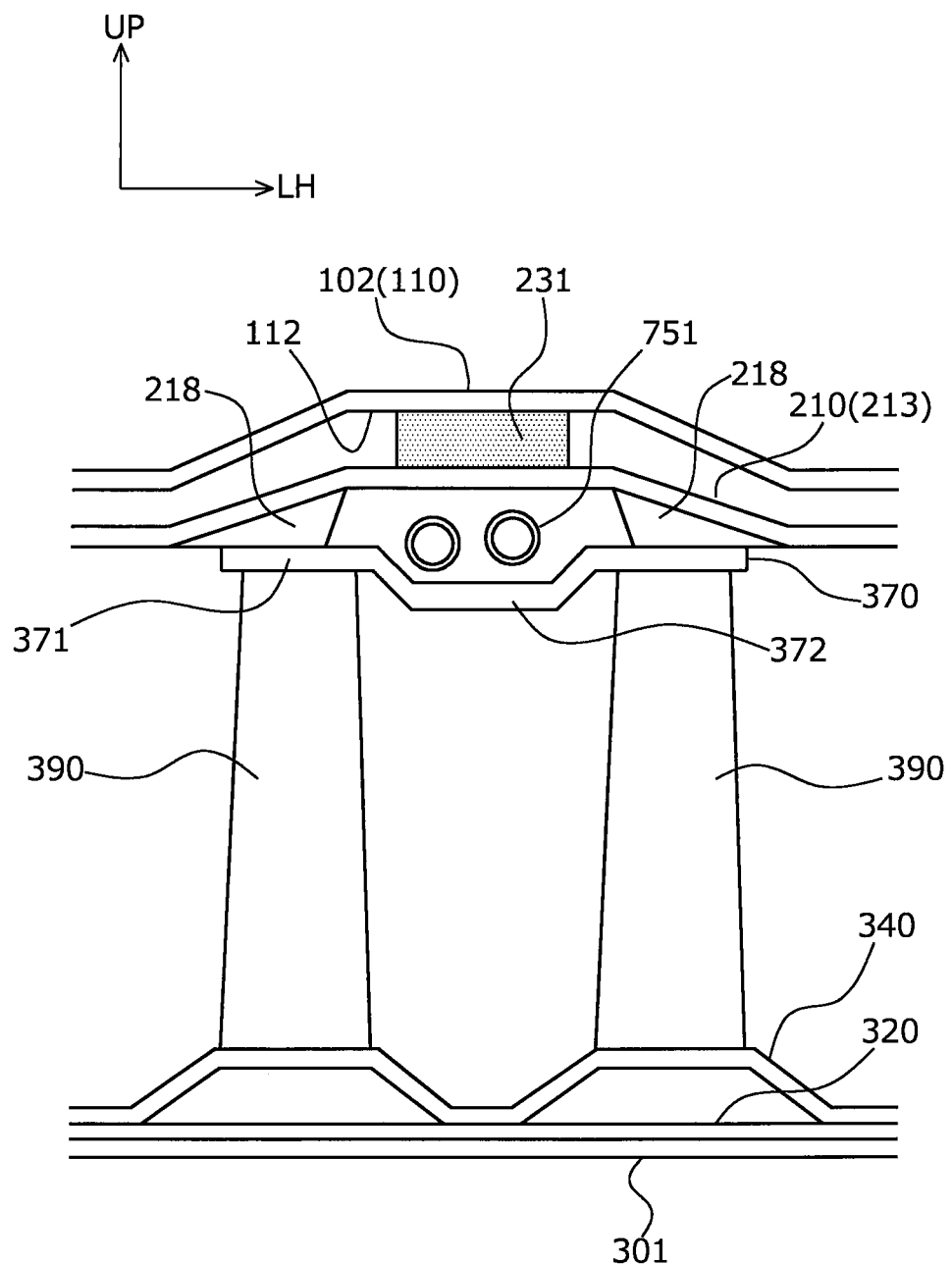
FIG. 51 is a schematic front view of the periphery of the center plate when the floor and the battery pack are cut in the width direction thereof and viewed from the front, showing the supporting structure of the upper case.

FIG. 51 is a schematic front view of the periphery of the center plate 370 when the floor and the battery pack 200 are cut in the width direction thereof and viewed from the front, showing the supporting structure of the upper case 210. The support leg 390 supporting the center plate 370 is bonded to the partition bracket 340. The partition bracket 340 is bonded to the inner crosswise reinforcement 320 that reinforces the bottom panel 301. The stiffness of the inner crosswise reinforcement 320 is further increased by the bonding of the partition bracket 340. Since the bonded body of the partition bracket 340 and the inner crosswise reinforcement 320 is a rigid body, it can be said that the support leg 390 as the support member extends upwardly from the rigid body disposed inside the lower case 300.

The center plate 370 has the recess 372 through which the cables 751 are passed and the flanges 371 formed on both sides thereof. The flange 371 has a flat surface. The ribs 218, which are formed on the back surface of the upper case 210, specifically, the back surface of the central ridge 213, are provided in two rows in the front view. The rib 218 of the right row abuts the flat surface of the right flange 371 and the rib 218 of the left row abuts the flat surface of the left flange 371. The cables 751 pass between two rows of the ribs 218.

The elastic members 231, 232 are disposed on the central ridge 213, but the second elastic member 232 is hidden behind the first elastic member 231 in FIG. 51. The first elastic member 231 is disposed so that the position of the first elastic member 231 in the width direction is located between the support legs 390 arranged in two rows in the front view. In addition, the first elastic member 231 is disposed such that the position of the first elastic member 231 in the width direction is located between the ribs 218 arranged in two rows in the front view. The second elastic member 232 (not shown) is arranged in the same manner as the first elastic member 231. That the first elastic member 231 is positioned between two members does not mean that the first elastic member 231 fits between the two members. At least a portion, preferably the center portion or gravity center, of the first elastic member 231 may be positioned between the two members. The same applies to the position of the second elastic member 232.

A first pedestal 112 is formed on the floor panel 102 at a position in contact with the first elastic member 231. The first pedestal 112 is recessed upwardly from the back surface of the floor panel 102, and regulates the positional deviation of the first elastic member 231 in the front, rear, left, and right directions. A similar pedestal is also formed on the floor panel 102 at a position in contact with the second elastic member 232. The elastic members 231, 232 and the upper case 210 are bonded to each other, for example, by an adhesive.

Figure 52:
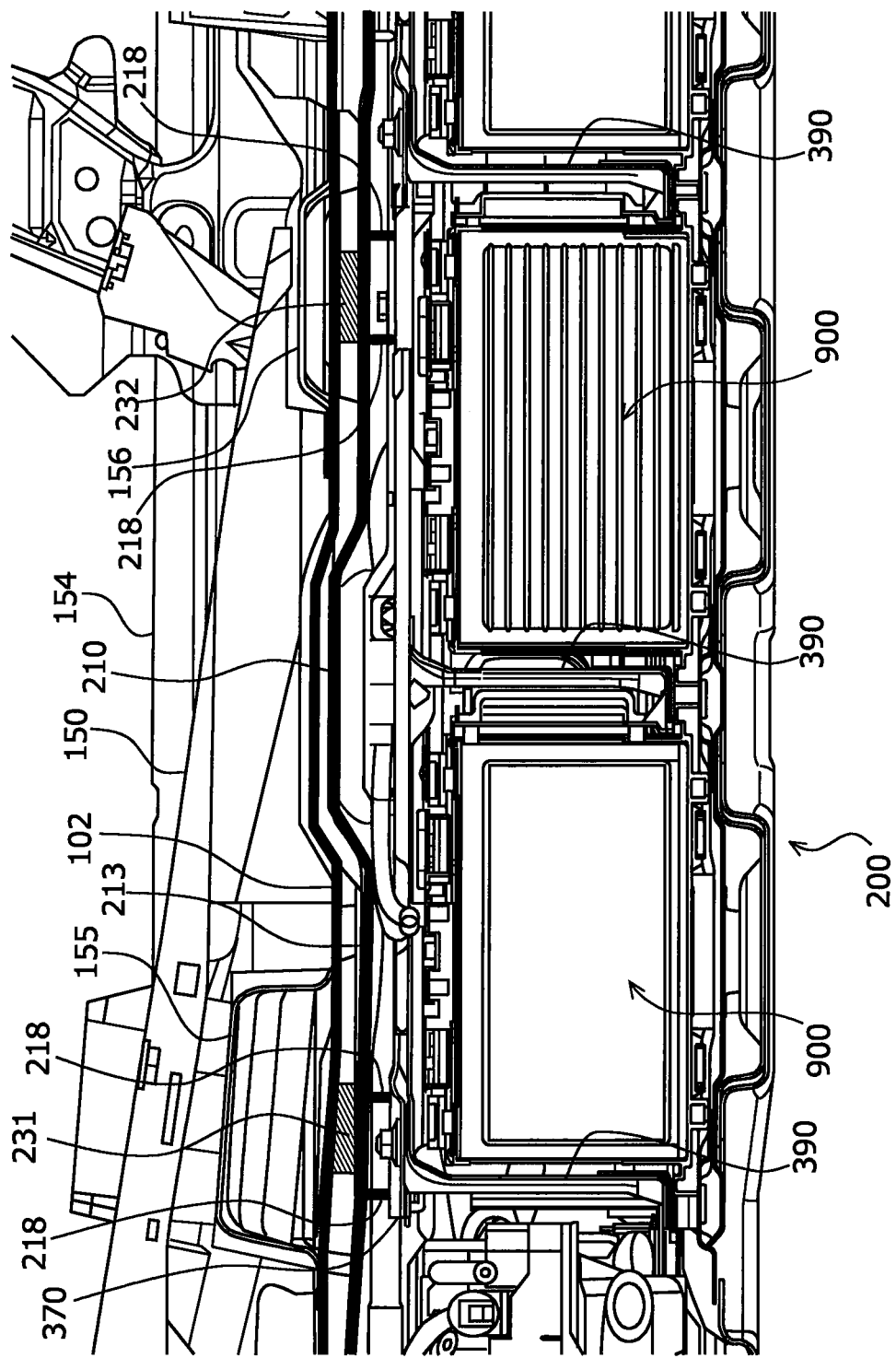
FIG. 52 is an enlarged side view of the floor and the battery pack viewed from the left side when the floor is cut along the front-rear centerline of the vehicle with the battery pack mounted below the floor, showing the supporting structure of the upper case.

FIG. 52 is an enlarged side view of the floor and the battery pack 200 viewed from the left side when the floor is cut along the front-rear centerline of the vehicle 100 with the battery pack 200 mounted below the floor, showing the supporting structure of the upper case 210. On the back surface of the central ridge 213 of the upper case 210, at least two sets of the ribs 218 formed in two rows are provided in the side view. The front two rows of the ribs 218 are located below the first elastic member 231 in the side view and the rear two rows of the ribs 218 are located below the second elastic member 232 in the side view.

The first elastic member 231 is disposed such that the position of the first elastic member 231 in the front-rear direction is located between the two adjacent support legs 390 in the side view. In addition, the first elastic member 231 is disposed such that the position of the first elastic member 231 in the front-rear direction is located between the front two rows of the ribs 218 in the side view. The second elastic member 232 is disposed such that the position of the second elastic member 232 in the front-rear direction is located between the two adjacent support legs 390 in the side view. In addition, the second elastic member 232 is disposed such that the position of the second elastic member 232 in the front-rear direction is located between the rear two rows of the ribs 218 in the side view.

Figure 53:
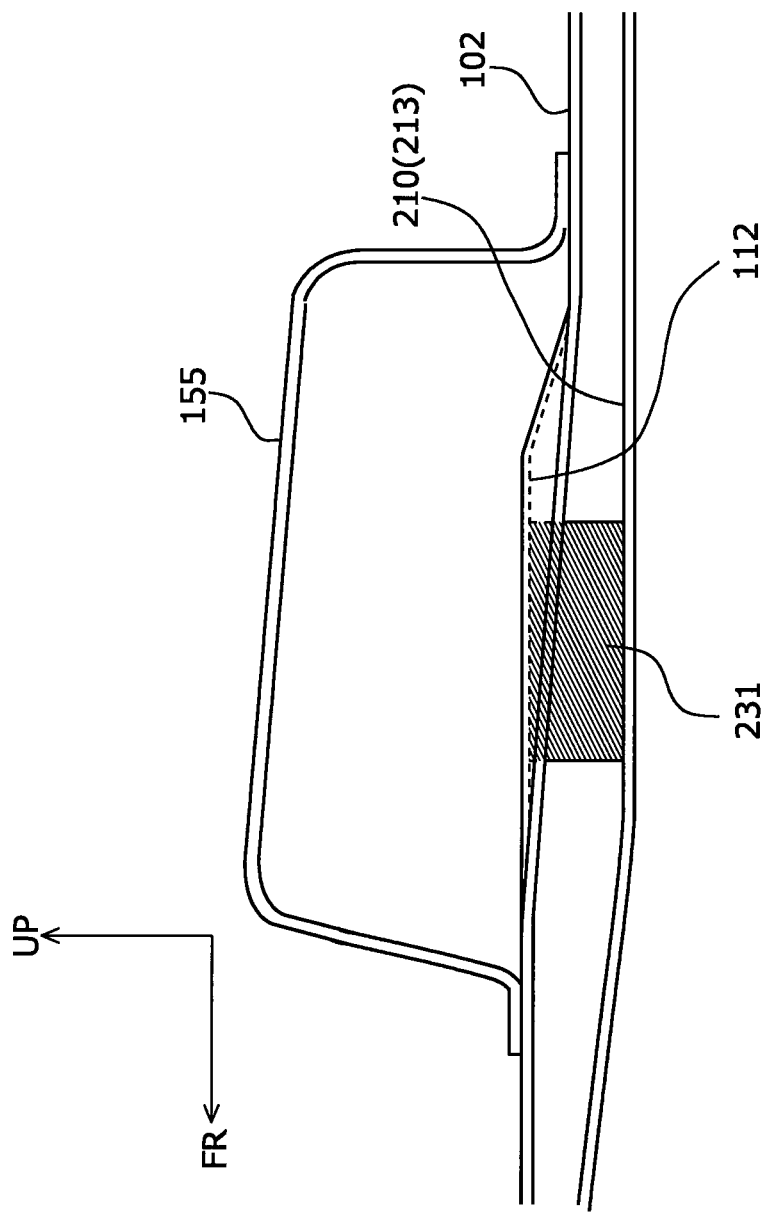
FIG. 53 is a schematic longitudinal cross-sectional view showing the engagement of the first elastic member with the first pedestal formed on the floor panel.
Figure 54:
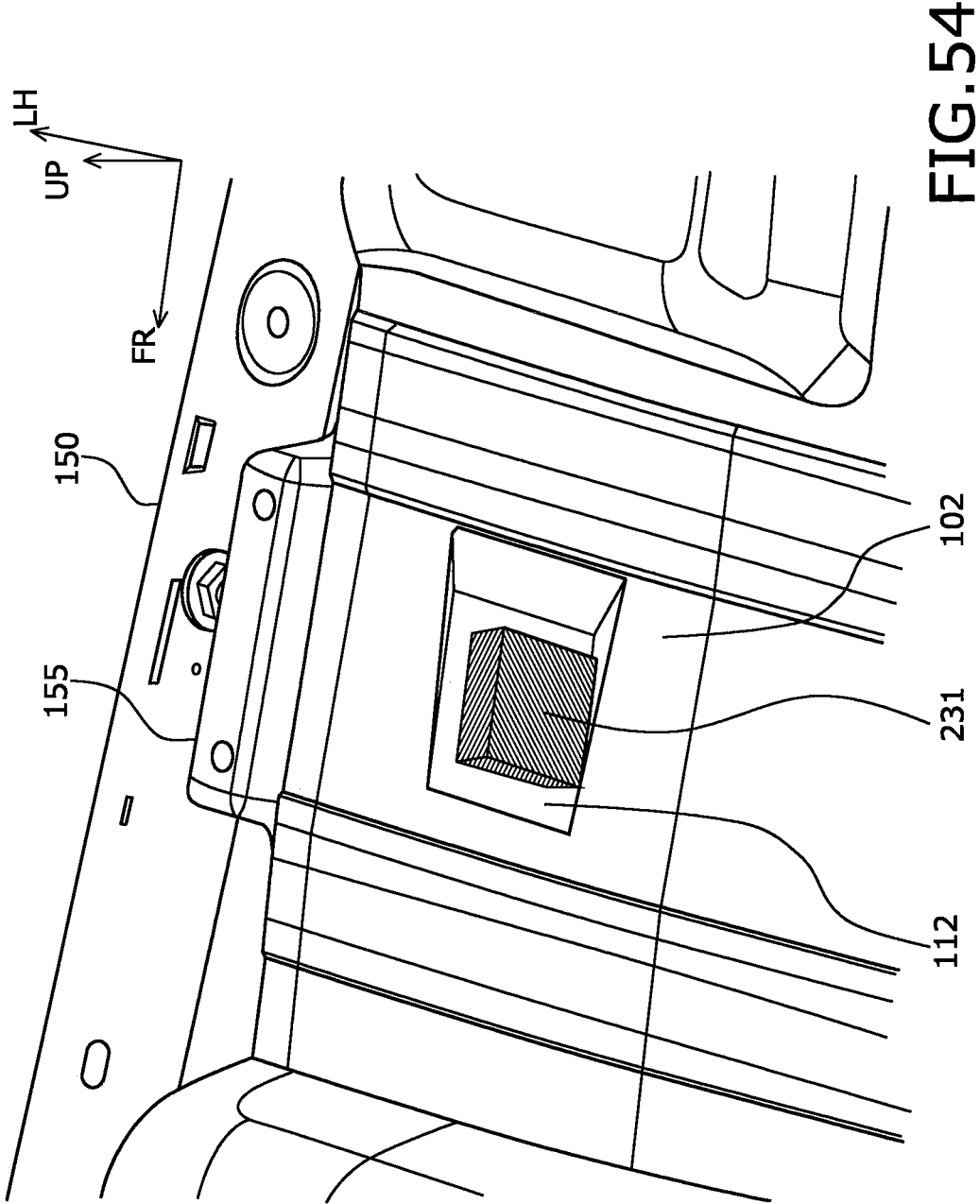
FIG. 54 is a perspective view of the periphery of the first pedestal of the floor panel viewed from below obliquely, showing the engagement of the first elastic member with the first pedestal formed on the floor panel.

FIG. 53 is a schematic longitudinal cross-sectional view showing the engagement of the first elastic member 231 with the first pedestal 112 formed on the floor panel 102. FIG. 54 is a perspective view of the periphery of the first pedestal 112 of the floor panel 102 viewed from below obliquely, showing the engagement of the first elastic member 231 with the first pedestal 112 formed on the floor panel 102 The first seat cross member 155 which opens downwardly is bonded to the floor panel 102. The first pedestal 112 is inside the first seat cross member 155 and recessed upwardly from the back surface of the floor panel 102. The ceiling surface of the first pedestal 112 is flat and parallel to the surface of the upper case 210. When the battery pack 200 is mounted on the vehicle 100, the first elastic member 231 is compressed between the first pedestal 112 and the surface of the upper case 210 while being restrained from being displaced in the front, rear, left, and right directions by the first pedestal 112.

Figure 55:
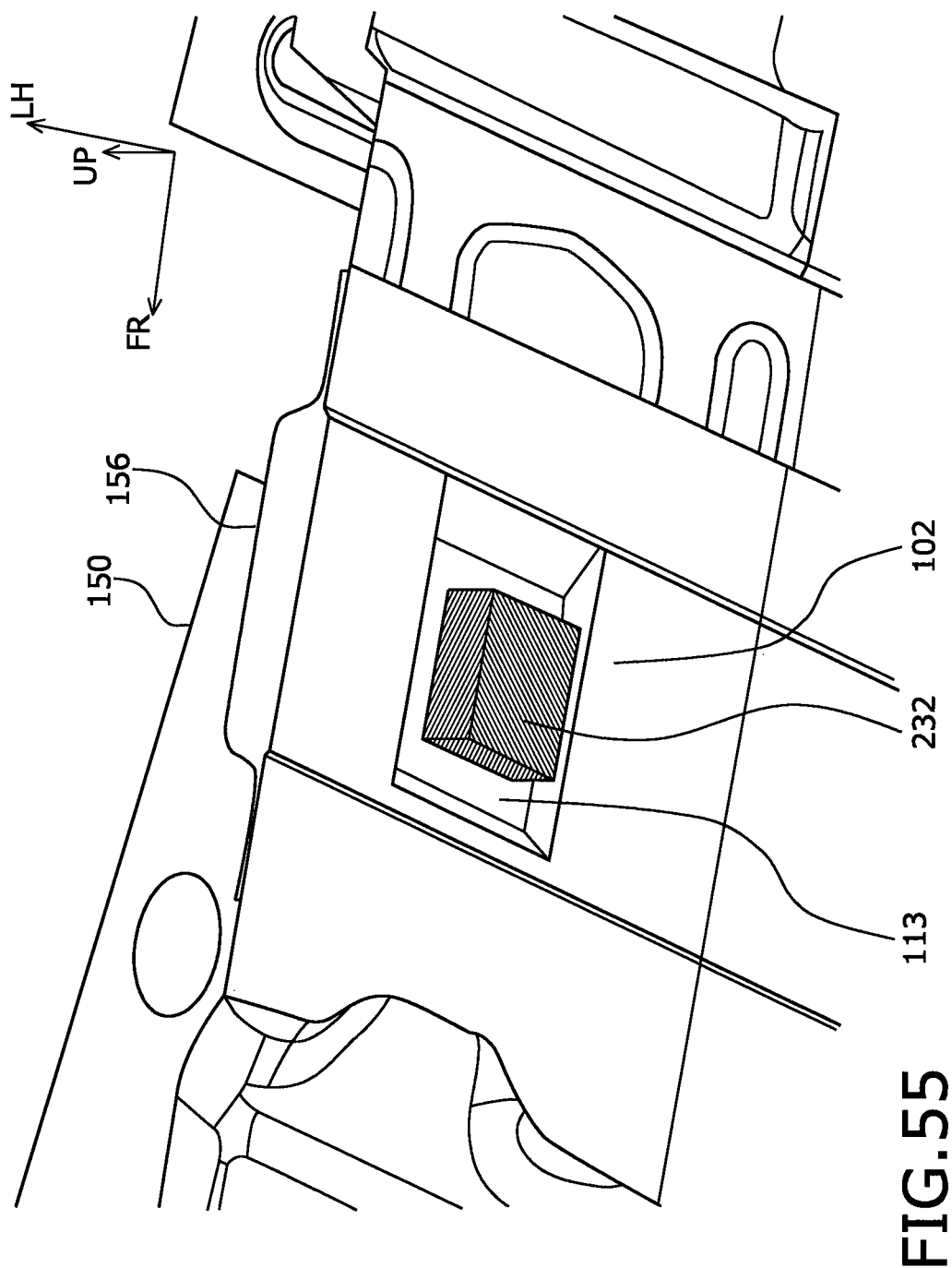
FIG. 55 is a perspective view of the periphery of the second pedestal of the floor panel viewed from below obliquely, showing the engagement of the second elastic member with the second pedestal formed on the floor panel.

FIG. 55 is a perspective view of the periphery of the second pedestal 113 of the floor panel 102 viewed from below obliquely, showing the engagement of the second elastic member 232 with the second pedestal 113 formed on the floor panel 102. The second seat cross member 156 which opens downwardly is bonded to the floor panel 102. The second pedestal 113 is inside the second seat cross member 156 and recessed upwardly from the back surface of the floor panel 102. The ceiling surface of the second pedestal 113 is flat and parallel to the surface of the upper case 210. When the battery pack 200 is mounted on the vehicle 100, the second elastic member 232 is compressed between the second pedestal 113 and the surface of the upper case 210 while being restrained from being displaced in the front, rear, left, and right directions by the second pedestal 113.

4. Features and Advantages

Features and advantages of the body structure of the vehicle 100 according to the embodiment and the battery pack 200 according to the embodiment will be enumerated. However, these are some of the features of the present disclosure, and the present disclosure is not limited to the features and advantages listed below.

4-1. Support of Upper Case from Below by Support Legs

In the battery pack 200 according to the embodiment, for example, as shown in FIGS. 50 to 52, the upper case 210 is supported from below by the support legs 390. Since the support leg 390 is bonded to the rigid body, the foot of the support leg 390 is stable. By supporting the upper case 210 from below with the stable support legs 390, vibrations of the upper case 210 can be suppressed.

In the battery pack 200 according to the embodiment, for example, as shown in FIGS. 12 and 51, the support leg 390 is bonded to the inner crosswise reinforcement 320 via the partition bracket 340. Since the rigidity of the lower case 300 can be further increased by bonding the partition bracket 340 to the rigid inner crosswise reinforcement 320, the upper case 210 can be stably supported.

In the battery pack 200 according to the embodiment, for example, as shown in FIGS. 50 and 51, the central portion of the upper case 210 is supported by the support legs 390. Since the central portion of the upper case 210 is particularly flexible, it is possible to suppress vibrations of the upper case 210 by supporting this portion from below.

Further, as shown in, for example, FIGS. 9 to 11, the center plate 370 extending in the front-rear direction is stretched over the upper end portions of the support legs 390 arranged in two rows in the front-rear direction. Since the plurality of the support legs 390 are bonded via the center plate 370, the support structure supporting the upper case 210 as a whole are increased in stiffness, and the upper case 210 can be stably supported. Since the center plate 370 has a hat-shaped cross-section and the support leg 390 also has a hat-shaped cross-section, a higher stiffness can be ensured by these.

The ribs 218 formed at the center of the back surface of the upper case 210 improves the stiffness of the upper case 210. In the battery pack 200 according to the embodiment, as shown in FIGS. 50 to 52, for example, the ribs 218 are supported by the support legs 390 via the center plate 370. In addition, by bringing the center plate 370 into contact with the ribs 218 formed on the back surface of the upper case 210, the upper case 210 can be stably supported regardless of the shape of the front surface of the upper case 210. Further, as shown in FIG. 51, for example, by bringing the rib 218 into contact with the flat surface formed on the flange 371 of the center plate 370 and passing the cable 751 through the recess 372 between the flanges 371, the cable 751 can be arranged without being obstructed by the rib 218 while stably supporting the upper case 210.

Further, as shown in FIG. 32, for example, each of the battery stacks 900 has a plurality of nail parts 922 on both sides of the battery stack 900 in the lateral direction, and is fixed to the inner crosswise reinforcement 320 by sandwiching the plurality of the nail parts 922 between the partition bracket 340 and the inner crosswise reinforcement 320. In such a structure, since the twist between two neighboring inner crosswise reinforcements 320 is regulated by the battery stack 900, the stiffness of the support structure as a whole supporting the upper case 210 is further increased, and the support structure can stably support the upper case 210.

The battery pack 200 according to the embodiment includes, for example, as shown in FIG. 12, the outer central lengthwise reinforcement 610 extending in the front-rear direction of the battery pack 200 below the support legs 390 arranged side by side. According to such a structure, it is possible to increase the stiffness of the bottom panel 301 of the portion where the support legs 390 are arranged, so that it is possible to stably support the upper case 210.

In the battery pack 200 according to the embodiment, the support leg 390 is raised from the partition bracket 340, but the support leg 390 may be raised directly from the inner crosswise reinforcement 320. In this case, the support leg 390 and the inner crosswise reinforcement 320 may be fastened by the fastener or welded. In addition, since the battery stack 900 is also rigid, the support leg 390 may be raised from a battery stack 900. Further, since the bottom panel 301 to which the inner crosswise reinforcement, the outer crosswise reinforcement, or the outer lengthwise reinforcement is fixed is said to be the rigid body which is restrained from being deformed, the support leg 390 may be raised from the bottom panel 301. Alternatively, the back surface of the upper case 210 may be directly supported by the support legs 390 without intervention of the center plate 370.

In the battery pack according to the embodiment, the low ceiling 211 of the upper case 210 is supported from below, but the high ceiling 212 may also be supported from below. Alternatively, the lower one in stiffness of the low ceiling 211 and the high ceiling 212, for example, the longer one in the front-rear direction of the battery pack 200 may be supported from below. That is, if the length of the high ceiling 212 is longer, only the high ceiling 212 may be supported from below.

Figure 56A:
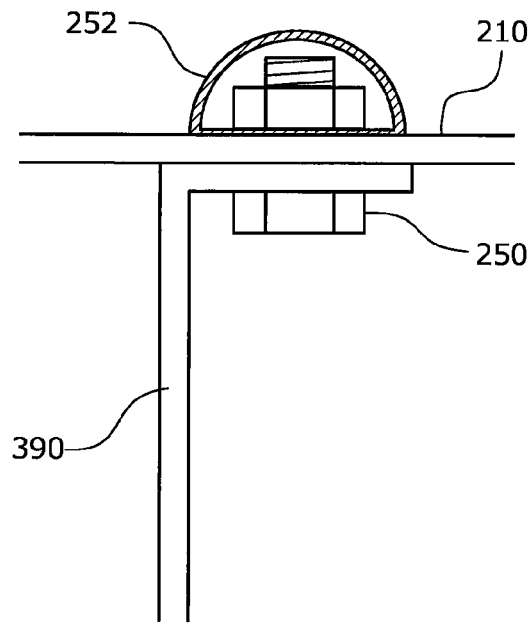
FIGS. 56A and 56B are schematic cross-sectional views showing a modification of the supporting structure of the upper case.
Figure 56B:
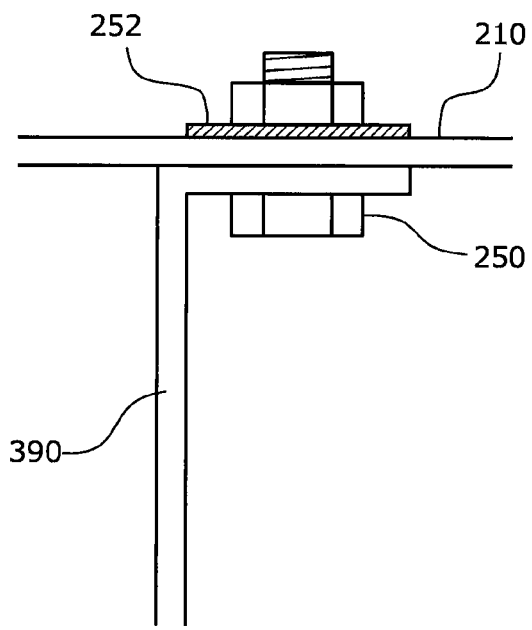

The battery pack 200 according to the embodiment can be modified, for example, as follows. FIGS. 56(a) and 56 (b) are schematic longitudinal cross-sectional views showing modifications of the support structure of the upper case 210, respectively. In each modification, the upper case 210 and the support leg 390 are directly bonded by a fastener 250. The fastening points of the fastener 250 are each sealed with a sealing material 252 for waterproofing. In the modification shown in FIG. 56A, a dome-shaped sealing material 252 is used. The domed sealing material 252 may be glued over the nut, or the bottom thereof may be inserted between the nut and the upper case 210. In the modification shown in FIG. 56B, a disk-shaped sealing material 252 is used. The disk-shaped sealing material 252 is sandwiched between the nut and the upper case 210. According to such a structure, the upper case 210 can be fixed to the support leg 390 with a simple structure while maintaining liquid-tightness.

4-2. Linkage of Inner Crosswise Reinforcements by Outer Crosswise Reinforcement

The battery pack 200 according to the embodiment includes, for example, as shown in FIG. 10, a plurality of the inner crosswise reinforcements 320, 330 and a plurality of the outer crosswise reinforcements 510, 520, 530, 540, 550, 560 arranged alternately in the front-rear direction. Each of the outer crosswise reinforcement 510, 520, 530, 540, 550, 560 is bonded to the two adjacent inner crosswise reinforcement 320, 330 along with the bottom panel 301. In the embodiment shown in FIG. 12, the two adjacent inner crosswise reinforcement 320 are welded together with the bottom panel 301 by the outer crosswise reinforcement 530 disposed therebetween. According to such a structure, the stiffness of the lower case 300 can be increased. In addition, the stiffness of the support structure as a whole supporting the upper case 210 is further increased, and the upper case 210 can be stably supported.

4-3. Linkage of Outer Crosswise Reinforcements by Outer Lengthwise Reinforcement In the battery pack 200 according to the embodiment, for example, as shown in FIG. 7 and FIG. 14, the outer crosswise reinforcements 510, 520, 530, 540, 550, 560 are sandwiched between the outer lengthwise reinforcements 610, 620, 630, 640, 650 extending in the front-rear direction of the battery pack 200 and the bottom panel 301, and these three members are bonded by welding. Such reinforcement of the bottom panel 301 can increase the stiffness of the lower case 300. In addition, the stiffness of the support structure as a whole supporting the upper case 210 is further increased, and the upper case 210 can be stably supported.

As shown in FIG. 14, for example, the outer central lengthwise reinforcement 610 has the bracing part 611 between the adjacent outer crosswise reinforcements 530. In addition, for example, the outer side lengthwise reinforcement 630 has the bracing part 631 between the adjacent outer crosswise reinforcements 530. Both ends of the bracing parts 611, 631 in the front-rear direction become wider towards the outer crosswise reinforcement (outer crosswise reinforcement 510, 520, 530 in the example shown in FIG. 14), and overlap the longitudinal side surface of the outer crosswise reinforcement (outer crosswise reinforcement 530 in the example shown in FIG. 14) in the front view as shown in FIG. 45. According to such a structure, the load applied in the front-rear direction of the battery pack 200 can be effectively dispersed in the width direction.

Further, as shown in FIG. 14, the ridge line 633 of the outer central lengthwise reinforcement 610 is curved from the front-rear direction to the longitudinal direction so as to follow the shape of the ridge line 531 of the outer crosswise reinforcement 530. In addition, the ridge line 631 of the outer side lengthwise reinforcement 630 is curved from the front-rear direction to the longitudinal direction so as to follow the shape of the ridge line 531 of the outer crosswise reinforcement 530. According to such a structure, the load applied in the front-rear direction of the battery pack 200 can be effectively dispersed in the width direction.

Further, as shown in FIG. 14, the valley line of the outer central lengthwise reinforcement 610, i.e., the starting point of the flange portion, is curved from the front-rear direction to the longitudinal direction so as to follow the shape of the valley line of the outer crosswise reinforcement 530. The valley line of the outer side lengthwise reinforcement 630 is curved from the front-rear direction to the longitudinal direction so as to follow the shape of the valley line of the outer crosswise reinforcement 530. According to such a structure, the load applied in the front-rear direction of the battery pack 200 can be effectively dispersed in the width direction.

4-4. Stereoscopic Reinforcement of Battery Pack by Middle Frame

For example, as shown in FIGS. 18 and 19, the rear second floor 360 of the middle frame 385 is formed by combining the hollow-section frames 362, 363, 364. As shown in FIGS. 9 and 10, for example, the second floor 360 is supported at four corners and at the center in the width direction by the support legs 390 391, and is further supported at both sides in the width direction by the support walls 392. By assembling such a three-dimensional reinforcement structure, the stiffness of the rear portion of the lower case 300 is improved, and it is possible to cope with the two-stage stacking of the battery stacks 900.

The center plate 370 on which the cable 751 is laid extends forward of the battery pack 200 so as to straddle the battery stacks 900. As a result, it is possible to suppress interferences between the cable 751 and the battery stacks 900 and to increase the loading number of the battery stacks 900. Further, as shown in FIG. 13, for example, the support leg 390 supporting the center plate 370 extends upwardly from the partition bracket 340 separating the adjacent battery stacks 900. That is, the support leg 390 is disposed above the partition bracket 340. This makes it possible to effectively utilize the space in the battery pack 200. Also, the support leg 390 is disposed above the inner crosswise reinforcement 320. This makes it possible to effectively utilize the space in the battery pack 200.

4-5. Installation of Elastic Member in Gap between Floor Panel and Upper Case

In the battery pack 200 according to the embodiment, for example, as shown in FIGS. 50 to 52, the elastic members 231, 232 are sandwiched between the surface of the upper case 210 and the lower surface of the floor panel 102. By sandwiching the upper case 210 between the elastic members 231, 232 and the support legs 390 from above and below, it is possible to suppress vibrations of the upper case 210. In particular, since the upper case 210 is sandwiched not between the rigid bodies but between the elastic members 231, 232 and the rigid body, vibrations of the upper case 210 can be absorbed by the elastic members 231, 232. In addition, since the gap between the upper case 210 and the floor panel 102 can be kept small, the volume of the battery pack 200 can be increased or the minimum ground height can be increased.

As shown in, for example, FIGS. 53 to 55, the pedestals 112 and 113 recessed upwardly from the back surface of the floor panel 102 are formed at positions in contact with the elastic members 231, 232. Further, since the portions on the floor panel 102 where the elastic members 231, 232 are disposed are portions overlapping with the seat cross members 155, 156, the stiffness is secured. With such a configuration, the elastic members 231, 232 can be stably sandwiched between the floor panel 102 and the upper case 210.

In the side view of the battery pack 200, for example, as shown in FIG. 52, the elastic members 231, 232 are disposed so that each of the elastic members 231, 232 is positioned between the two adjacent support legs 390 in the front-rear direction of the battery pack 200. Also in the front view of the battery pack 200, for example, as shown in FIG. 51, each of the elastic members 231, 232 is positioned between the two adjacent support legs 390 in the width direction of the battery pack 200. By arranging the support legs 390 so as to surround the elastic members 231, 232, it is possible to stably support the upper case 210 with the elastic members 231, 232.

In the side view of the battery pack 200, for example, as shown in FIG. 52, the elastic members 231, 232 are disposed so that each of the elastic members 231, 232 is positioned between the two adjacent ribs 218 in the front-rear direction of the battery pack 200. Also in the front view of the battery pack 200, for example, as shown in FIG. 51, each of the elastic members 231, 232 is positioned between the two adjacent ribs 218 in the width direction of the battery pack 200. By arranging the ribs 218 so as to surround the elastic members 231, 232, it is possible to stably support the upper case 210 with the elastic members 231, 232. In addition, since the stiffness of the upper case 210 is enhanced by the ribs 218, the elastic members 231, 232 can be stably sandwiched between the floor panel 102 and the upper case 210.

4-6. Reinforcement of Vehicle Frame by Reinforcement Structure of Battery Pack

In the battery pack 200 according to the embodiment, for example, as shown in FIG. 7, the outer lengthwise reinforcements (outer side lengthwise reinforcements) 610, 620, 630, 640, 650 extending in the front-rear direction of the battery pack 200 and the outer crosswise reinforcements (outer side crosswise reinforcement) 510, 520, 530, 540, 550, 560 extending in the width direction of the battery pack 200 are combined. This grid-like combination improves the stiffness of the bottom panel 301. As a result, the strength of the battery pack 200 against the external force can be increased.

In the battery pack 200 according to the embodiment, for example, as shown in FIG. 42, the front outer crosswise reinforcements 510, 520, 530 are attached to the underfloor side reinforcement 120 which is a reinforcement of the vehicle 100. According to such a structure, the load applied to the underfloor side reinforcement 120 can be dispersed to the reinforcement structure of the battery pack 200. In particular, since the front two outer crosswise reinforcements 510, 520 are fixed to the left and right front parts 120b of which the distance increases toward the rear, deformation of the underfloor side reinforcement 120 can be prevented when a load from the front side is transmitted to the underfloor side reinforcement 120 via the front side member 153 or the like.

Figure 57:
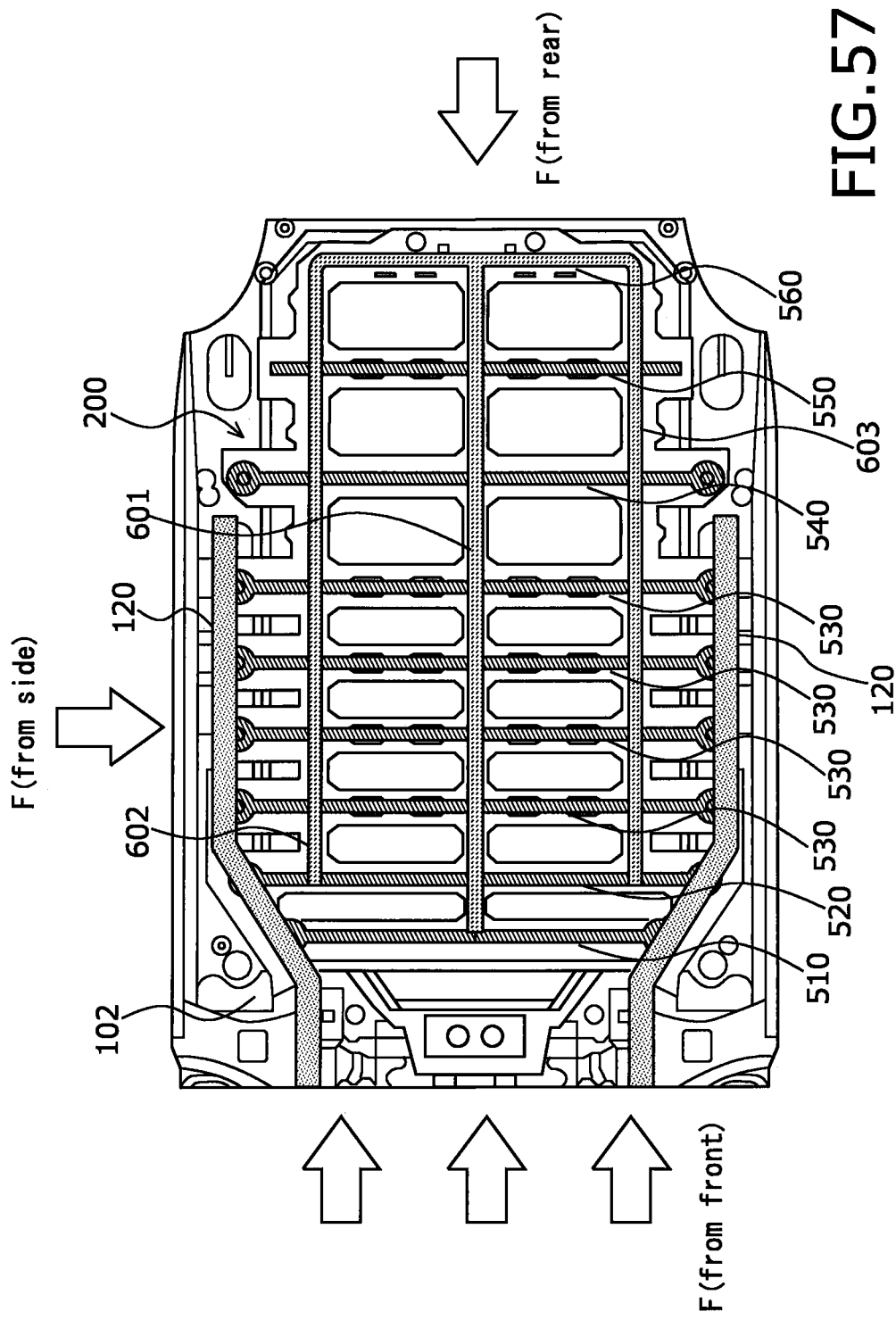
FIG. 57 is a diagram for explaining the operation and effects of the reinforcement structure of the underfloor and the battery pack of the vehicle according to the embodiment.

FIG. 57 is a diagram for explaining the operation and effects of the reinforcement structure of the underfloor and the battery pack 200 of the vehicle 100 according to the embodiment For simplicity, the central and the left and right outer lengthwise reinforcements 601, 602, 603 are shown as a single member. It is needless to say that the outer lengthwise reinforcements 601, 602, 603 may actually be formed of such a single member. For simplicity, the underfloor side reinforcement 120 is drawn from above on FIG. 57.

When a load is applied from the front of the vehicle 100 as indicated by an arrow in the drawing, a part of the load is applied to the underfloor side reinforcement 120 and the on-floor side reinforcement 152. The load applied to the underfloor side reinforcement 120 is distributed to the outer crosswise reinforcements 510, 520, 530, and also to the outer lengthwise reinforcements 601, 602, 603. When a load is applied from the rear of the vehicle 100, a part of the load is applied to the outer lengthwise reinforcement 601, 602, 603 via the last outer crosswise reinforcement 560, and is distributed to the outer crosswise reinforcement 510, 520, 530, 540, 550. It is also distributed to the underfloor side reinforcement 120 and the on-floor side reinforcement 152.

When a load is applied from the side of the vehicle 100, a part of the load is applied to the outer crosswise reinforcements 510, 520, 530 via the underfloor side reinforcement 120, and is distributed to the outer lengthwise reinforcements 601, 602, 603. That is, the reinforcement structure of the battery pack 200 distributes the load applied to the vehicle 100 in cooperation with the underfloor side reinforcement 120, which is the reinforcement of the vehicle 100.

4-7. Support of Battery Pack by Cross Members Constituting Annular Frame

The body structure of the vehicle 100 according to the embodiment has, for example, as shown in FIG. 36, an annular frame composed of the frame members 140, 141, 142, 143, and the like. More specifically, the annular frame is formed in an annular shape in which the upper frame 148 arranged on the upper side of the vehicle and arranged in a U-shape with the opening facing downward and the lower frame 149 arranged on the lower side of the vehicle and arranged in a U-shape with the opening facing upward are overlapped in portions extending in the vertical direction.

Figure 58:
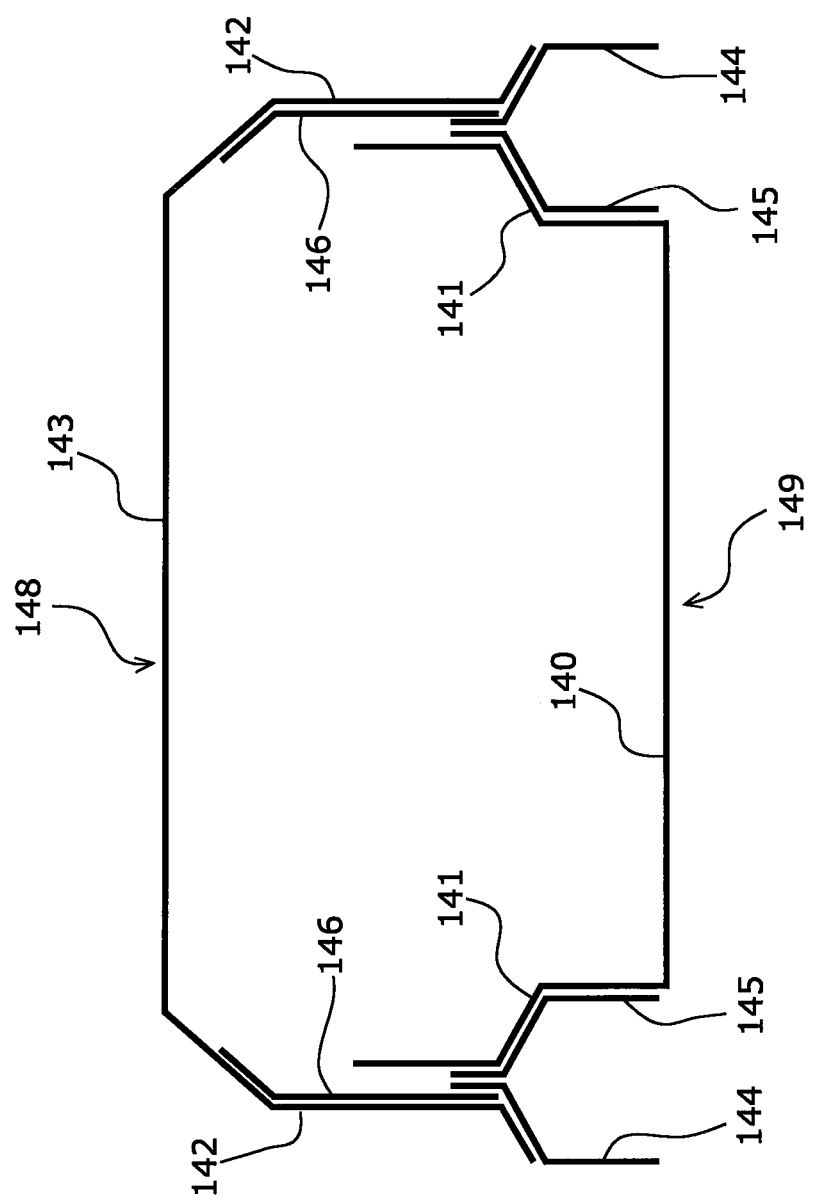
FIG. 58 is a supplementary view of FIG. 36 and is a schematic cross-sectional view of the annular frame.

In this embodiment, the upper frame 148 is placed over the lower frame 149, as shown in the supplementary view of FIG. 58. The upper frame 148 is formed in a U-shape in which the opening faces downward in the front view by connecting the roof reinforcement 143 to the insides of the right and left quarter pillar outer reinforcements 142 disposed outside the vehicle cabin. The lower frame 149 is formed in a U-shape in which the opening faces upward in the front view by connecting the rear on-floor cross member 140 to the insides of the right and left quarter pillar inner reinforcements 141 disposed inside the vehicle compartment. In this manner, the upper frame 148 and the lower frame 149 are superimposed on each other in at least a part of the vertical section. The upper frame 148 and the lower frame 149 may be formed by bonding a larger number of subdivided members.

The roof reinforcement 143 may extend in the width direction and have a hat-shaped cross-section, and may be superposed with an inner panel (not shown) to form a closed cross-section. The quarter pillar outer reinforcement 142 may extend vertically and have a hat-shaped cross-section, and may be bonded to the wheel house outer panel 144 or the rear pillar inner panel 146 by welding or the like to form a closed cross-section with the wheel house outer panel 144 or the rear pillar inner panel 146. The quarter pillar inner reinforcement 141 may extend vertically and have a hat-shaped cross-section, and may be bonded to the wheel house inner panel 145 or the rear pillar inner panel 146 by welding or the like to form a closed cross-section with the wheel house inner panel 145 or the rear pillar inner panel 146. The quarter pillar inner reinforcement 141 and the wheel house outer panel 144 are arranged with some sections facing each other and welded with each other directly or with the rear pillar inner panel 146 interposed therebetween.

Further, for example, as shown in FIGS. 47 and 48, the rear underfloor cross member 130 is bonded to the rear on-floor cross member 140 constituting the annular frame with the floor panel 102 interposed therebetween. More specifically, the flange portion of the rear on-floor cross member 140, the floor panel 102, and the flange portion of the rear underfloor cross member 130 are welded in an overlapped manner. The case fixing rear arm 460 for fixing the battery pack 200 is fixed to the rear underfloor cross member 130. According to such a structure, the rear portion of the heavy battery pack 200 can be supported by the highly rigid annular frame of the vehicle 100.

4-8. Suspension Support of Battery Pack Rear End by Rear Underfloor Cross Member In the body configuration of the vehicle 100 according to the embodiment, for example, as shown in FIG. 44, the floor panel rear part 102*a* is one step higher than that of the floor panel front part 102*b*. For this reason, the underfloor side reinforcement 120 is interrupted in the floor panel front part 102*b*. Below the floor panel rear part 102*a*, the rear floor side member 132 is arranged to curve upwards towards the rear.

For the curved rear floor side member 132, the distance from the lower case 300 are increased or the lower surface of the rear floor side member 132 is inclined. Also, a trailing arm fixing part may also be provided. In these cases, it is difficult to fix using a hanging bolt used for the underfloor side reinforcement 120. However, the rear end of the battery pack 200 can be stably held by extending the case fixing rear arm 460 up from the rear end of the lower case 300 to fix it to the rear underfloor cross member 130 and suspending the rear end of the battery pack 200 from the lower case 300.

4-9. Closed Cross-Sectional Structure of Lower Case Rear End

Figure 59:
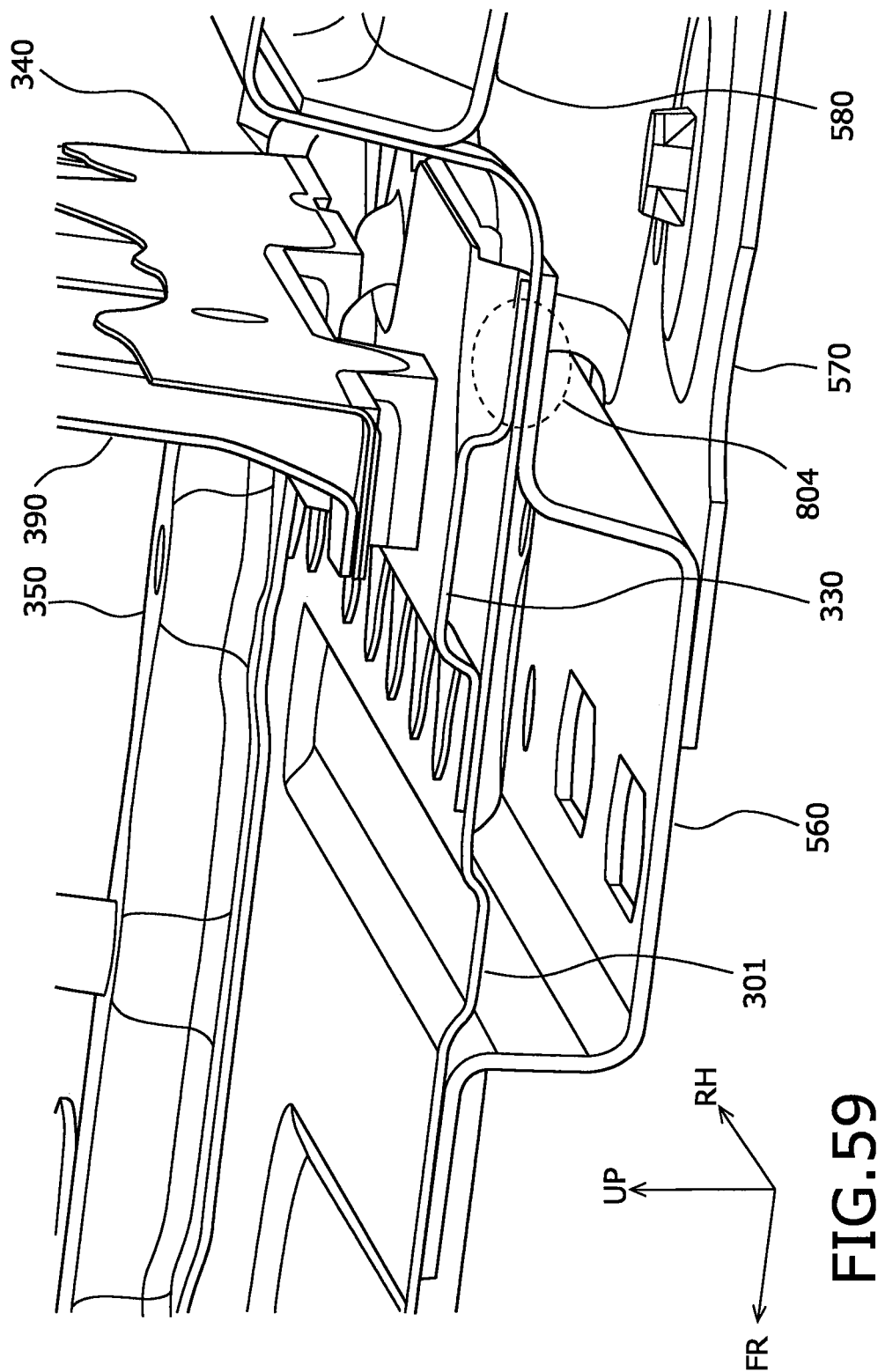
FIG. 59 is a supplementary view of FIG. 21 and is a perspective view showing in detail the periphery of the welding point of the rear end of the lower case.

As shown in FIGS. 20, 21, and 59, for example, the battery pack 200 according to the embodiment has a closed cross-sectional structure composed of the bottom panel 301, the outer crosswise reinforcement 560, the outer rear end bracket 570, and the rear end inner bracket 580 in the rear end of the lower case 300. FIG. 59 is a supplementary view of FIG. 21 and is a perspective view showing in detail the periphery of the welding point of the rear end of the lower case 300. Since the case fixing rear arm 460 is fixed to the outer rear end bracket 570 constituting the highly rigid closed cross-sectional structure, the rear end of the battery pack 200 can be stably held.

Figure 60:
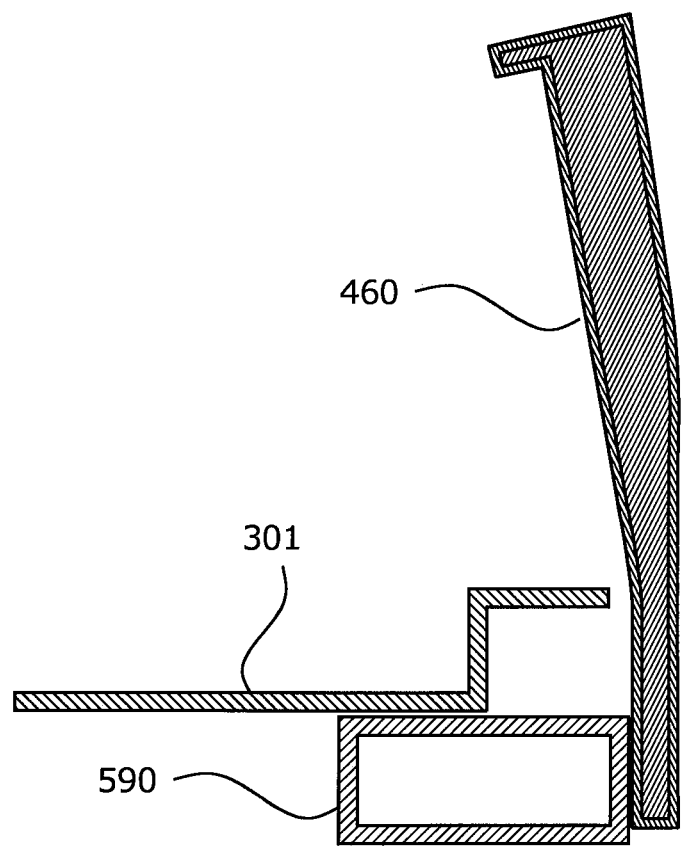
FIG. 60 is a schematic longitudinal cross-sectional view showing a modification of the rear end structure of the lower case to which the case fixing rear arm is fixed.

FIG. 60 is a schematic longitudinal cross-sectional view showing a modification of the rear end structure of the lower case 300 to which the case fixing rear arm 460 is fixed. Instead of the closed cross-sectional structure composed of a plurality of members, a single member 590 having a closed cross-section, for example, an aluminum extruded material, may be provided on the rear end of the lower case 300 to fix the case fixing rear arm 460.

4-10. Connection between Outer Side Lengthwise Reinforcement and Outer Crosswise Reinforcement of Rear End by Outer Corner Reinforcement In the battery pack 200 according to the embodiment, for example, as shown in FIGS. 24 and 25, the outer side lengthwise reinforcement 650 and the outer crosswise reinforcement 560 of the rear end are connected by the curved outer corner reinforcement 660. The shapes of the ridge lines and the valley lines of the outer corner reinforcement 660 are formed to be curved so as to follow the shapes of the ridge lines and the valley lines of the outer side lengthwise reinforcement 650 and the outer crosswise reinforcement 560. As a result, when a load acts on the outer crosswise reinforcement 560 from the rear of the vehicle 100, the applied load can be efficiently transmitted from the outer crosswise reinforcement 560 extending in the left-right direction to the outer side lengthwise reinforcement 650 extending in the front-rear direction while suppressing the concentration of stresses.

4-11. Support of Battery Stack by Multiple Reinforcements

In the battery pack 200 according to the embodiment, for example, as shown in FIG. 13, FIG. 15, and FIG. 16, the inner crosswise reinforcement 320 and the outer crosswise reinforcement 530 are welded in an overlapping manner on the bottom panel 301, and the outer crosswise reinforcement 530 and the outer central lengthwise reinforcement 610 are welded in an overlapping manner on the bottom panel 301. In this manner, by bonding a plurality of sheets of reinforcements in a superimposed manner on the bottom panel 301, the stiffness of the lower case 300 can be increased, and the battery stack 900 can be stably supported.

Further, in the battery pack 200 according to the embodiment, for example, as shown in FIGS. 13 and 32, the battery stack 900 is fixed to the inner crosswise reinforcement 320 instead of being fixed directly on the bottom panel 301. According to such a structure, it is possible to suppress direct load transmission to the battery stack 900.

Figure 61:
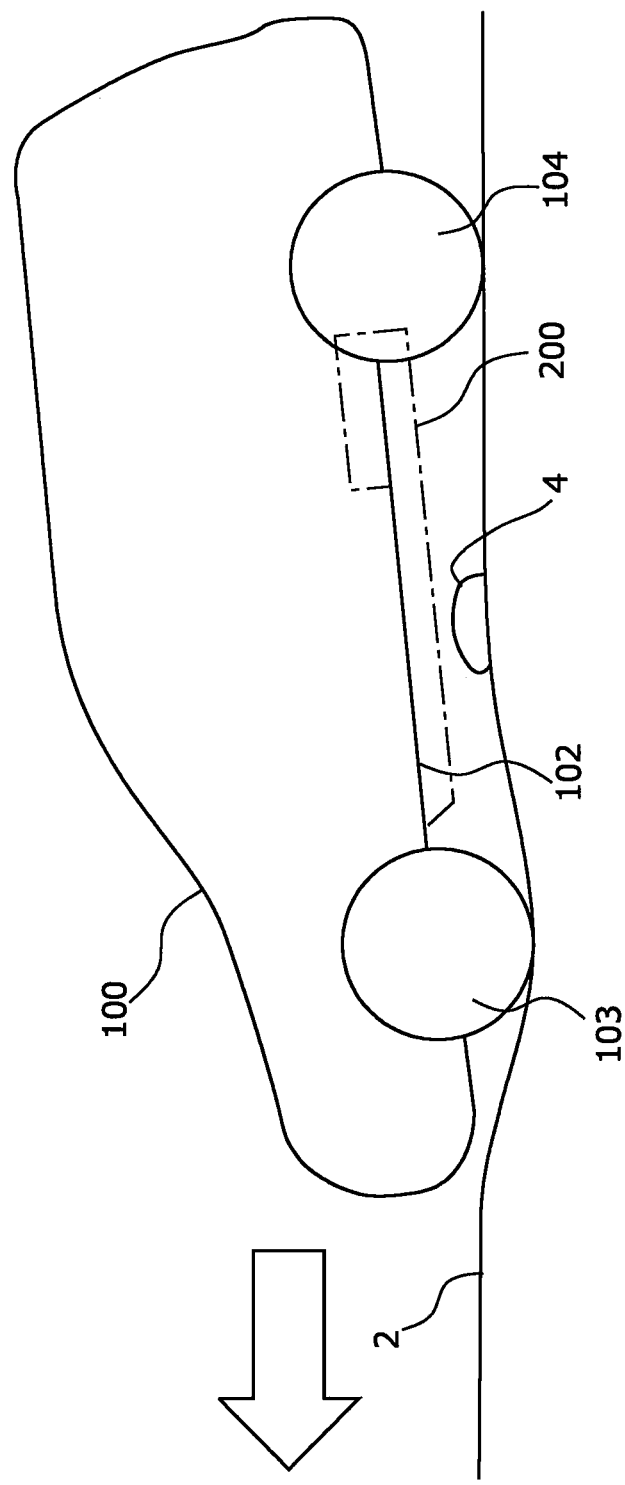
FIG. 61 is a diagram for explaining the operation and effects of the reinforcement structures of the underfloor and the battery pack of the vehicle according to the embodiment.

4-12. Protection of Battery Pack by Outer Crosswise Reinforcement and Outer Lengthwise Reinforcement In the body structure of the vehicle 100 according to the embodiment, for example, as shown in FIGS. 40 and 42, the bottom surface of the battery pack 200 is reinforced with a plurality of outer crosswise reinforcements and outer lengthwise reinforcements. These reinforcements function as protective members for protecting against the impact by an obstacle 4 when the bottom surface of the vehicle 100 hits the obstacle 4 on the road 2 as shown in FIG. 61. In addition, by providing the undercover 195 shown in FIG. 43 below the plurality of outer crosswise reinforcements and the outer lengthwise reinforcements arranged in a frame shape, it is possible to further suppress the impact on the battery pack 200.

Further, as shown in FIG. 61, due to the positional relation between the front and rear wheels 103, 104 and the battery pack 200 disposed between the wheels 103, 104, the bottom surface of the battery pack 200 is easier to hit more vigorously at the front to central portion than the rear portion during normal traveling. In this regard, in the battery pack 200 according to the embodiment, for example, as shown in FIG. 7, the arrangement density between the outer crosswise reinforcements 510, 520, 530 reinforcing the front side of the bottom panel 301 is higher than the arrangement density between the outer crosswise reinforcements 540, 550, 560 reinforcing the rear side. Further, as shown in FIG. 13, for example, the outer crosswise reinforcement 530 fixed to the rear part 120*a* of the underfloor side reinforcement 120 is disposed directly below the battery stack 900.

4-13. Arrangement of Baffle Plate on Inner Crosswise Reinforcement

In the battery pack 200 according to the embodiment, for example, as shown in FIGS. 27 to 29, the baffle plates 712, 722 for flowing the air sent from the air ducts 702, 704 to the battery stacks 900 are disposed on the inner crosswise reinforcements 320. More specifically, the support legs 390, the baffle plates 712, 722 are arranged in the front-rear direction of the battery pack 200 and bonded to the partition brackets 340. According to such a structure, it is possible to effectively utilize the space in the battery pack 200.

4-14. Protection of Battery Stack by Air Duct

In the battery pack 200 according to the embodiment, for example, as shown in FIG. 26, the air ducts 702, 704, 705, 706 are arranged along the front-rear direction of the battery pack 200 on the outer side in the width direction of the plurality of the battery stacks 900. When a lateral impact load acts on the battery pack 200 from the outer side, at least one of the air ducts 702, 704, 705, 706 absorbs the impact load. As a result, the impact load inputted to the battery cell 901 can be reduced.

4-15. Alternate Arrangement of Left and Right Air Distributors

In the battery pack 200 according to the embodiment, for example, as shown in FIG. 26, the air distributors 711, 721 are alternately arranged in the left and right air ducts 702, 704 when viewed in the front-rear direction from the center in the width direction of the battery pack 200. Although not shown in the figure, the air distributors 711, 721 are alternately arranged in the left and right second floor air ducts 705, 706. According to such an arrangement of the air distributors 711, 721, the number of the air distributors 711, 721 in each of the left and right air ducts 702, 704 and the left and right second floor air ducts 705, 706 can be reduced, and the pressure loss can be reduced. In other words, in the left and right air ducts 702, 704 and the left and right second floor air ducts 705, 706, the air can be efficiently blown to the end part opposed to the blower 700. In addition, by arranging the air distributors 711, 721 as described above, it is possible to reduce the difference in pressure loss between the right air duct 702 and the left air duct 704. As a result, it is possible to reduce the difference in loads between the left and right blowers 700.

4-16. Tilt Arrangement of Baffle Plate from Air Distributor Side to Opposite Side The battery pack 200 according to the embodiment includes, for example, as shown in FIG. 62, the baffle plates 712, 722 in which the back walls 715, 725 are inclined so that the distance from the rear surface of the battery stack 900 becomes shorter from the air distributor side toward the other side. The cooling air blown out from the air distributors 711, 721 to the inside of the battery pack 200 is guided by the baffle plates 712, 722 and sent to the back surface of the battery stack 900, but thanks to the inclination of the back walls 715, 725 of the baffle plates 712, 722, the deviation of the supplying of the cooling air in the longitudinal direction of the battery stack 900 is suppressed. As a result, it is possible to reduce the difference in the cooling amount between the battery cell 901 close to the air distributors 711,721 and the battery cell 901 distant from the air distributors 711,721.

5. Others

In the above-described embodiment, a member having a hat-shaped cross-section is used in most of the frame member and the reinforcement. However, when the vehicle 100 is a vehicle having a carbon body or a light metal body, the frame member and the reinforcement is not necessarily a member having a hat-shaped cross-section. In addition, in the above-described embodiment, the bonding by welding or fastener is used in the bonding between the members. The welding may be replaced by the fastening, or conversely, the fastening may be replaced by the welding depending on the bonding location. Depending on the material of the member, the bonding by an adhesive can be used, for example.

What is claimed is:

1. A battery pack which is mounted under a floor of a vehicle, comprising:
    a lower case fixed under the floor and on which a battery stack is placed;
    an upper case attached to the lower case;
    a support member extending upwardly from a rigid body provided inside the lower case to support a back surface of the upper case; and
    an elastic member disposed on a surface of the upper case and sandwiched between the upper case and a lower surface of the floor,
    wherein a plurality of the support members are provided in a front-rear direction of the battery pack, and
    the elastic member is disposed such that a position of the elastic member in the front-rear direction of the battery pack is located between the two adjacent support members in a side view of the battery pack.

2. The battery pack according to claim 1,
    wherein the support member supports the back surface of the upper case at a central portion in a width direction of the battery pack.

3. The battery pack according to claim 1,
    wherein a plurality of the support members are provided in a width direction of the battery pack, and
    the elastic member is disposed such that a position of the elastic member in the width direction of the battery pack is located between the two adjacent support members in a front view of the battery pack.

4. The battery pack according to claim 1,
    wherein the back surface of the upper case is provided with a downwardly projecting rib, and
    the upper case is supported on the rib by the support member.

5. The battery pack according to claim 4,
    wherein a plurality of the ribs are spaced apart from each other and a cable is passed between the ribs.

6. The battery pack according to claim 1,
    wherein a plurality of downwardly projecting ribs are provided on the back surface of the upper case in the front-rear direction of the battery pack,
    the upper case is supported on the plurality of the ribs by the support member, and
    the elastic member is disposed such that a position of the elastic member in the front-rear direction of the battery pack is located between the two adjacent ribs in the side view of the battery pack.

7. The battery pack according to claim 1,
    wherein a plurality of downwardly projecting ribs are provided on the back surface of the upper case in a width direction of the battery pack,
    the upper case is supported on the plurality of the ribs by the support member, and
    the elastic member is disposed such that a position of the elastic member in the width direction of the battery pack is located between the two adjacent ribs in a front view of the battery pack.

8. The battery pack according to claim 4,
    wherein a plurality of the support members are arranged in two rows in the front-rear direction of the battery pack at a center in a width direction of the battery pack,
    a center plate extending in the front-rear direction of the battery pack is stretched over upper end portions of the plurality of the support members arranged in two rows, and
    the ribs abut on the center plate.

9. The battery pack according to claim 8,
    wherein flat surfaces in contact with the ribs are formed at both ends of the center plate in the width direction of the battery pack, and
    a recess through which a cable passes is formed at a center of the center plate in the width direction of the battery pack.

10. The battery pack according to claim 1,
    wherein the upper case is formed in a stepped shape in which a front portion is low and a rear portion is high in the front-rear direction of the battery pack, and at least one of the front portion and the rear portion, which has a longer length in the front-rear direction of the battery pack, is supported by the support member.

11. The battery pack according to claim 1,
    wherein the support member is a plate having a hat-shaped cross-section perpendicular to a vertical direction of the battery pack.

12. The battery pack according to claim 1, further comprising:
an inner crosswise reinforcement provided inside the lower case and extending in a width direction of the battery pack,
wherein the support member is fixed to the inner crosswise reinforcement.

13. The battery pack according to claim 12, further comprising:
a bracket extending in the width direction of battery pack and bonded to the inner crosswise reinforcement with a fastener,
wherein the support member is bonded to the bracket.

14. The battery pack according to claim 13,
wherein a plurality of the inner crosswise reinforcements are arranged side by side in the front-rear direction of the battery pack,
a plurality of the battery stacks are arranged between the two inner crosswise reinforcements arranged in the front-rear direction of the battery pack with longitudinal directions thereof oriented in the width direction of the battery pack,
each of the plurality of the battery stacks has a plurality of nail parts on both sides of the battery stack in a lateral direction thereof, and is fixed to the inner crosswise reinforcement by sandwiching the plurality of the nail parts by the inner crosswise reinforcement and the bracket.

15. The battery pack according to claim 12, further comprising:
an outer crosswise reinforcement provided on an outer side of the lower case and extending in the width direction of the battery pack,
wherein a plurality of the inner crosswise reinforcements and a plurality of the outer crosswise reinforcements are alternately arranged in the front-rear direction of the battery pack, and
each of the outer crosswise reinforcements is bonded to the two adjacent inner crosswise reinforcements together with the lower case.

16. The battery pack according to claim 15, further comprising:
an outer lengthwise reinforcement extending in a longitudinal direction of the battery pack and disposed on an exterior of the lower case,
wherein the outer lengthwise reinforcement sandwiches a plurality of the outer crosswise reinforcements with the lower case and is bonded to the lower case together with the plurality of the outer crosswise reinforcements.

17. The battery pack according to claim 16,
wherein a plurality of the support members are arranged in a center in the width direction of the battery pack side by side in the front-rear direction of the battery pack, and
the outer lengthwise reinforcement is provided below the plurality of the support members arranged side by side.

18. A vehicle comprising:
a battery pack mounted under a floor of the vehicle; and
an elastic member sandwiched between a lower surface of the floor and the battery pack, wherein the battery pack includes:
a lower case fixed under the floor and on which a battery stack is placed;
an upper case attached to the lower case and on which the elastic member is placed; and
a support member extending upwardly from a rigid body consisting of the battery stack and the lower case and supporting a back surface of the upper case;
wherein a plurality of the support members are provided in a front-rear direction of the battery pack, and
the elastic member is disposed such that a position of the elastic member in the front-rear direction of the battery pack is located between the two adjacent support members in a side view of the battery pack.

* * * * *